United States Patent
Haensgen et al.

(10) Patent No.: US 10,827,735 B2
(45) Date of Patent: Nov. 10, 2020

(54) REMOTELY DETECTABLE TRANSPORTABLE GAME AND FISHING ALARM SYSTEM

(71) Applicant: Vulture Systems, LLC, Stoughton, WI (US)

(72) Inventors: Gregg J. Haensgen, Menomonee Falls, WI (US); Richard W. Lucas, Zimmerman, MN (US); James F. Milota, Stoughton, WI (US); Barry J. Howe, Verona, WI (US)

(73) Assignee: Vulture Systems, LLC, Stoughton, WI (US)

( * ) Notice: Subject to any disclaimer, the term of this patent is extended or adjusted under 35 U.S.C. 154(b) by 428 days.

(21) Appl. No.: 15/239,003

(22) Filed: Aug. 17, 2016

(65) Prior Publication Data
US 2017/0079257 A1    Mar. 23, 2017

Related U.S. Application Data

(60) Provisional application No. 62/220,968, filed on Sep. 19, 2015.

(51) Int. Cl.
*A01K 97/12* (2006.01)
*H04W 76/14* (2018.01)

(52) U.S. Cl.
CPC .......... *A01K 97/125* (2013.01); *H04W 76/14* (2018.02)

(58) Field of Classification Search
CPC ....... A01K 97/01; A01K 97/125; G08B 21/22
See application file for complete search history.

(56) References Cited

U.S. PATENT DOCUMENTS

| | | | |
|---|---|---|---|
| 4,718,276 A * | 1/1988 | Laughlin | G01P 3/44 |
| | | | 310/11 |
| 4,928,419 A | 5/1990 | Forrestal | |
| 5,087,099 A | 2/1992 | Stolarczyk | |
| 5,097,618 A * | 3/1992 | Stoffel | A01K 97/125 |
| | | | 43/17 |

(Continued)

FOREIGN PATENT DOCUMENTS

| | | |
|---|---|---|
| DE | 102007039285 | 2/2009 |
| EP | 2763321 | 8/2014 |

(Continued)

*Primary Examiner* — Michael H Wang
(74) *Attorney, Agent, or Firm* — Boyle Fredrickson S.C.

(57) ABSTRACT

An alarm system having a portable body carried controller that wireless communicates with multiple remote base units each having a wireless communications system configured for ultralow power mode operation where the communications system is put in sleep mode greater than one half packet transmission time but no greater than preamble transmission time to conserve battery life. Controller has multiple LED-equipped buttons assigned to corresponding base units during pairing which are respectively activated when the corresponding base unit assigned thereto alarms upon occurrence of a sensor detection event. Pressing the button can turn off the LED alarm, can poll the assigned base unit, and can task the assigned base unit including to operate in flashlight mode where base unit is lit up. A preferred base unit has an enclosure with legs that form reversible pedestals upon which base unit can be placed.

41 Claims, 23 Drawing Sheets

(56) References Cited

U.S. PATENT DOCUMENTS

| | | | |
|---|---|---|---|
| 5,701,294 A | 12/1997 | Ward et al. | |
| 5,979,101 A | 11/1999 | Muenchow | |
| 6,397,510 B1 * | 6/2002 | Klein | A01K 93/02 43/17 |
| 6,463,691 B1 | 10/2002 | Atkins | |
| 6,671,994 B1 | 1/2004 | Klein | |
| 6,804,542 B1 * | 10/2004 | Haartsen | H04W 52/0229 340/7.38 |
| 7,008,086 B1 * | 3/2006 | Kell | A01K 97/01 362/191 |
| 7,040,052 B1 | 5/2006 | Paulk | |
| 7,050,887 B2 | 5/2006 | Alvarez | |
| 7,098,792 B1 | 8/2006 | Ahlf et al. | |
| 7,187,299 B2 | 3/2007 | Kunerth et al. | |
| 7,216,659 B2 | 5/2007 | Caamano et al. | |
| 7,274,294 B2 | 9/2007 | Heinze et al. | |
| 7,346,040 B2 | 3/2008 | Weinstein | |
| 7,365,645 B2 | 4/2008 | Heinze et al. | |
| 7,460,865 B2 | 12/2008 | Nixon et al. | |
| 7,505,795 B1 * | 3/2009 | Lim | H04W 52/0232 455/574 |
| 7,562,488 B1 | 7/2009 | Perkins et al. | |
| 7,719,432 B1 | 5/2010 | Hill | |
| 8,026,814 B1 | 9/2011 | Heinze et al. | |
| 8,033,044 B2 | 10/2011 | Hails et al. | |
| 8,373,562 B1 | 2/2013 | Heinze et al. | |
| 8,457,798 B2 | 6/2013 | Hackett | |
| 8,559,461 B2 * | 10/2013 | Goh | H04L 25/022 370/474 |
| 8,627,593 B1 * | 1/2014 | Schepp | A01K 93/00 43/26.1 |
| 8,896,450 B1 * | 11/2014 | Overbye | A01K 97/125 340/573.1 |
| 2003/0122676 A1 * | 7/2003 | Cuijpers | H03G 1/02 340/573.1 |
| 2004/0020100 A1 * | 2/2004 | O'Brien | A01M 23/18 43/1 |
| 2004/0100394 A1 | 5/2004 | Hitt | |
| 2005/0195775 A1 | 9/2005 | Petite et al. | |
| 2006/0030356 A1 | 2/2006 | Haub et al. | |
| 2008/0218357 A1 * | 9/2008 | March | A01K 11/008 340/573.1 |
| 2011/0273196 A1 | 11/2011 | Hill | |
| 2013/0016586 A1 * | 1/2013 | Craig | G01S 15/96 367/107 |
| 2013/0099806 A9 | 4/2013 | Hill | |
| 2014/0247695 A1 * | 9/2014 | Vangeel | H04L 43/0811 367/93 |
| 2015/0065053 A1 * | 3/2015 | Cho | H04W 4/008 455/41.2 |
| 2015/0113853 A1 * | 4/2015 | McKeough | A01K 93/02 43/17 |
| 2015/0143736 A1 * | 5/2015 | Zdroik | A01K 97/01 43/17 |
| 2015/0208633 A1 | 7/2015 | Schramski | |
| 2015/0257189 A1 | 9/2015 | Molettiere et al. | |
| 2016/0021617 A1 * | 1/2016 | Hsiao | H04W 52/0277 455/456.6 |
| 2016/0029148 A1 * | 1/2016 | Jackson | H04W 76/14 455/41.2 |
| 2016/0088670 A1 | 3/2016 | San Vicente et al. | |
| 2016/0205708 A1 | 7/2016 | Wang | |
| 2016/0278360 A1 * | 9/2016 | Battah | A01K 97/125 |
| 2017/0013483 A1 * | 1/2017 | Rokhsaz | H04W 24/02 |
| 2017/0124825 A1 * | 5/2017 | Warren | G08B 13/22 |

FOREIGN PATENT DOCUMENTS

| | | |
|---|---|---|
| GB | 2523259 | 8/2015 |
| KR | 20080071379 | 8/2008 |
| KR | 20150021868 | 3/2015 |
| WO | 0169803 | 9/2001 |

* cited by examiner

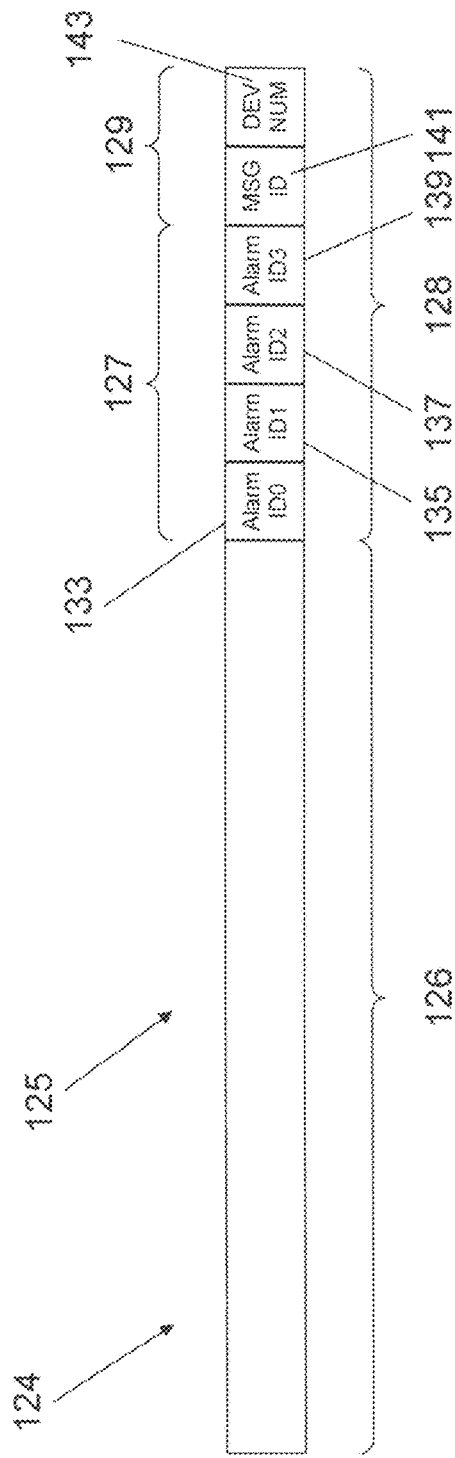
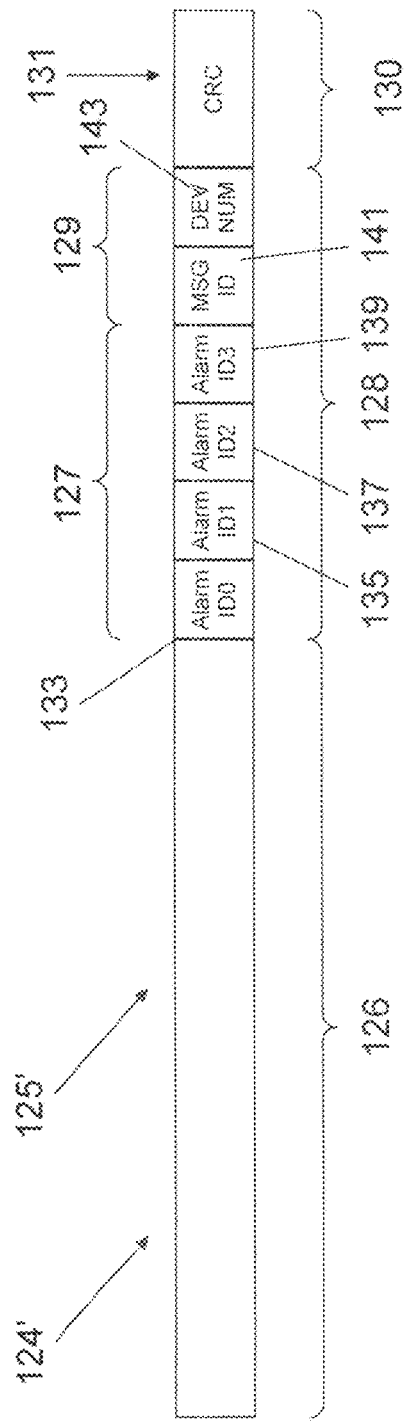
Figure 10
Figure 11

REMOTELY DETECTABLE TRANSPORTABLE GAME AND FISHING ALARM SYSTEM

CROSS-REFERENCE TO RELATED APPLICATION(S)

This is a non-provisional application based upon U.S. provisional patent application Ser. No. 62/220,968, entitled "Remotely Detectable Transportable Game and Fishing Alarm System," filed Sep. 19, 2015, which is incorporated herein by reference.

FIELD

The present invention is directed to an alarm system and more particularly to an alarm system well suited for outdoor use that is capable of being operated with a plurality of remotely located alarm sensors.

SUMMARY

The present invention is directed to an alarm system formed of a portable master alarm system controller that can be carried on the body of the user which wirelessly communicates with a plurality of remotely located sensor-equipped base units paired with controller to form an alarm system network. During alarm system operation, each base unit monitors one or more of its sensors and broadcasts a wireless alarm message to a controller upon occurrence of a sensor detection event alarming the base unit when a base unit sensor has been triggered. Receipt of a wireless alarm message by controller causes a corresponding LED of one of a plurality of LED-equipped control buttons assigned to the alarming base unit during pairing to be activated to provide a user with a visual alarm indicating which particular one of the base units broadcast the alarm. Pressing of the button whose LED is lit up not only preferably acknowledges receipt of the wireless alarm message from the alarming base unit assigned to the button with the lit up LED but also turns off the lit up LED.

In a preferred alarm system, pressing a particular controller button sends a wireless message to the particular base unit assigned to the button during pairing that can poll the particular base unit, such as to provide a wireless reply with its status, that can reset the base unit, such as upon occurrence of an alarm so alarming base unit can resume normal operation, and/or to instruct base unit remotely to perform a predefined task. In one preferred method implementation, pressing a specific controller button polls the particular base unit assigned to the specific button during pairing causing the polled base unit to wireless acknowledge the polling request including by preferably providing a status and/or lighting up in a light-outputting mode or local alarm light outputting mode. In another preferred method implementation, pressing the specific controller button wirelessly commands the particular base unit assigned to the specific button during pairing to operate in a light-outputting mode that preferably is a flashlight mode that illuminates an area surrounding the base unit. Such commands may advantageously allow providing a confirmation that the controller is still in range. In addition, such commands may advantageously allow locating the base unit in difficult viewing conditions such as at night. Most logic for pairing decision making may be implemented by particular base units.

In a method of pairing a base unit with controller, a user-initiated pairing request from an unpaired base unit initiates a pairing procedure of the controller that outputs a pairing mode alarm or user-perceptible pairing mode signal that a user can hear or feel prompting the user to press a desired specific one of the controller buttons the user wishes to assign the base unit undergoing pairing so that a specific button remotely controls operation of the base unit after pairing is finished. When the user presses the desired specific one of the controller buttons to be assigned thereafter to the particular base unit being paired, a base unit pairing confirmation message is sent from the controller to the base unit undergoing pairing. The base unit pairing confirmation message may contain an identifier that is unique to the controller (or unique to the alarm system network or alarm system being formed by pairing) along with a unique device identifier or device number corresponding to the identifier or number of the specific button pressed by the user that is thereafter assigned to the paired base unit.

In a method of interacting with the base unit paired with the controller, thereafter pressing the specific button assigned to the particular base unit can be done to poll the particular base unit, to acknowledge receipt of an alarm message from the particular base unit, to clear an alarm of the particular base unit, as well as to command the particular base unit to perform a task such as preferably activating a flashlight of the base unit thereby providing a beacon visible to a person or animal within line of sight thereof. Where it is desired to un-pair a base unit paired with controller, a user-initiated pairing erase procedure can be carried out that erases the alarm system identifier and device identifier or device number from memory storage onboard the base unit thereafter permitting the unpaired base unit to be paired with a different controller of a different alarm system of the invention.

In a method of power-conserving operation, the controller and each base unit have a wireless communications system configured to operate in an ultralow power mode where the communications system alternately cycled between a signal detection mode listening for a wireless message with a packet having a valid preamble used to lock onto a wireless message containing signal and a power-reserving mode where the communications system preferably is put in sleep mode until a valid preamble is detected or an interrupt related to some other non-communications aspect of operation is generated that needs to be handled. Where a valid preamble of an incoming wireless message packet is detected while in signal detection mode, the wireless communications system is taken out of ultralow power mode and put full time in receive mode to receive each packet of the wireless message until receipt of the message is acknowledged. After any action tasked to be carried out by the received message is completed, the wireless communications system preferably is returned to ultralow power mode. Where an interrupt is generated by occurrence of some other non-communications related aspect of operation, an interrupt handling routine is carried out along with any procedure initiated as a result before returning to ultralow power mode operation.

In one aspect, a clear switch membrane type keyboard or keypad may be used so that an illuminated LED may be visible beneath the membrane of the controller. The LED may be flashed to correspond to a button number for an alarm. Also, the master controller may be put into a lower power mode, or may be turned off when not in use, to thereby conserve battery power. This could be done, for example, by holding two buttons down for 3 seconds. An LED may illuminate when pushed to show a user if the master controller is in fact on.

These and other objects, features and advantages of this invention will become apparent from the following detailed description of the invention and accompanying drawings.

DRAWING DESCRIPTION

One or more preferred exemplary embodiments of the invention are illustrated in the accompanying drawings in which like reference numerals represent like parts throughout and in which.

Figure 4:
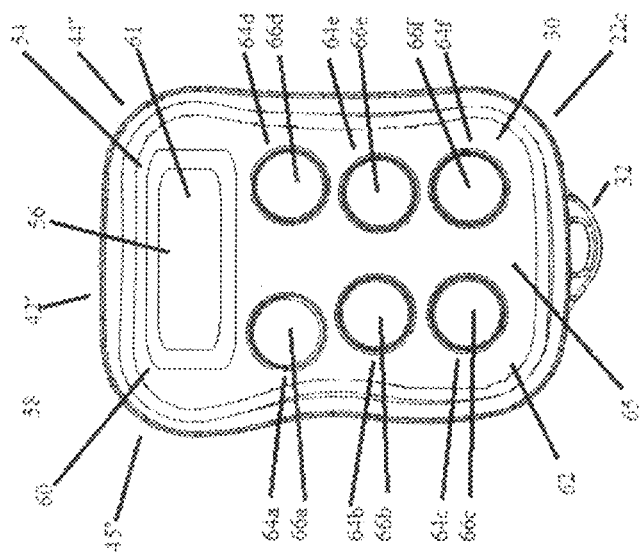
Figure 3:
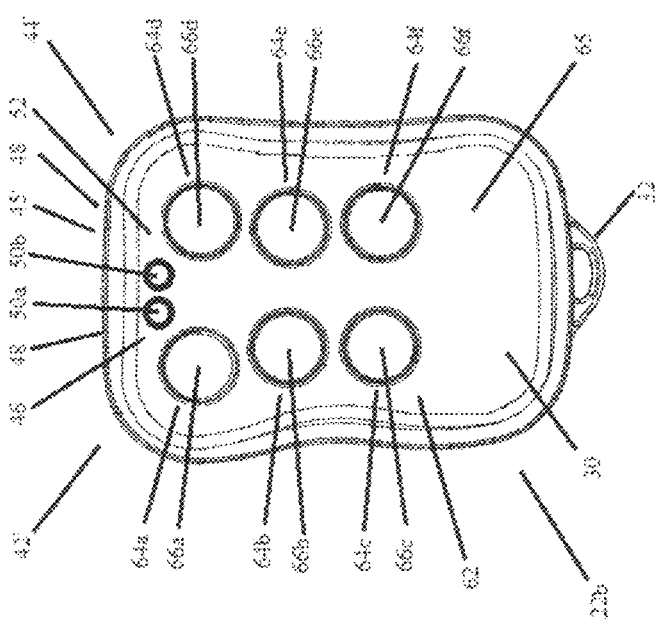
Figure 5:
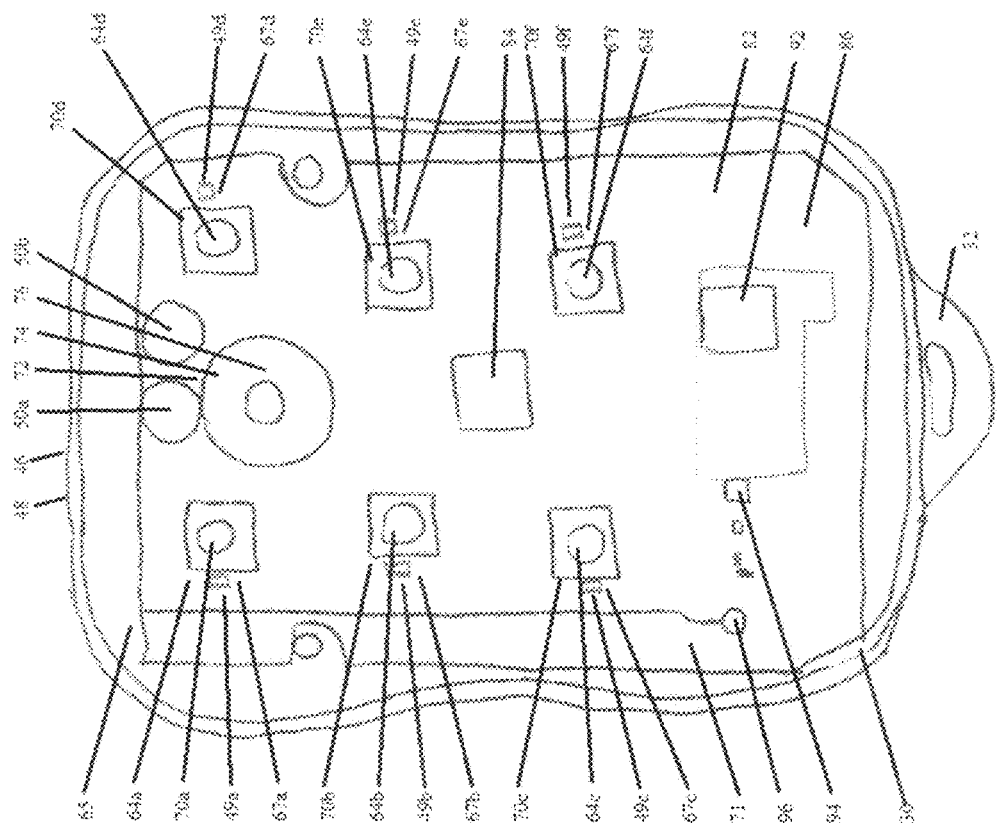
Figure 6:
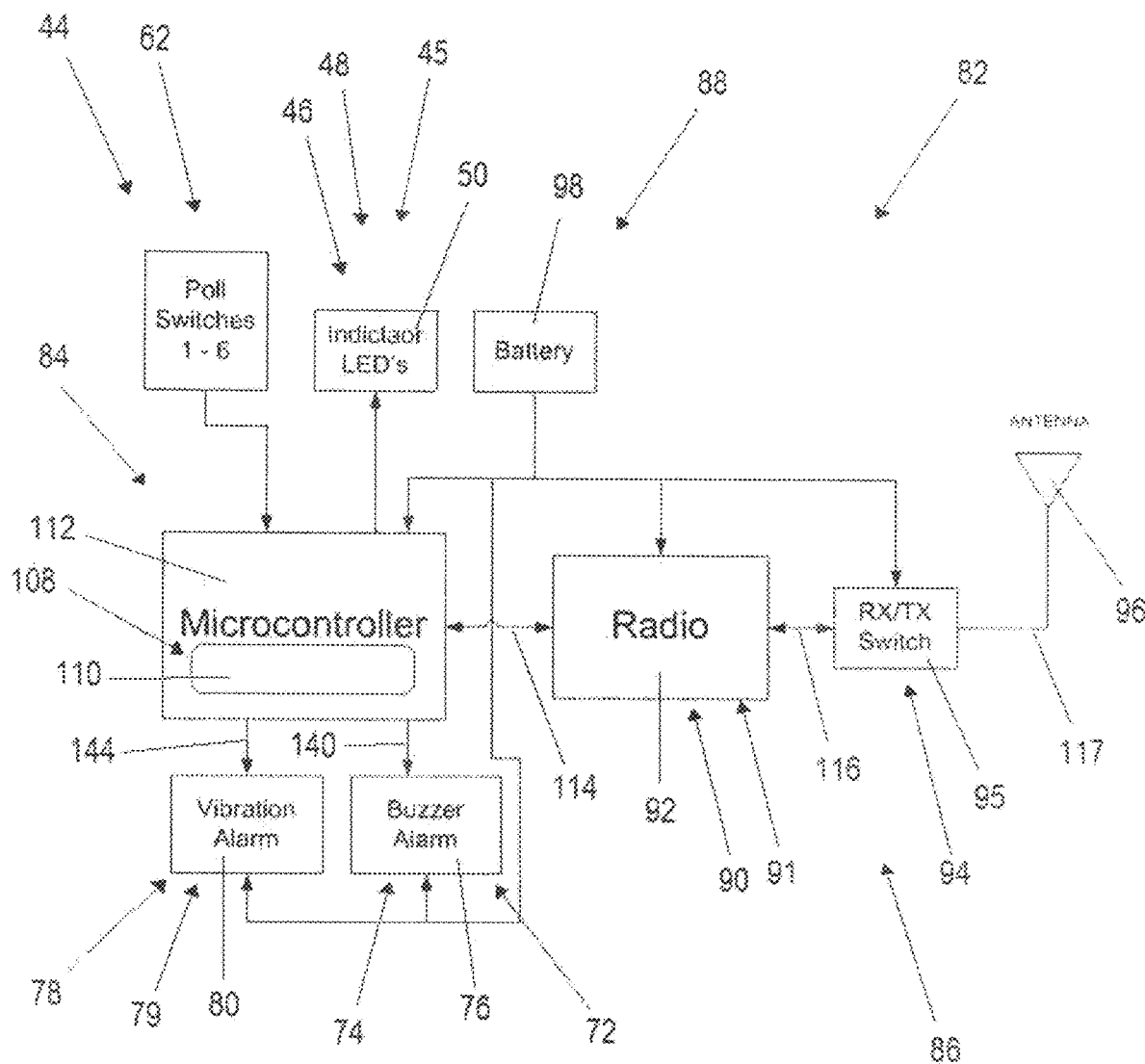
Figure 7:
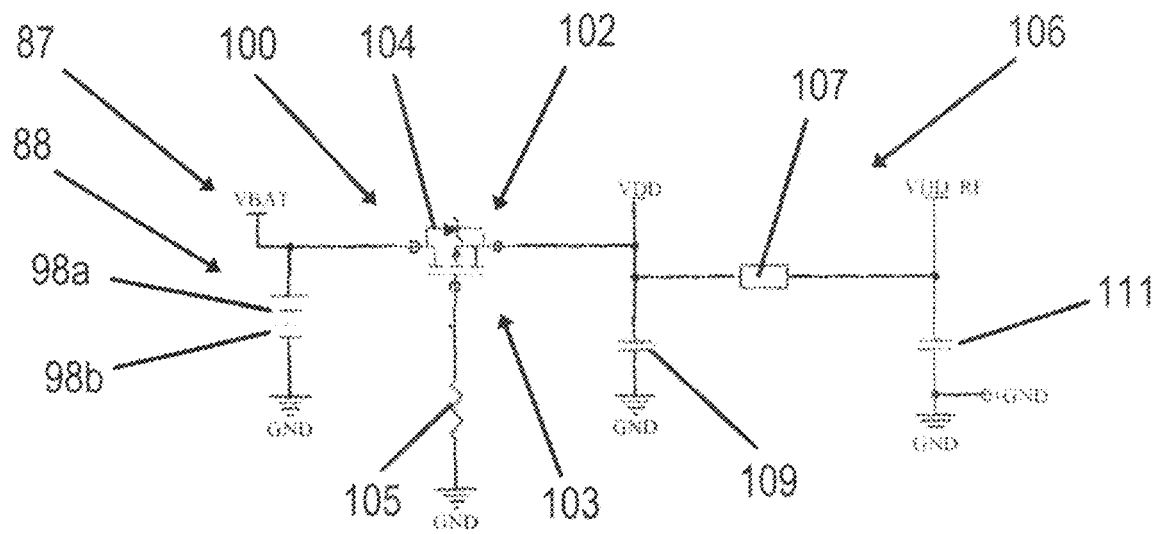
Figure 8:
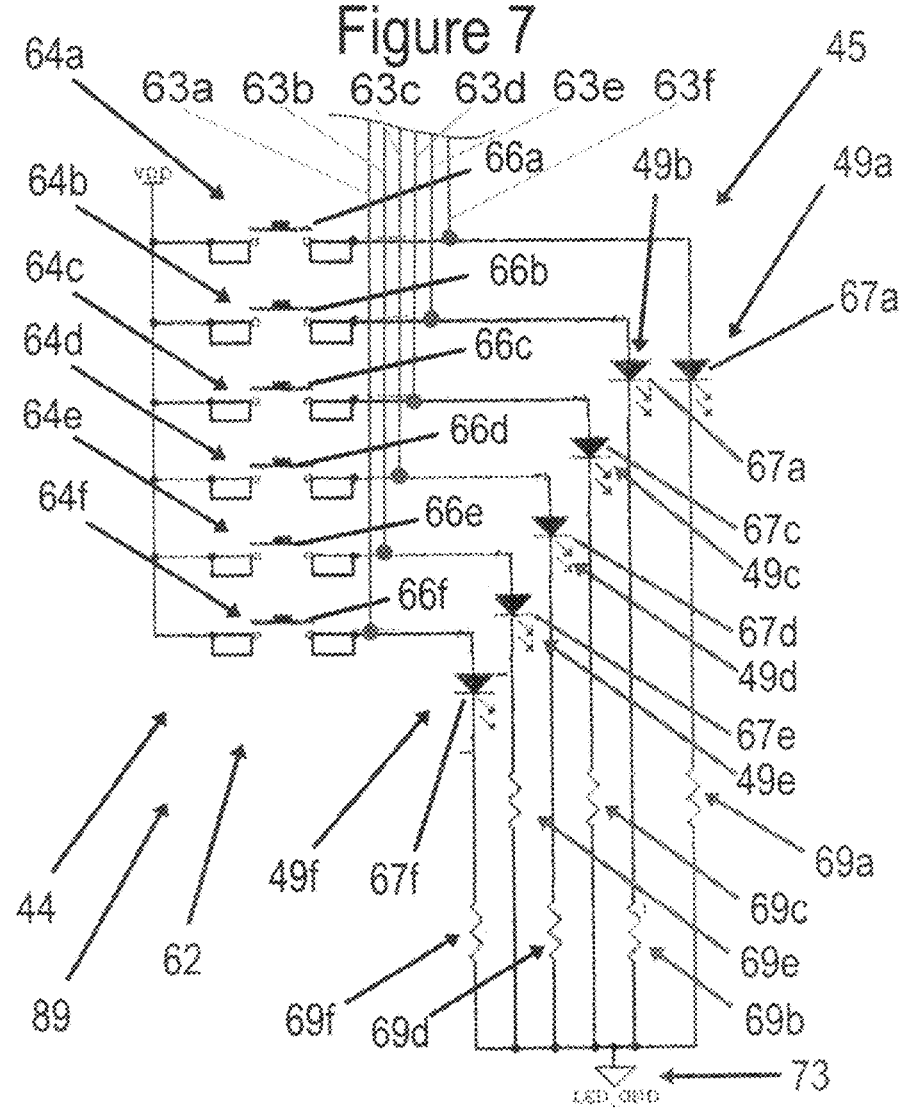
Figure 9:
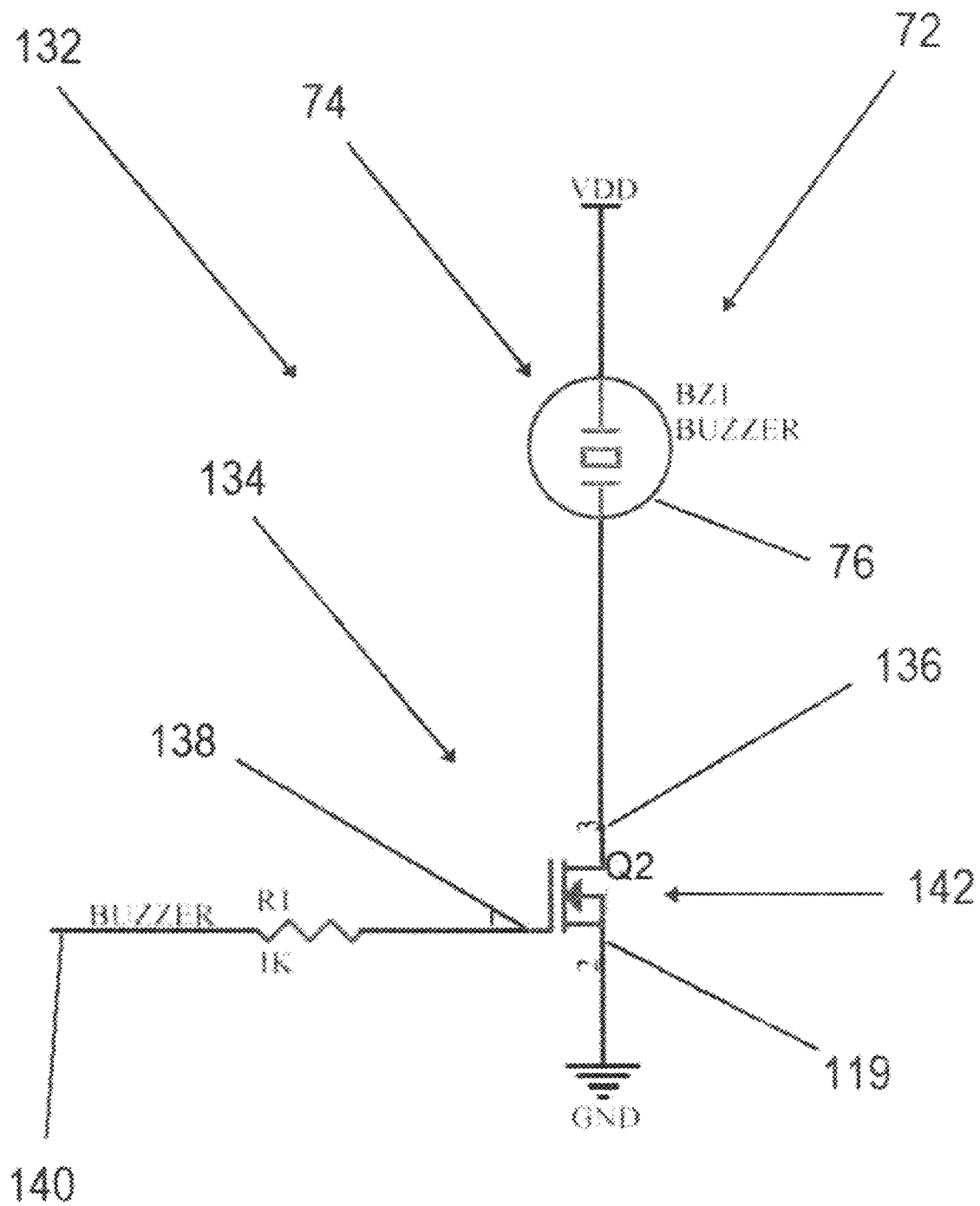
Figure 12:
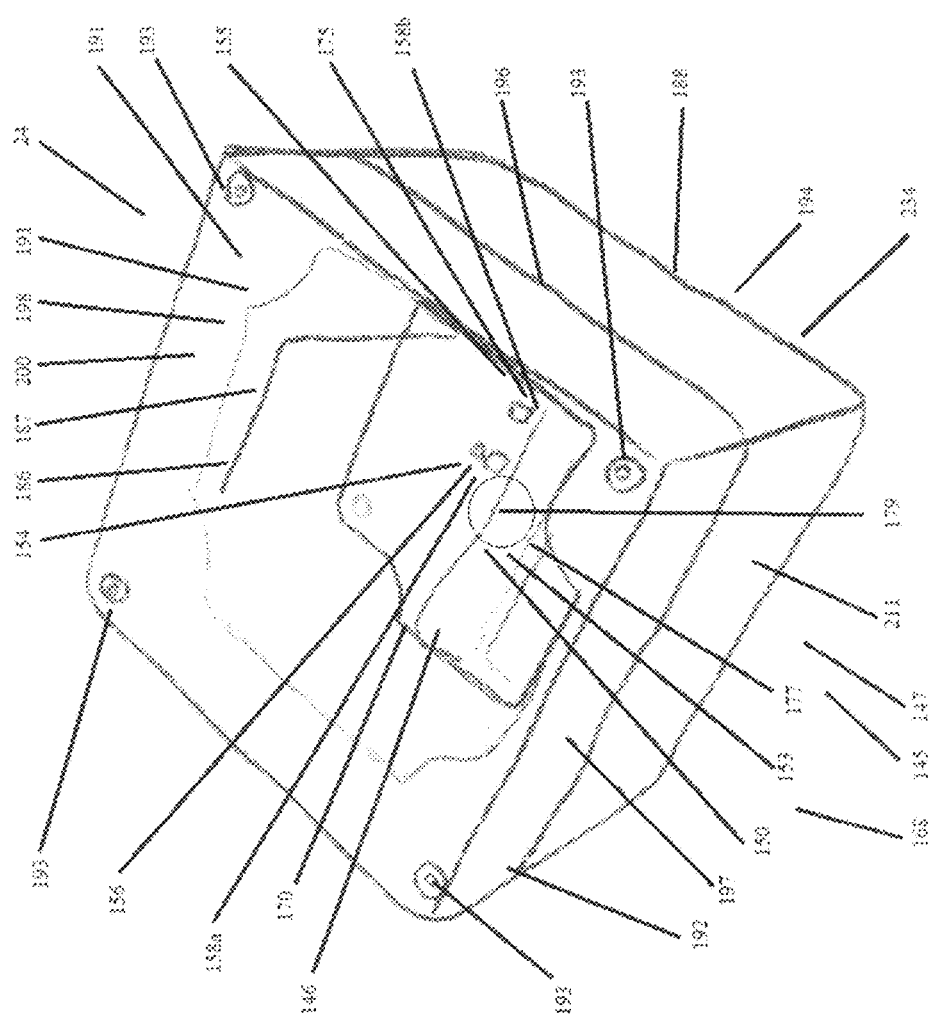
Figure 13:
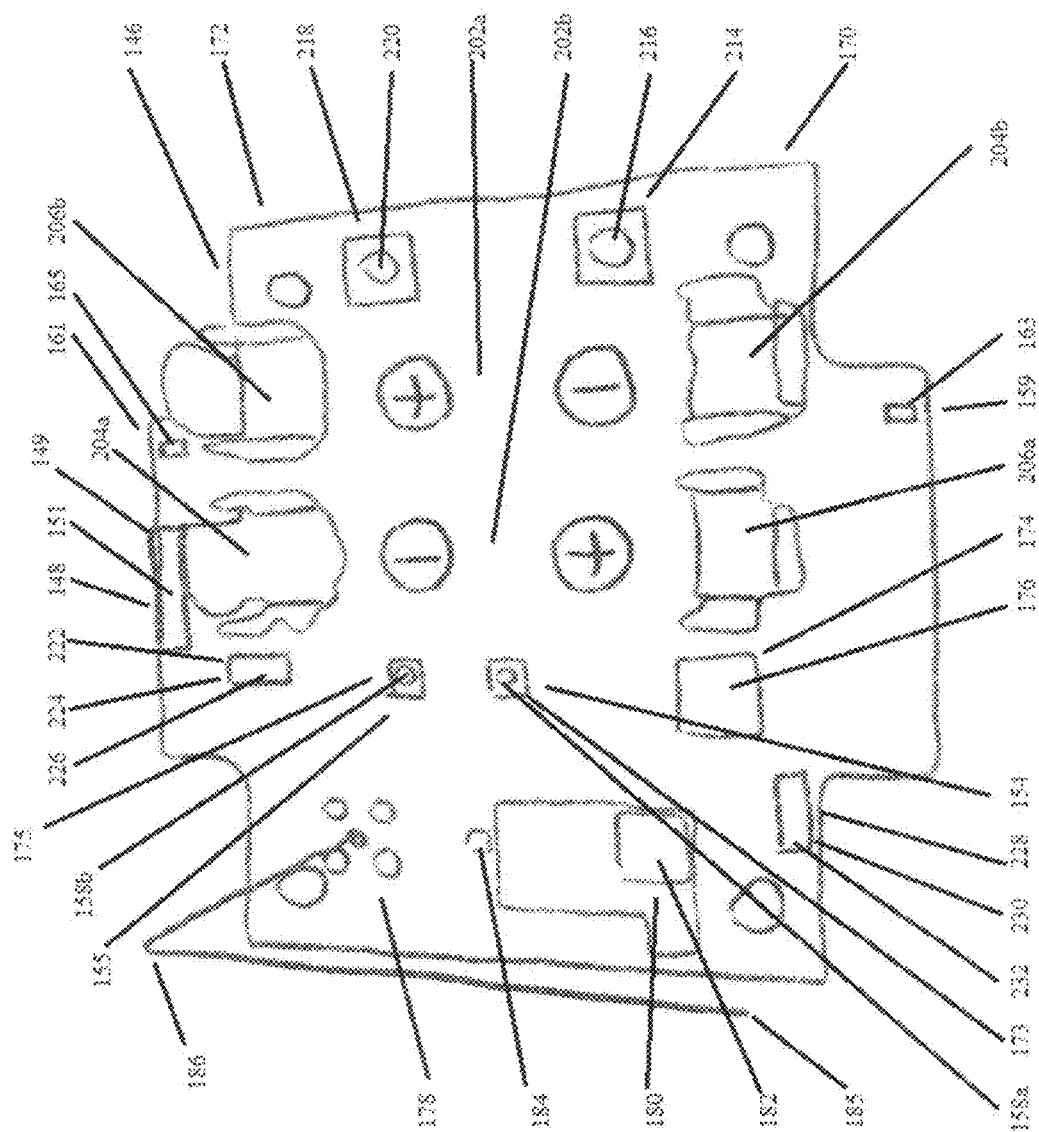
Figure 14:
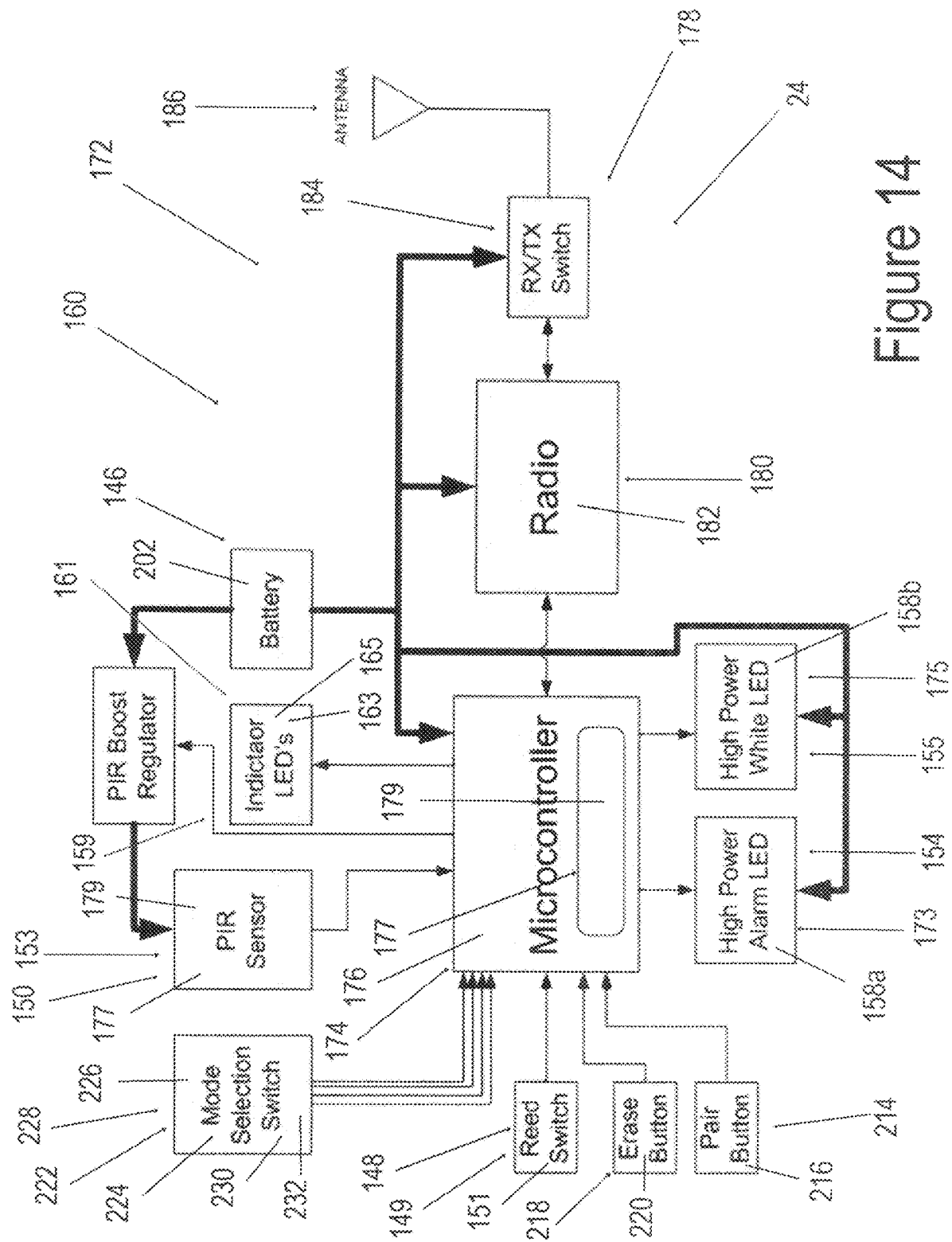
Figure 15:
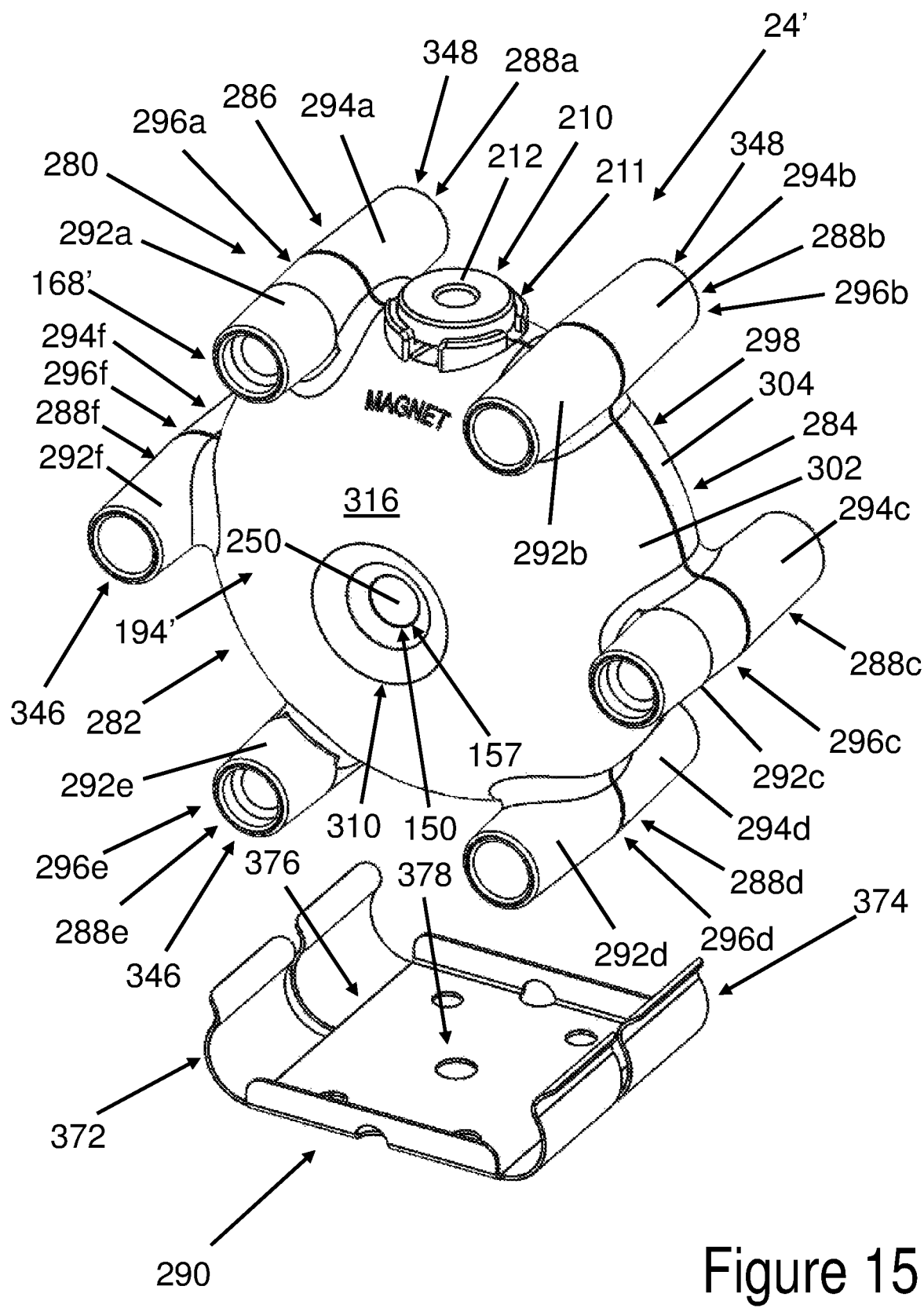
Figure 16:
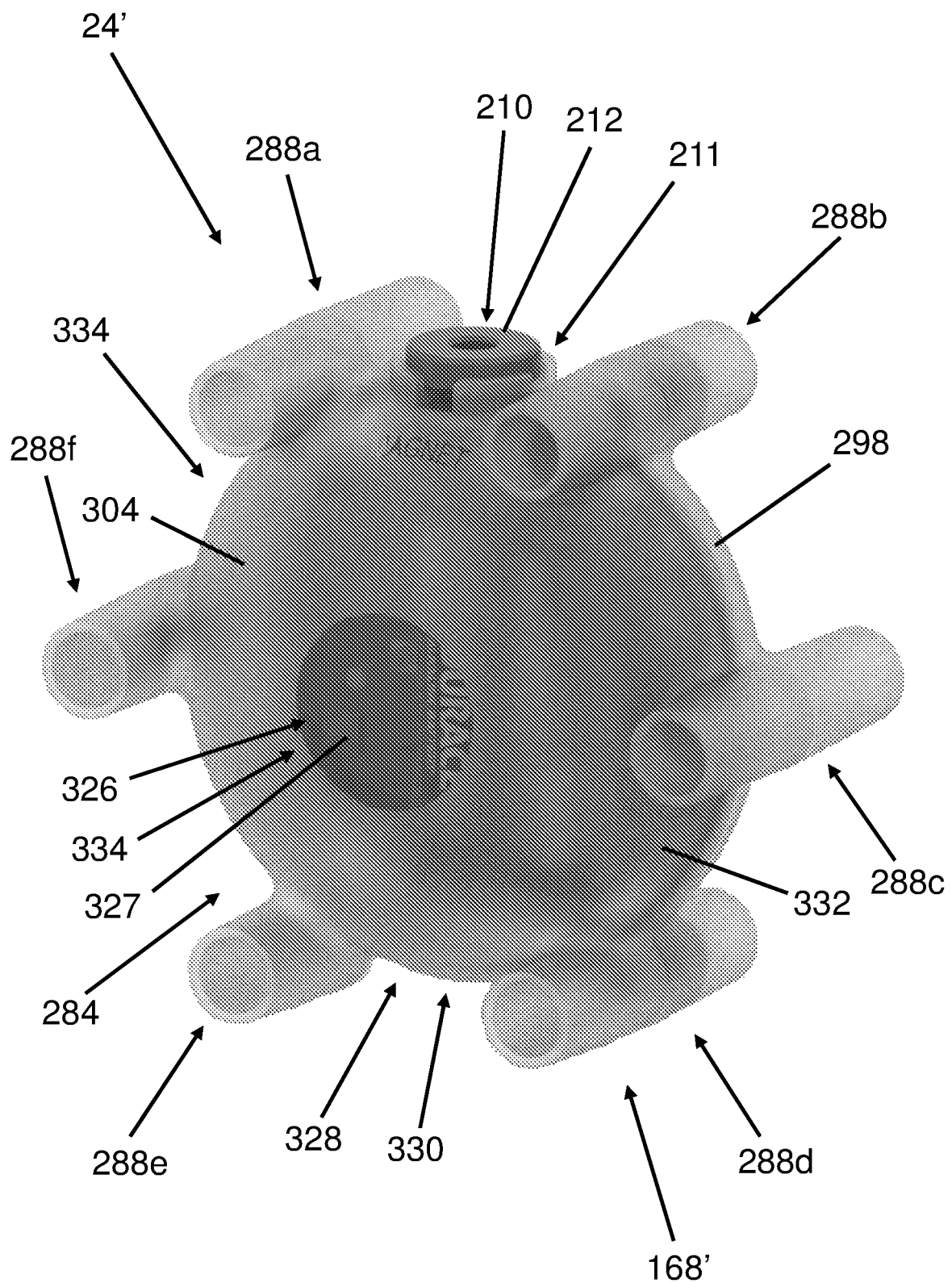
Figure 17:
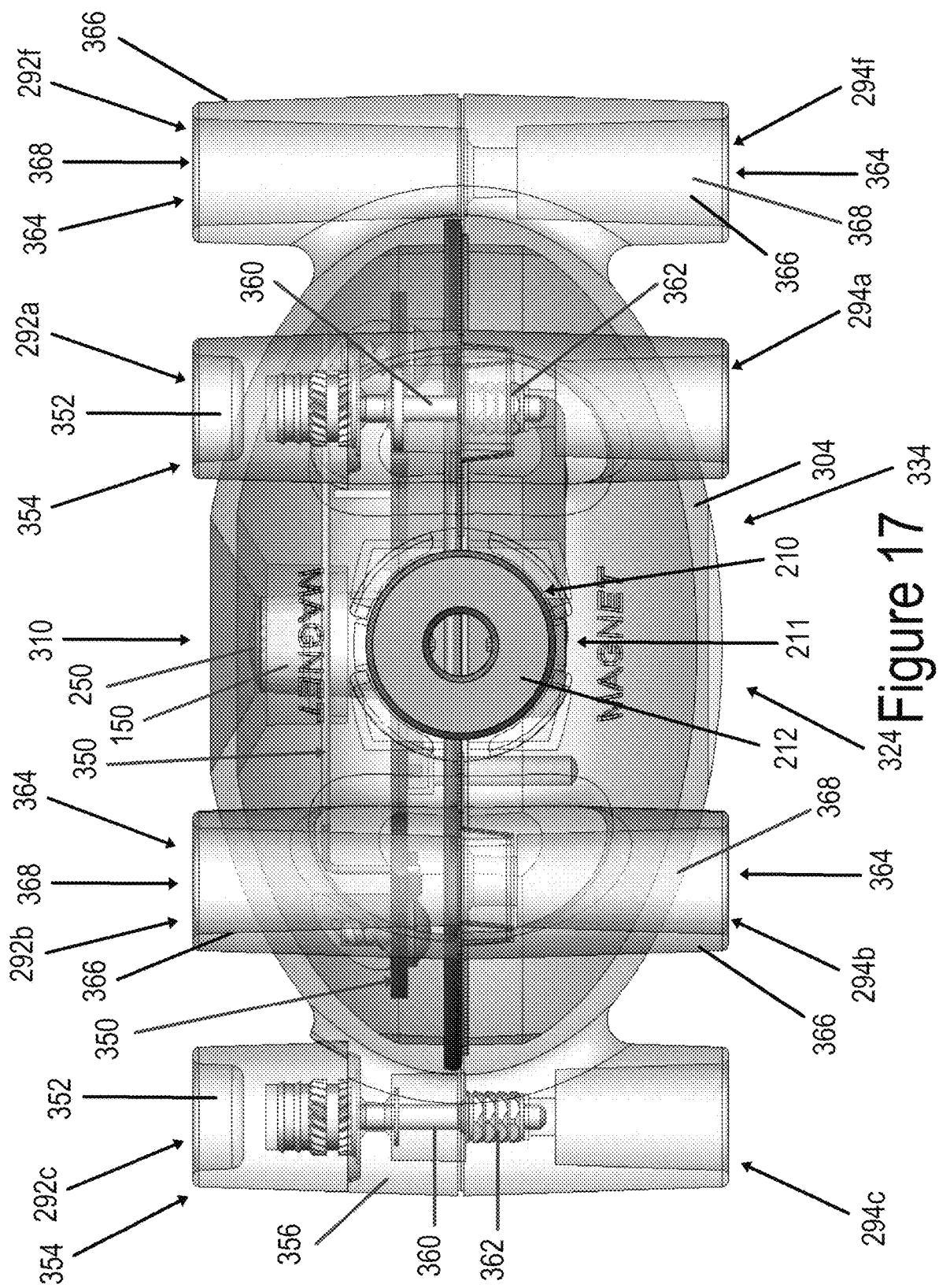
Figure 18:
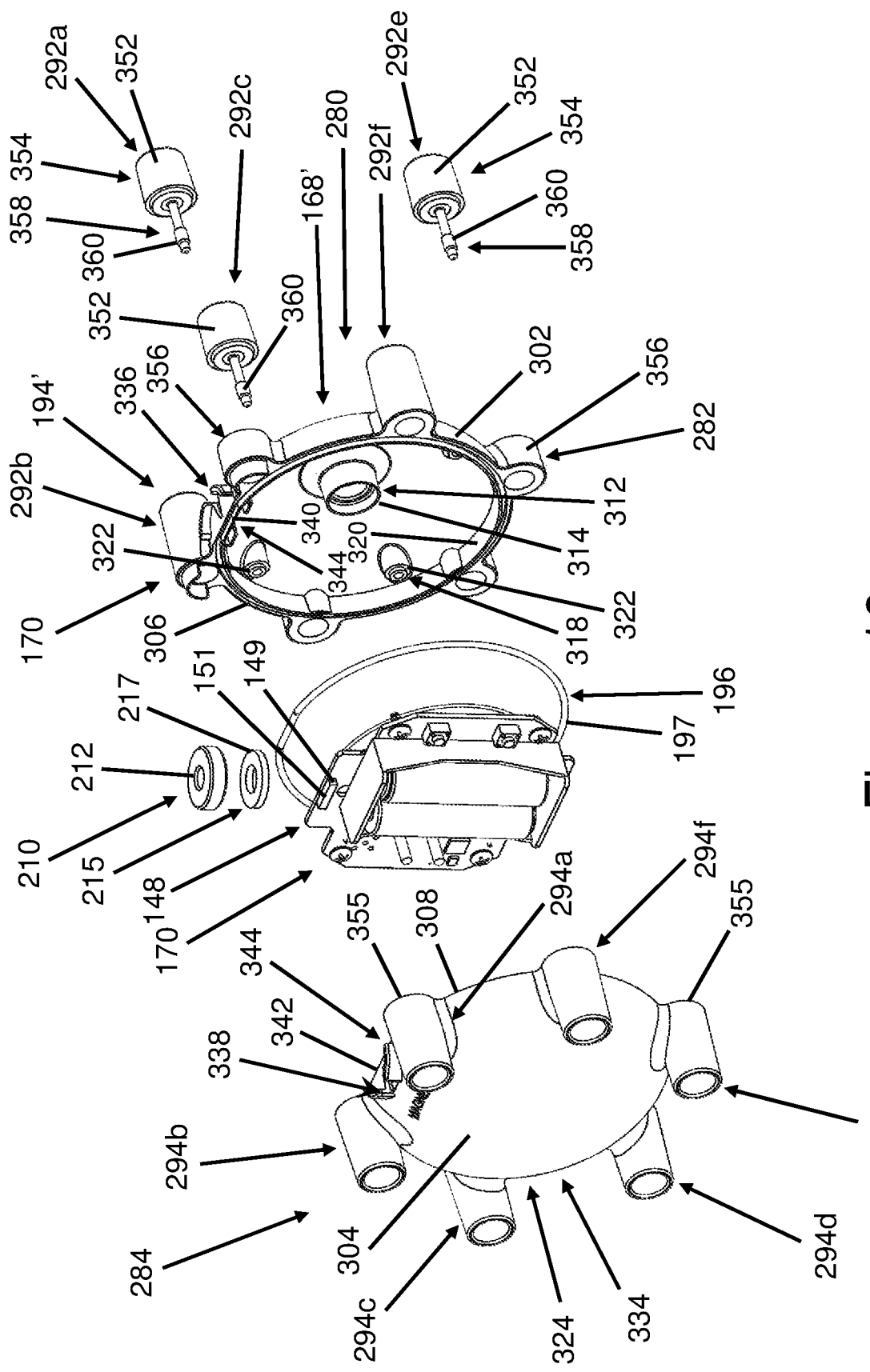
Figure 19:
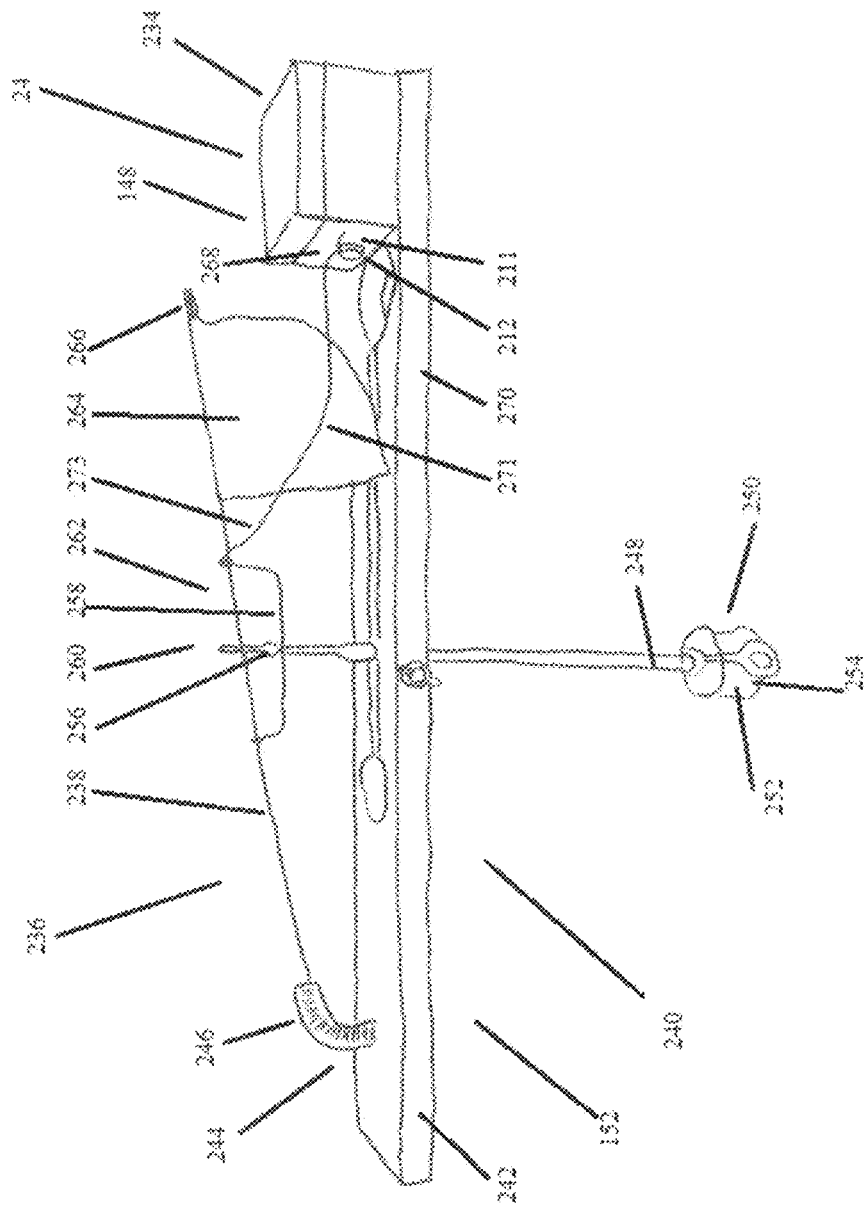
Figure 20:
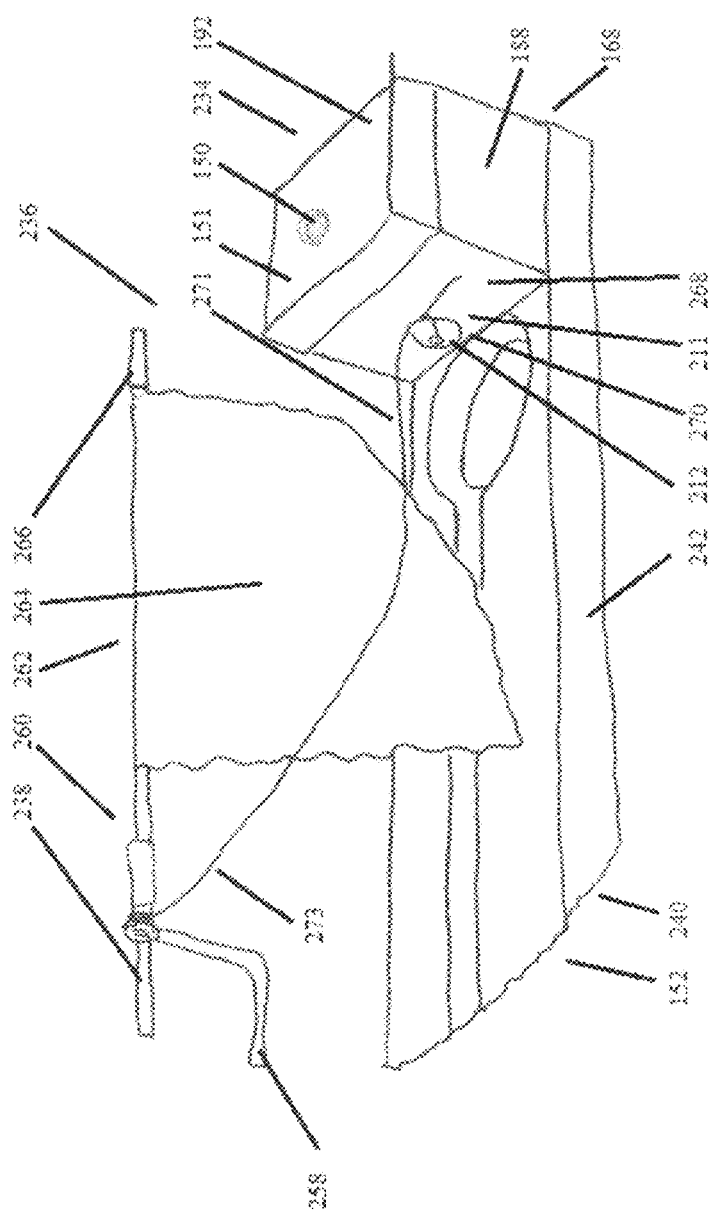
Figure 21:
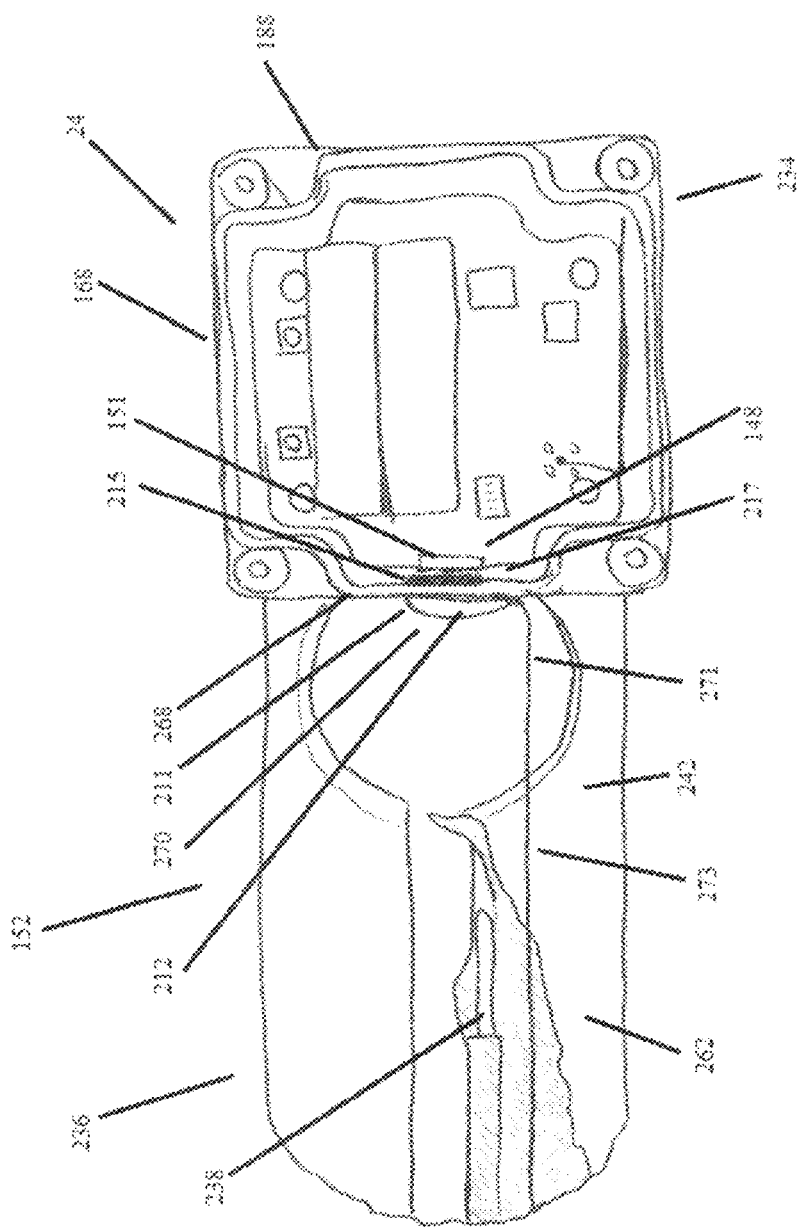
Figure 22:
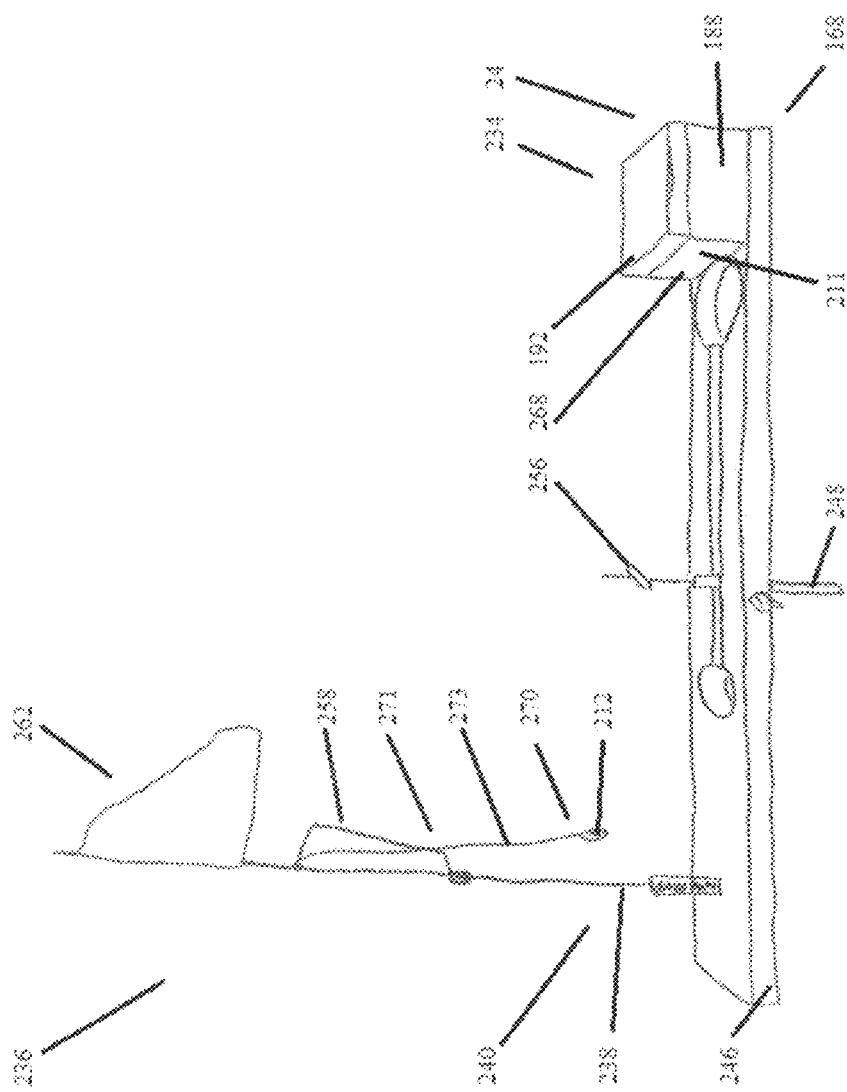
Figure 23:
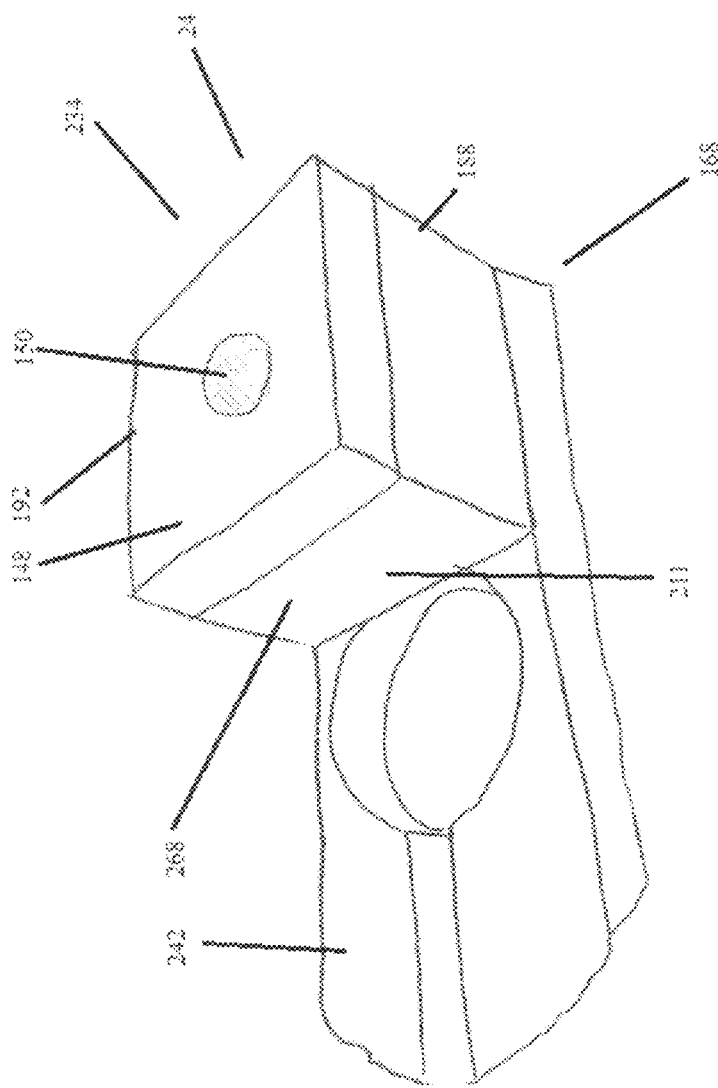
Figure 24:
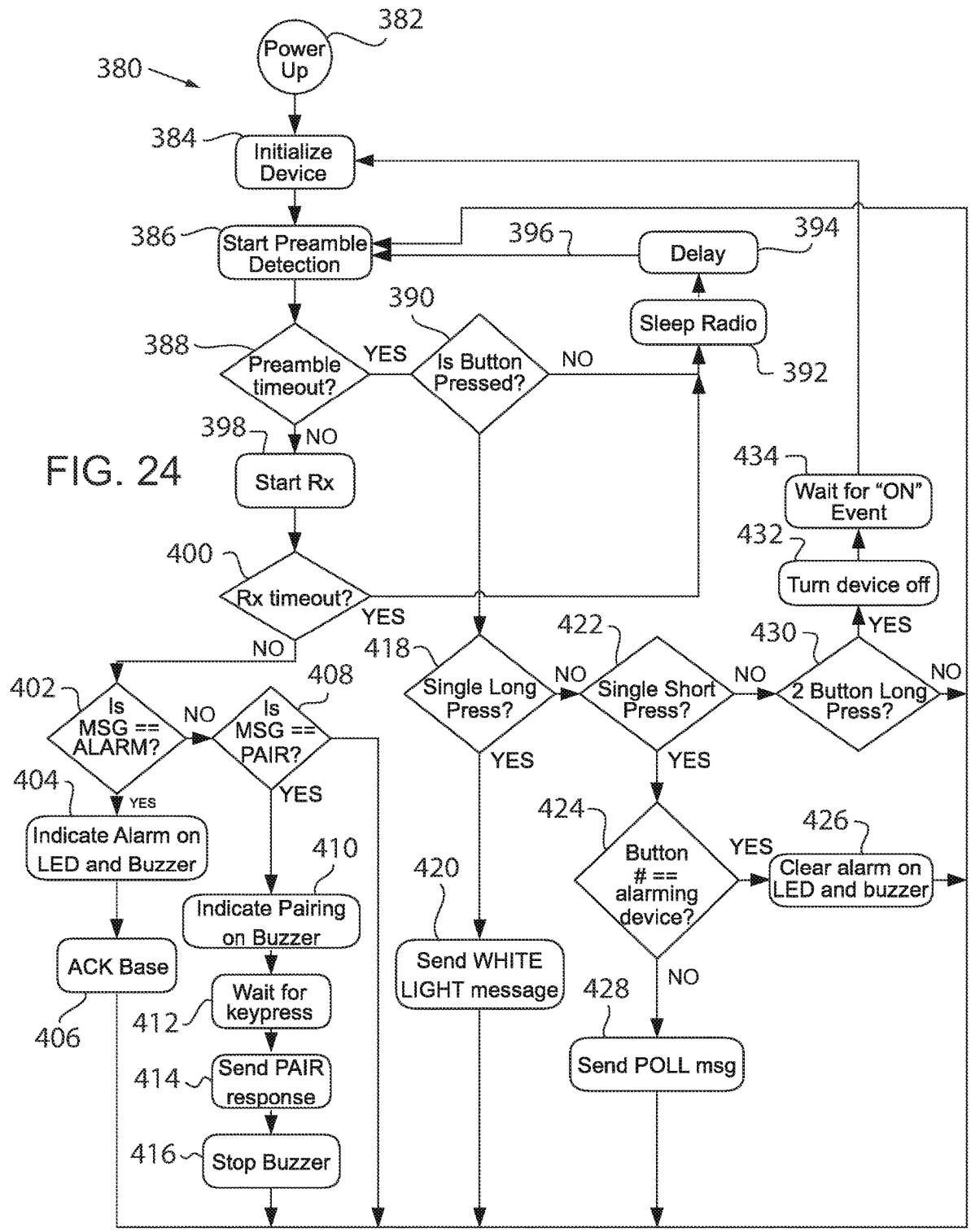
Figure 25:
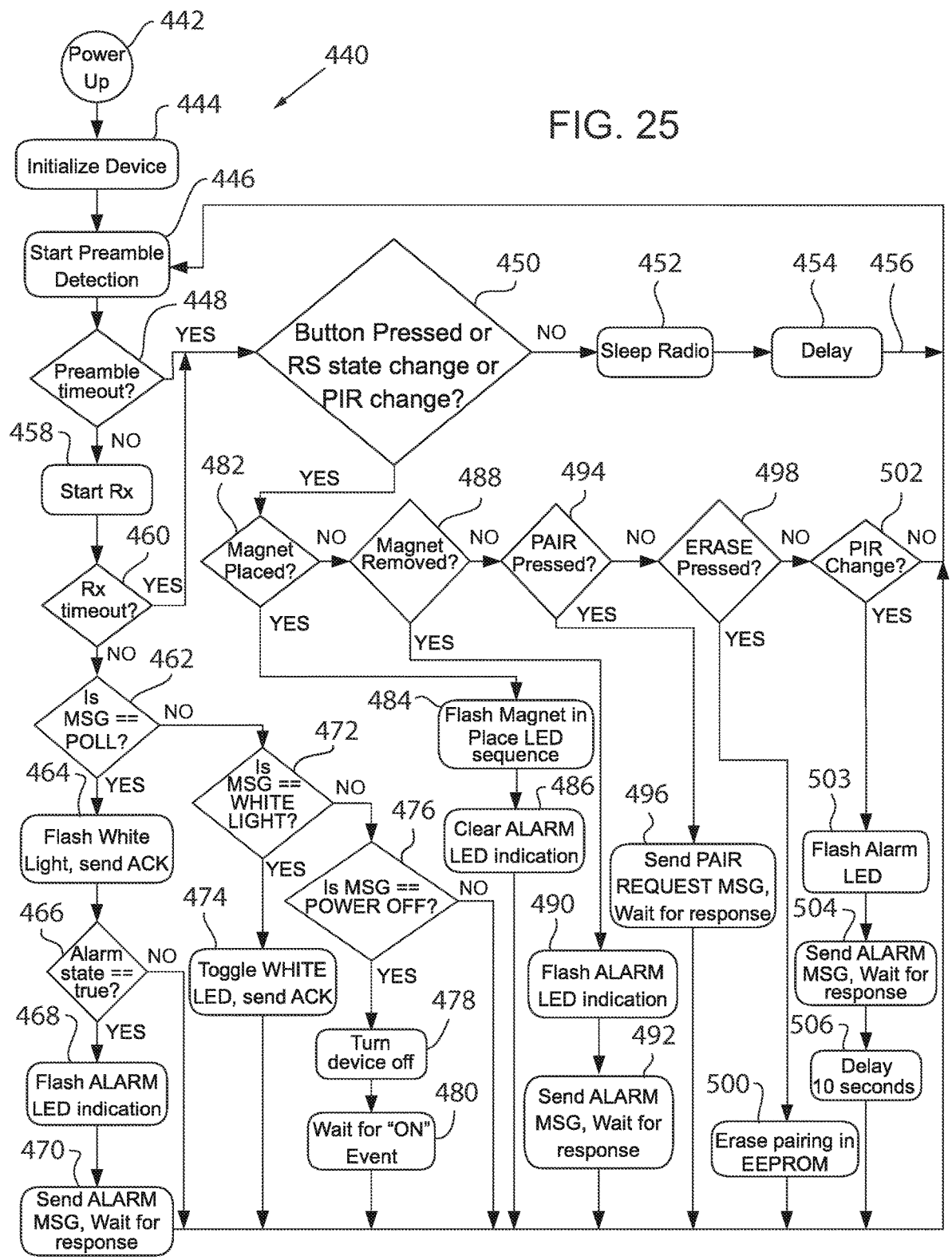
Figure 26:
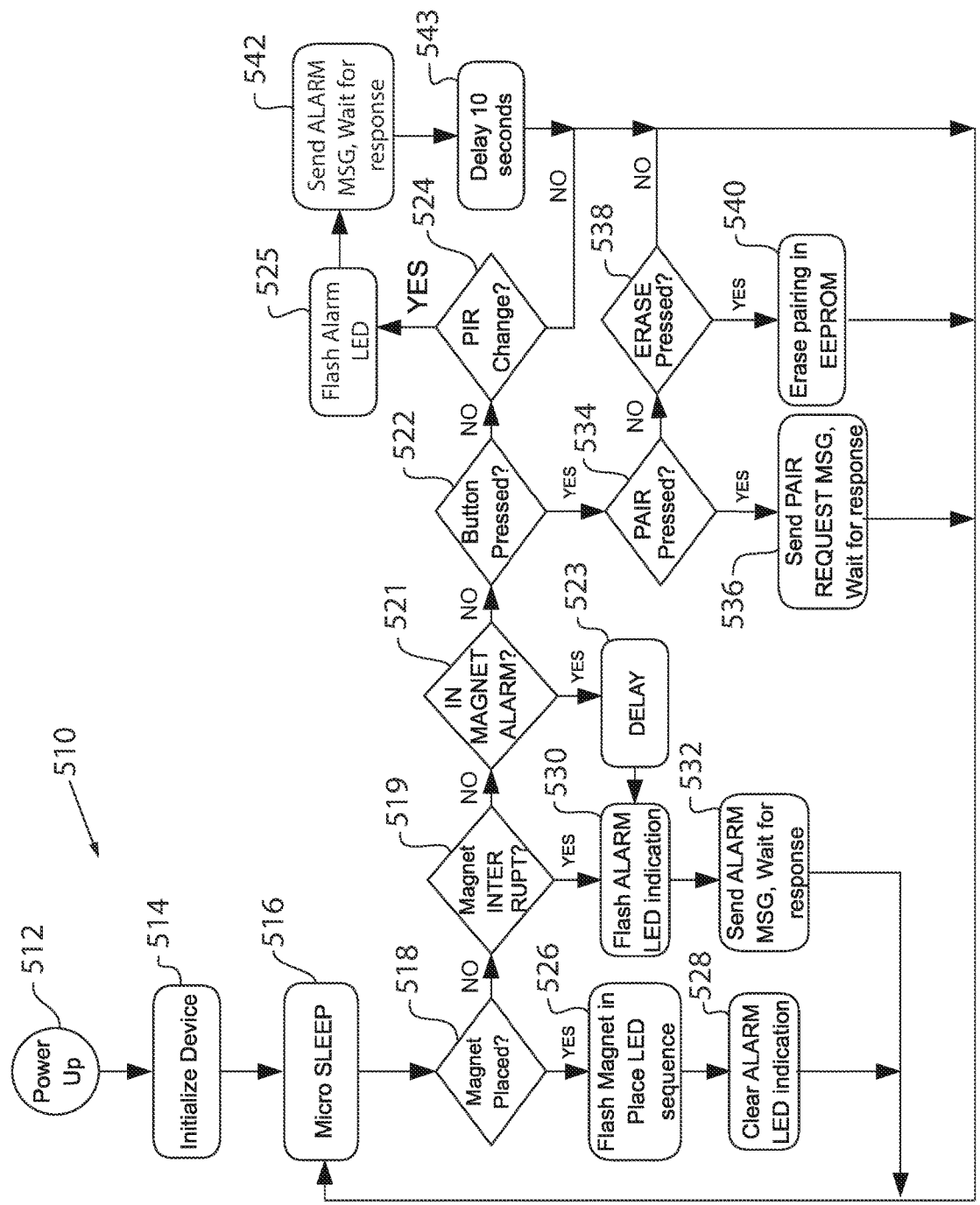

FIG. 3 a top plan view of a second preferred embodiment of a portable hand-held master controller equipped with a pair of light emitting diodes used by master controller to provide user feedback regarding alarm system operation during alarm system operation;

FIG. 4 a top plan view of a third preferred embodiment of another portable hand-held master controller equipped with a display screen that preferably is a touchscreen configured to facilitate user control of alarm system;

FIG. 5 is a top plan view of a preferred embodiment of a circuit board of the master controller;

FIG. 6 is a schematic diagram of a preferred master controller control circuit;

FIG. 7 is a circuit schematic of an electrical power distribution circuit of the master controller used to distribute electrical power to the master controller control circuit;

FIG. 8 is a circuit schematic of a preferred user interface circuit of the master controller depicting a plurality of branches each having switch of each user manipulable control connected in series with a light emitting diode with all of the branches tied together at a processor controlled virtual ground;

FIG. 9 is a circuit schematic of a preferred driver circuit configured to operate higher power consuming user-perceptible indicator(s) of the master controller;

FIG. 10 is a diagram of a first preferred digital data packet and packet format used in wireless messages of the alarm system;

FIG. 11 is a diagram of a second preferred digital data packet and packet format used in wireless messages of the alarm system;

FIG. 12 is a top perspective view of a first preferred embodiment of a sensor-equipped base unit configured for monitoring one or more sensors and causing one of a local and remote alarm to be provided upon base unit detecting occurrence of a sensor detection event where a sensor being monitored by the base unit is triggered;

FIG. 13 is a top perspective view of a preferred base unit control circuit board;

FIG. 14 is a schematic diagram of a preferred base unit control circuit;

FIG. 15 is top front left side perspective view of a second preferred embodiment of a sensor-equipped base unit having an enclosure configured to carry a sensor and also enable the base unit to be stably rested on a flat surface, removably mounted in a receptacle, or fixed to an object;

FIG. 16 is a rear left side perspective view of the base unit of FIG. 15 illustrating a light distributor of the base unit preferably disposed opposite the sensor;

FIG. 17 is a top plan view of the base unit of FIG. 15 with the enclosure substantially transparent for clarity in illustrating assembly and mounting details of the enclosure along with arrangement of components inside the enclosure;

FIG. 18 is an exploded rear right perspective view of the base unit of FIG. 15;

FIG. 19 is a side elevation view of a base unit configured as a fish strike monitor mounted to a fishing apparatus that is an ice fishing tip-up armed ready to alarm when a fish strikes;

FIG. 20 is a top fragmentary enlarged view of the fishing apparatus and fish strike monitor of FIG. 19 illustrating a sensor trigger magnet releasably magnetically seated in a magnetic sensor arming magnet seat ready to be triggered upon sensing a fish strike;

FIG. 21 illustrates a fragmentary top plan view of the fishing apparatus and fish strike monitor of FIG. 19 showing a preferred magnetic sensor arming magnet seat with the trigger magnet seated on the seat;

FIG. 22 is a side elevation view of the fishing apparatus and fish strike monitor of FIG. 19 after being triggered by a fish strike;

FIG. 23 is a fragmentary enlarged perspective view of the fishing apparatus and fish strike monitor after a fish strike has triggered a sensor of the fish strike monitor by unseating the trigger magnet from magnetic sensor arming magnet seat;

FIG. 24 is a first flowchart diagram illustrating a preferred method of master controller operation;

FIG. 25 is a second flowchart diagram illustrating a preferred method of polling mode base unit operation; and FIG. 26 is a third flowchart diagram illustrating a preferred method of non-polling mode base unit operation.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 1:
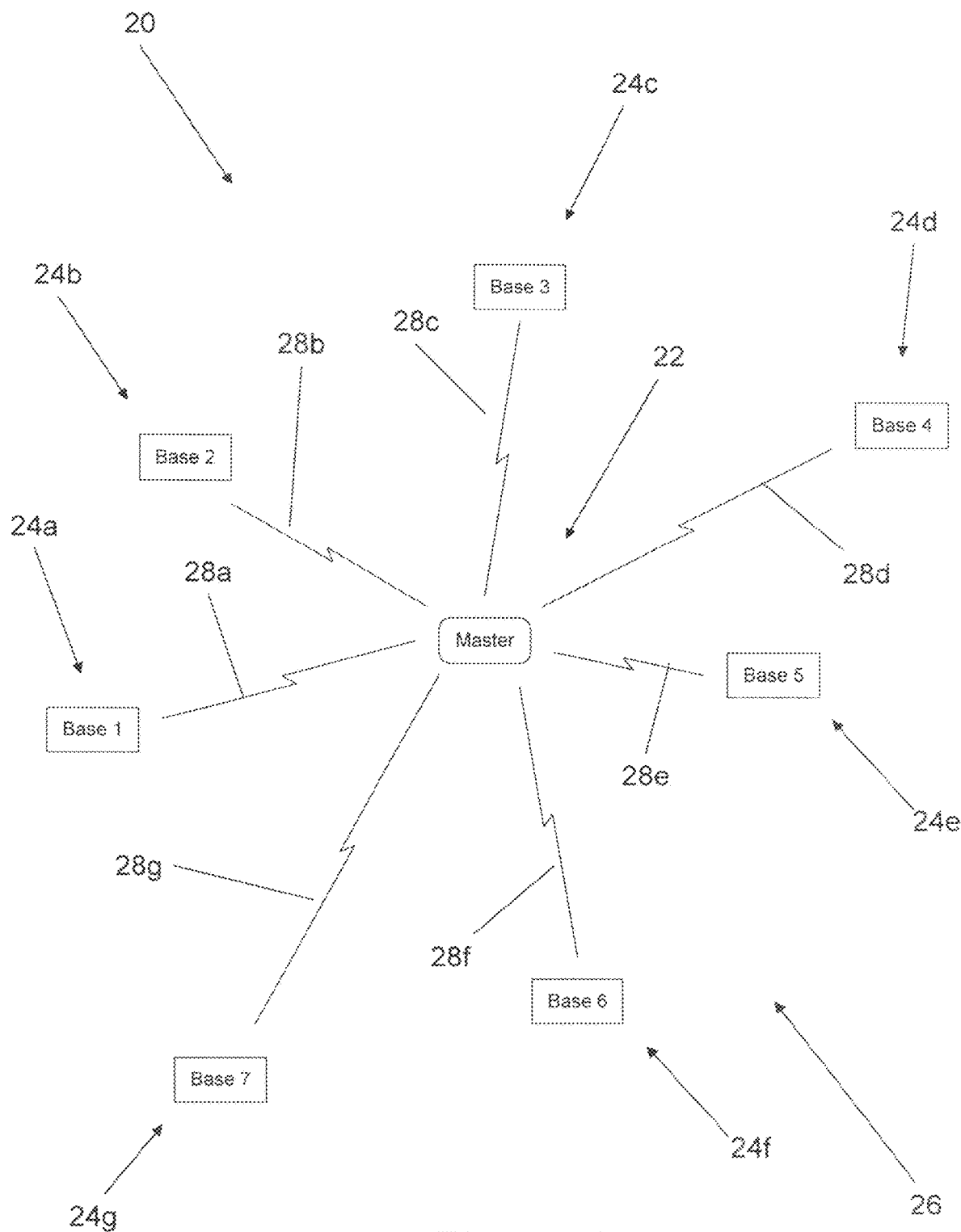
FIG. 1 is a schematic diagram of an alarm system of the present invention formed of a plurality of sensor-equipped remotely located base units paired with a user-operated master controller to form an alarm system network.

FIG. 1 illustrates a schematic diagram of an alarm system 20 constructed in accordance with the present invention that is well suited for use in remote sensing applications, including long range remote sensing applications, including outdoor and cold weather sensing applications. Alarm system 20 has a master controller 22 that wirelessly communicates with at least one sensing base unit 24a, 24b, 24c, 24d, 24e, 24f, or 24g remotely located from the master 22 after being wirelessly paired with the master 22. A plurality of base units 24a, 24b, 24c, 24d, 24e, 24f, and/or 24g can be paired with master 22 to form a wireless network 26 of the alarm system 20 configured such that only paired members 22, 24a, 24b, 24c, 24d, 24e, 24f, and/or 24g of the alarm system 20 can wirelessly communicate with one another.

As discussed in more detail below, master 22 and base units 24a, 24b, 24c, 24d, 24e, 24f, and/or 24g form an alarm system 20 of the present invention that is easy to setup, simple to operate, lightweight, durable, and preferably weatherproof enabling outdoor use. Master 22 and base units 24a, 24b, 24c, 24d, 24e, 24f, and/or 24g use a common wireless communications systems and low bandwidth wireless communications protocol formed of minimal data containing packets to minimize power usage while ensuring reliable long range bidirectional wireless communications between members of network 26 including at distances of greater than 1 mile (1.6 kilometers) therebetween. Master 22 and base units 24a, 24b, 24c, 24d, 24e, 24f, and/or 24g, in particular, are well suited for outdoor, all-weather use being powered by an economical power source, preferably by one or more batteries, operable at below 0° Fahrenheit operating temperatures.

As discussed in more detail below, such an alarm system 20 constructed in accordance with the present invention is not only well suited for many different types of alarm, detecting and monitoring applications, alarm system 20 is particularly well suited for use in outdoor alarm, monitoring and detecting applications, including hunting, fishing, game monitoring, trap and trapline monitoring, bait monitoring and other outdoor alarm, monitoring and detecting applications.

Alarm System Overview

An alarm system 20 constructed in accordance with the present invention has at least one master controller 22 and at least one sensing base unit 24a-24g, each of which preferably is sensor equipped and paired with the master controller 22 in forming wireless alarm system network 26 where each paired base unit 24a-24g communicates via a respective wireless link 28a, 28b, 28c, 28d, 28e and 28f, preferably bidirectional wireless link 28a, 28b, 28c, 28d, 28e and 28f, exclusively only between the paired master controller 22 and each paired base unit 24a-24g during use and operation of alarm system 20. In use, each base unit 24a-24g is placed at a desired location by a person who is a user of the alarm system 20 remote from master 22 that can range in distance from as little as one foot away from master 22 to greater than one mile or even farther from master 22. During alarm system operation, each base unit 24a-24g substantially continuously monitors for occurrence of a sensor detection event, preferably by monitoring for occurrence of an interrupt generated when a sensor detection event occurs, and wirelessly links with master controller 22 sending a wireless sensor detection event message to controller 22 when a sensor detection event interrupt is generated upon occurrence of a sensor detection event.

As discussed in more detail below, sensor detection event message preferably includes data identifying a base unit identifier, e.g. base unit ID, device number, or DEV NUM, of the particular base unit 24a-24g that experienced the sensor detection event thereby enabling master 22 to communicate to user the identity of the particular base unit 24a-24g that transmitted the wireless sensor detection event message. Each base unit 24a-24g can also be configured to wirelessly link with master 22 and communicate other types of messages, including in response to master 22 wirelessly linking with a particular one or more of base units 24a-24g, such as to poll one or more base units 24a-24g in its network 26.

While an alarm system 20 constructed in accordance with the invention can have only a single master controller 22 and only a single base unit, e.g., base unit 24a, alarm system 20 typically has at least one master 22 and at least a plurality of base units 24a-24g paired with the master 22 forming an alarm system network 26 of the present invention. An alarm system 26 of the present invention has at least a plurality of alarm system network members 22, 24a-24g, preferably having at least a plurality of pairs, i.e., at least three, of alarm system network members 22, 24a-24g, paired in a manner that ensures wireless communication from any communicating network member 22 and/or 24a-24g is only acted upon by another network member 22 and/or 24a-24g.

While a preferred alarm system 20 has one master controller 22 and between one and six base units 24a, 24b, 24c, 24d, 24e, and/or 24f, an alarm system 20 in accordance with the present invention can have seven base units 24a-24g, such as depicted in FIG. 1, or even more base units if desired paired as described in more detail herein to form an alarm system network 26 of the present invention. A particularly preferred alarm system 20 is formed of a single master controller 22, at least a plurality of pairs, i.e., at least three, of the base units 24a-24g, and preferably about six base units 24a-24g, paired therewith to produce an alarm system network 26 of the present invention having at least a plurality of pairs, i.e., at least three, of paired members 22, 24 that wirelessly communicate with one another during alarm system and alarm system network operation.

As discussed in more detail below, master controller 22 is configured to output a user-perceptible alarm to alarm system user in the form of a user perceptible indication, e.g., user perceptible output detectable by master controller user, when one of base unit(s) 24a-24g wirelessly signals master 22 occurrence of a detection event experienced by the wirelessly signaling base unit. Such user perceptible output(s) can be and preferably are in the form of one or more of an audible alarm, a vibratory alarm and/or light(s), e.g., LED(s), which can flash or pulse in providing a user perceptible alarm. As also discussed in more detail below, each base unit 24a-24g is operatively connected to at least one sensor and configured to wirelessly signal the master 22 of occurrence of a sensor detection event when the sensor of the signal base unit 24a-24g is triggered.

As also discussed in more detail below, a preferred alarm system 20 employs a master controller 22 which, in one aspect, may be portable, and moreover easily transportable, enabling controller 22 to be carried by user during alarm system operation enabling user to be notified via issuance of sensor detection event alarm outputted by controller 22 upon controller 22 receiving a sensor detection event message from one of the base units 22a-22g. Such a preferred alarm system 20 can and preferably does also employ at least one sensing base unit, e.g., one or more of base units 24a-24g, which also is of portable and preferably of transportable construction enabling such a portable and/or transportable base unit to be moved from place to place and used where needed. As also discussed in more detail below, one preferred sensing base unit embodiment is not just portable and transportable but also configured for removable detachment enabling such a sensing base unit to be removably attached to one of a plurality of devices sought to be monitored by user.

Master Controller

Figure 2:
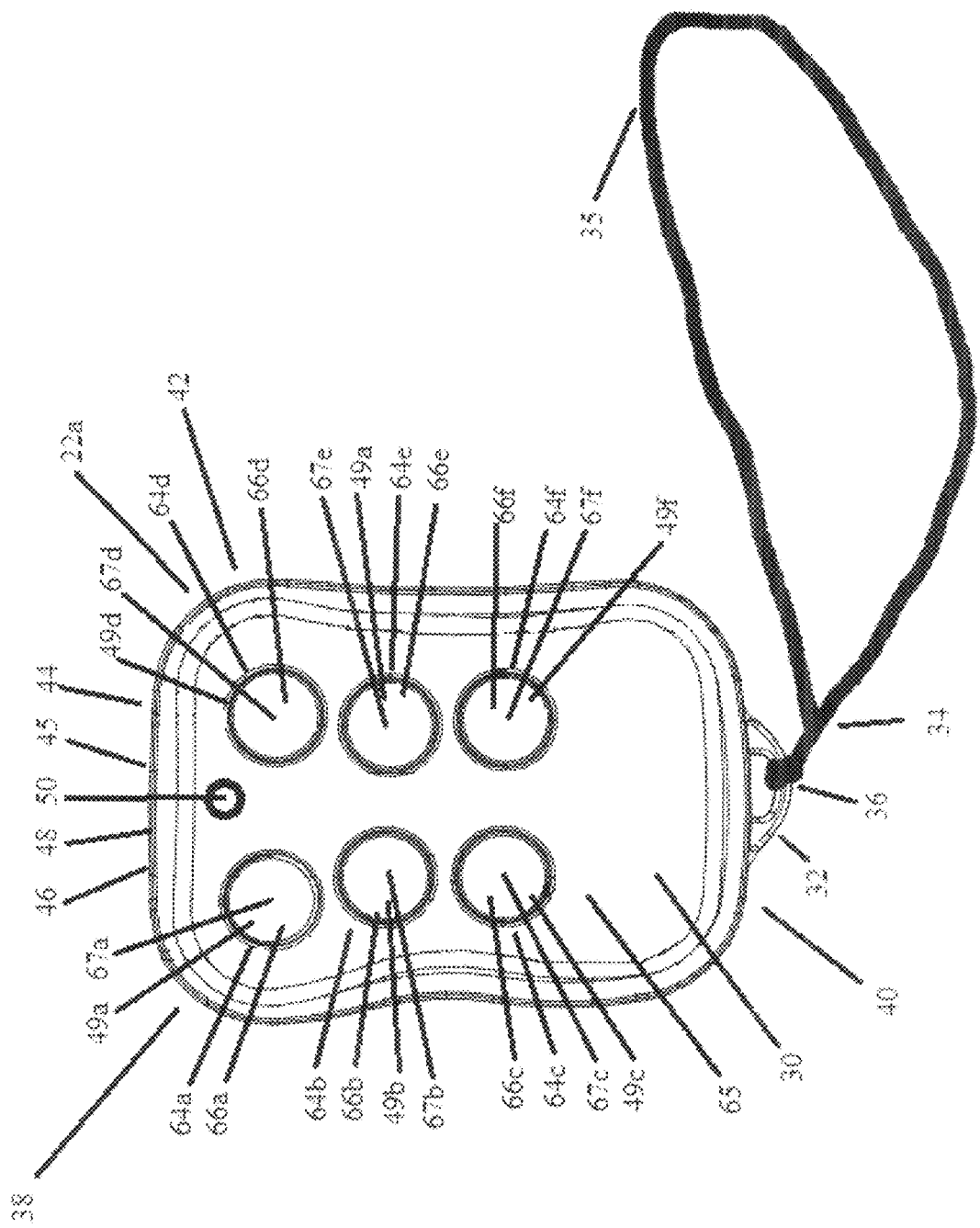
FIG. 2 is top plan view of a first preferred embodiment of a portable master controller of the alarm system equipped with light-up manipulable controls with the master controller configured to be carried on the body of an alarm system user, to provide a user-perceptible alarm upon occurrence of a sensor detection event, and to be operated while being hand held by user.

FIGS. 2-4 illustrate preferred embodiments of a master alarm system controller 22a-22c, constructed in accordance with the present invention, at least one of which preferably is pocket-sized, e.g., has a size small enough to fit in a user's pants pocket, and even more preferably is of hand-held construction, thereby enabling a user of the alarm system 20 to carry master controller 22a-22c on their person or body during alarm system use and operation. To facilitate substantially constant user monitoring of alarm system 20 during alarm system operation, such a master controller 22a-22c preferably is not only portable but transportable as controller 22a-22c preferably is carried by alarm system user, e.g., disposed onboard user, enabling user to be notified by controller 22a-22c substantially simultaneously upon controller 22a-22c receiving sensor detection event message from a base unit 24a-24g experiencing a sensor detection event.

Such a preferred portable and transportable master controller 22a-22c has a housing 30 sized small enough to fit in a hand of the user, e.g., is palm-sized, and can be and preferably is equipped with a connector 32, e.g. mounting loop, to which a body mount 34, preferably an elongate lanyard or strap 35 (FIG. 2), can be and preferably is attached, such as via a coupler 36, e.g. a snap or other type of coupler, enabling controller 22a-22c, to be carried on the person of alarm system user. Such a controller 22a-22c equipped with a body mount 34 preferably is body worn by user during alarm system monitoring by user with the body mount 34, preferably lanyard or strap 35, enabling the controller 22a-22c to be attached around or suspended from a body part, such as neck or wrist, of the user during alarm system monitoring. Controller housing 30 is made of plastic, another type of material, such as preferably a dielectric material, and/or another material capable of permitting radio-wave propagation therethrough, can be of multiple piece construction, such as clamshell construction, which is of snap-fit construction, snap-together construction, and/or assembled using one or more fasteners (not shown).

One such preferred compact controller 22a-22c is not only lightweight, preferably weighing less than about eight ounces, but also can be and preferably is configured as a palm-sized, hand-held, single hand-operated alarm system master controller fob 38 that can be and preferably is body worn by user during monitoring of alarm system 20 by user during use and operation of alarm system 20. In one preferred embodiment, master alarm system controller fob 38 can be configured as a key fob 40 with connector 32 carrying one or more house, vehicle or other keys (not shown) or carrying a ring (not shown) such as of a keychain (not shown) carrying one or more house, vehicle or other keys. If desired, master controller fob 38 and/or 40 can include or be configured with an integral flash memory drive, preferably USB flash drive, on which data can be and preferably is stored pertaining to operation of alarm system 20, including pertaining to operation of controller 22 and/or any one of base units 24a-24g. Such preferred compact controller embodiments shown in FIGS. 2-5 are oblong, e.g., generally rectangular, and palm-sized one or more of which also can be and preferably is configured as a manually operable controller fob 38, including as key fob 40, which is operable by a user using a single hand thereby enabling one-handed control of the alarm system 20 including one-handed pairing with each one of the sensing base units 24a-24g, one-handed polling of each one of the base units 24a-24g, and, in general, one-handed operation of alarm system 20 formed of network 26 of controller 22a-22c, e.g., master controller fob 38 and/or 40, and a plurality of base units 24a-24g. Even when being used as key fob 40, such a controller fob 38 can also be equipped with a body mount 34, e.g., strap or lanyard 35, enabling master controller 22a-22c to be body worn even when also carrying one or more house, vehicle or other keys. Such compact controller embodiments thereby enable user-perception of an alarm issued by controller 22a-22c, including when configured as fob 38 and/or 40, when a sensor detection event message is received by controller 22a-22c from a sensor-triggered base unit 24a-24g of network 26 because controller fob 22a-22c is body carried or even body worn by user during alarm system use and operation.

Master controller 22a-22c has an interface 42, preferably user interface 44, e.g. man-machine interface, that enables an user-perceptible indication, e.g., alarm, to be provided to user when controller 22a-22c is wirelessly activated upon receiving a wireless sensor detection event signal from one of sensor-equipped base units 24a-24g. As discussed in more detail below, interface 42, preferably user interface 44, has at least one user-perceptible indicator driven by controller 22a-22c to provide at least one type of user-perceptible indication, e.g., alarm, upon wireless activation of controller 22a-22c via wireless signal from one of base unit(s) 24a-24g during alarm system operation.

At least one such user-perceptible indicator can be and preferably is a multi-mode user-perceptible indicator with master controller 22a-22c configured to cause indicator to output one type or mode of user-perceptible indication to user upon controller 22a-22c being wirelessly activated, such as by a wireless signal from one of base units 22a-22g, e.g., wireless signal detection event message received from one of base units 22a-22g, and to cause indicator to output another type or mode of user-perceptible indication to user upon occurrence of another event, condition or status, e.g., status change, of controller 22a-22c. In addition, a controller 22a-22c having one or more such user-perceptible indicators usable or configurable as a multi-mode user-perceptible indicator can be and preferably is configured, such as in firmware and/or software, to cause at least one such indicator to provide one type or mode of user-perceptible indication to user upon wireless activation of controller 22a-22c by a first one of base units 24a-24g, and another type or mode of user-perceptible indication to user upon wireless activation by a second one of base units 24a-24g, including when first and second one of the base units wirelessly activate controller 22a-22c at substantially the same time.

Controller 22a-22c can be and preferably is configured, such as in firmware and/or software, to cause one or more such multi-mode user-perceptible indicators to output a first type or mode of user perceptible indication upon controller activation by a first one of the base units 24a-24g, a second type or mode of user perceptible indication upon controller activation by a second one of the base units 24a-24g, and a third type or mode of user perceptible indication upon controller activation due to occurrence of another event, condition or status, e.g., status or condition change, of controller. Controller 22a-22c can be and preferably is further configured, in firmware and/or software, to cause one or more such multi-mode user-perceptible indicators to output a first type or mode of user perceptible indication upon controller activation by a first one of the base units 24a-24g, e.g. due to a wireless sensor detection event message therefrom, a second type or mode of user perceptible indication upon controller activation by a second one of the base units 24a-24g, e.g. due to a wireless sensor detection event message therefrom, and/or a third type or mode of user perceptible indication upon controller activation by a third one of the base units 24a-24g, e.g. due to a wireless sensor detection event message therefrom. Controller 22a-22c can be and preferably is even further configured, in firmware and/or software, to cause one or more such multi-mode user-perceptible indicators to output a first type or mode of user perceptible indication upon controller activation by one of the base units 24a-24g upon occurrence of a first type of event, e.g. occurrence of sensor detection event, a second type or mode of user perceptible indication upon controller activation by a one of the base units 24a-24g upon occurrence of a second type of event, e.g. occurrence of battery power low event requiring base unit battery replacement, and/or a third type or mode of user perceptible indication upon controller activation by one of the base units 24a-24g upon occurrence of a third type of event, e.g., occurrence of a reset-requiring event requiring user to reset the base unit activating controller.

FIG. 2 illustrates a first embodiment of master controller 22a that can be equipped with a user-perceptible indicator 46 that is a user visually-perceptible indicator 48, such as a light or lamp, e.g., a light emitting diode (LED) 50, which can form part of user interface 44, such as by forming part of a display interface 45, of master controller 22a. FIG. 3 illustrates a second embodiment of master controller 22b that can be equipped with a plurality of spaced-apart user-perceptible indicators 46, 52, each of which preferably is a visually-perceptible indicator 48, such as a light or lamp, e.g., LEDs 50a, 50b, one or both of which can form part of display interface 45' of controller 22b. FIG. 4 illustrates a third embodiment of master controller 22c that can be equipped with a plurality of different types of user-perceptible indicators 46, 60 with one of the indicators 46 being one type of visually-perceptible indicator 48, such as a light or lamp, e.g. LED(s) 50a and/or 50b, and another one of the indicators 60 being another type of visually perceptible indicator 61 that preferably is a display 54, such as a display screen 56, which can be a touchscreen 58, which can individually or collectively form part or all of display interface 45" of controller 22c.

Where equipped with LED 50a and/or 50b, master controller 22a and/or 22b can be configured in firmware and/or software to drive and thereby energize each LED 50a and/or 50b to (a) provide an indication of master controller operational status, e.g., master controller power on state, (b) provide an indication of base unit operational status, e.g., base unit power state, (c) provide an indication whether a particular polled base unit 24a-24f is located within wireless communication range of master controller 22a-22c, e.g., base unit polling state, (d) provide a visually-perceptible indication when a wireless sensor detection event message has been received from one of base units 24a-24f, e.g., (e) provide visually-perceptible alarm to user of occurrence of sensor detection event, and/or (f) provide a user visually-perceptible indication of occurrence of another event, status or condition of alarm system 20, including a change thereto. Where master controller 22a-22c is configured to drive and thereby energize one or more of LEDs 50a and/or 50b to provide user with a visually-perceptible indication in accordance with any one of (a)-(f) above, controller 22a-22c can be further configured in firmware and/or software to cause each LED 50a and/or 50b to correspondingly turn on, light up, flash, pulse, change brightness, change intensity, and/or change color providing user with a user-perceptible indication, e.g., alarm, of occurrence of corresponding (a)-(f).

Where master controller 22c is equipped with an onboard display 54 that includes a display screen 56 that can be a touchscreen 58, controller 22c is configured in firmware or software to cause display 54 to display at least one of one or more visually-perceptible messages, e.g., message(s) formed of ASCII characters, one or more visually-perceptible icons, one or more visually-perceptible symbols, one or more visually-perceptible graphics, one or more visually-perceptible images, one or more visually-perceptible pictures or any combination thereof upon controller 22c being activated by an alarm-initiating event, such as by being wirelessly activated by one of base units 24a-24g, such as upon occurrence of a sensor detection event. Where controller 22c is equipped with display 54, e.g. display screen 56 and/or touch-screen 58, controller 22c preferably is configured, including in software and/or firmware, to operate display 56 as a user visually-perceptible indicator 61 in a manner able to provide one of at least a plurality, preferably at least a plurality of pairs, i.e., at least three, of unique visually-perceptible indication(s) when one or more of base units 24a-24g has transmitted a wireless message communicating to controller 22c one or more of (a) occurrence of a sensor detection event experienced by messaging base unit, (b) a request for user inspection of the messaging base unit, e.g., transmitting base unit needs battery replacement or recharge, (c) a request for the messaging base unit to be reset, (d) of a notification of a change in condition or status of messaging base unit and/or (e) an indication that a base unit 24a-24f is still in wireless communications range with controller 22 including when the base unit 24a-24f is polled by controller 22. Where equipped with display 54, display 54 preferably is configured to visually shown at least one of a message, e.g., formed of one or more characters, e.g., ASCII characters, an icon or plurality of icons, a symbol or plurality of symbols, a picture or pictures, a graphic or plurality of graphics, a combination thereof, and/or another type of visually displayable indicia, indication or message visually perceptible by user being able to see same during master controller use and operation including during occurrence of any one or more of (a)-(d) described above. Where equipped with such a display 54, e.g., display screen 56 and/or touch screen 58, controller 22c can be in the form of a smart phone, tablet, laptop, personal computer, personal-digital-assistant, or another processor-equipped electronic device capable of wireless communication, including wireless pairing, with one or more of base units 24a-24g and configured, including in software and/or firmware, to operate in accordance with that described herein pertaining to master controller 22a-22c. In one aspect, one or more other communication mechanisms may also be advantageously utilized, such as Bluetooth, Bluetooth LE and/or Wi-Fi. In addition, a smart phone, tablet or other mobile computing device could be wirelessly connected to the system to provide a display and/or other I/O.

Where controller 22a-22c is a dedicated or standalone controller like that shown in FIGS. 2-5, controller 22a-22c preferably is equipped with an interface 42 that is a user interface 44 that includes a hardware interface 62 formed of at least a plurality, preferably at least a plurality of pairs, i.e., at least three, of user-manipulable controls 64a, 64b, 64c, 64d, 64e, and/or 64f each preferably manipulable by a hand of user while holding controller 22a-22c in that same manipulating hand including while controller 22a-22c is body-worn or carried on the person of user. Each manipulable control 64a, 64b, 64c, 64d, 64e and/or 64f can include or be formed of a respective button 66a, 66b, 66c, 66d, 66e and/or 66f, which can be of depressible construction. Each manipulable control 64a, 64b, 64c, 64d, 64e and/or 64f preferably also includes a corresponding control-disposed visually-perceptible indicator 49a, 49b, 49c, 49d, 49e and/or 49f carried by or disposed onboard respective control 64a, 64b, 64c, 64d, 64e, and/or 64f. Where each control 64a, 64b, 64c, 64d, 64e, and/or 64f is formed of or includes a corresponding button 66a, 66b, 66c, 66d, 66e and/or 66f, each button 66a, 66b, 66c, 66d, 66e and/or 66f includes a corresponding control-disposed visually-perceptible indicator 49a, 49b, 49c, 49d, 49e and/or 49f carried by or disposed onboard respective control button 66a, 66b, 66c, 66d, 66e and/or 66f. Such user-manipulable controls 64a-64f can be and preferably is part of an onboard keyboard or keypad 65 of controller 22a-22c that can be a membrane type keyboard or keypad. In one aspect, a clear switch membrane type keyboard or keypad may be used so that an illuminated LED may be visible beneath the membrane.

Where master controller is not a dedicated or standalone master controller 22a-22c like the embodiments shown in FIGS. 2-5, master controller can be implemented in firmware and/or software, including as a master controller app, operable using a smart phone, personal digital assistant, tablet, laptop computer, personal computer, or another processor-equipped electronic device with such controls 64a-64f formed of or from part of a keypad or keyboard thereof. Where such a processor-equipped electronic device is equipped with a display that is or includes a touch screen, such a master controller can be configured in firmware and/or software, including as a master controller app, operable using a smart phone, personal digital assistant, tablet, laptop computer, personal computer, or another processor-equipped electronic device with such controls 64a-64f configured in firmware and/or software to be provided to master controller user via touchscreen.

If desired, controller 22a-22c can have one or more other types of user perceptible indicators, including an audibly-perceptible indicator 72 (FIG. 6), e.g. audible indicator 72, a tactile-perceptible indicator 78 (FIG. 6), e.g. tactile indicator 78, or both an audibly-perceptible indicator 72 and a tactile-perceptible indicator 78 in addition to or instead of the one or more aforementioned visually-perceptible indicators with such indicators 72 and/or 78, where present, forming at least part of user interface 44. Where controller 22a-22c has an audibly-perceptible indicator 72, indicator 72 preferably is an audible transducer 74, such as in the form of a speaker or more preferably a buzzer 76, preferably disposed onboard controller 22a-22c and which provides an audible alarm that a user carrying controller 22a-22c can hear when indicator 72 is driven by controller 22a-22c, such as in response to a sensor detection event message received by controller. Where controller 22a-22c has a tactile-perceptible indicator 78, indicator 78 preferably is a vibrating transducer 79, such as a vibrator 80, e.g. rotary or linear oscillating vibrator, disposed onboard controller 22a-22c and which provides a tactile alarm, e.g., vibrating alarm, that a user carrying controller 22a-22c can feel when indicator 78 is driven by controller 22a-22c, such as in response to receipt of a sensor detection event message.

If desired, master controller 22a-22c can have a plurality of different types of user perceptible indicators 46, 52 and/or 60 with at least one type being a visually perceptible indicator, e.g., visually perceptible indicator(s) 48, 49a-49f, and/or 61 user can see, and another type being an audibly-perceptible indicator 72 (FIG. 6), such as audible transducer 74, e.g., buzzer 76, which provides an audible alarm user can hear, and/or a tactile-perceptible indicator 78 (FIG. 6), e.g., vibrator 80, which provides a vibrating alarm the user can feel. Preferably, user can hear audibly-perceptible indicator 72 when such an audibly-perceptible indicator equipped master controller 22a-22c is hung on body or person of user using body mount 34. Preferably, user can feel tactile-perceptible indicator 78 when such a tactile-perceptible indicator equipped controller 22a-22c is hung on body or person of user using body mount 34.

In a preferred embodiment, controller 22a-22c has at least a plurality of user perceptible indicators 46, 52 and/or 60 disposed onboard the master 22a-22c with at least one of the user-perceptible indicators being a visually-perceptible indicator, e.g., one or more of visually-perceptible indicators 48, 49a-49f, and/or 61, and at least one of the other user-perceptible indicators being either an audibly-perceptible indicator 72, a tactile-perceptible indicator 78, both an audibly-perceptible indicator 72 and a tactile-perceptible indicator 78, or another type of indicator suitable for use in generating a user-perceptible alarm. In one such preferred embodiment, controller 22a-22c has at least a plurality of pairs, i.e., at least three, different types of user-perceptible indicators with a first one of the user-perceptible indicators being a visually-perceptible indicator, e.g., one or more of visually-perceptible indicators 48, 49a-49f, and/or 61, a second one of the user-perceptible indicators being an audibly-perceptible indicator 72, and a third one of the user-perceptible indicators being a tactile-perceptible indicator 78.

Master controller 22a-22c can be configured in firmware or software to operate at least one visually-perceptible indicator, such as light or lamp, preferably visually-perceptible indicator(s) 48, 49a-49f, and/or 61, e.g., LED(s) 50a, 50b, 67a, 67b, 67c, 67d, 67e and/or 67f, as a multi-mode indicator driven by controller 22a-22c energizing visually-perceptible indicator(s) 48, 49a-49f, and/or 61 to output a first one of a plurality of different brightness(es), lumen(s) output levels, lighting patterns, flashing patterns, colors, color patters, pulses, pulse patterns, and/or combination(s) thereof in a first mode and a second one of a plurality of different brightness(es), lumen(s) output levels, lighting patterns, flashing patterns, colors, color patters, pulses, pulse patterns, and/or combination(s) thereof in a second mode. Controller 22a-22c can be configured to drive at least one such visually-perceptible indicator 48, 49a-49f, and/or 61, in a plurality of pairs, i.e., at least three, modes, where indicator(s) 48, 49a-49f, and/or 61 output(s) one of a plurality of pairs, i.e., at least three, of different colors, flashing patterns, and/or brightness(es) or lumen(s) output levels that provide a plurality of pairs, i.e., at least three, different visually perceptible indicator modes.

Master Controller Circuitry

FIGS. 5-6 illustrate a preferred but exemplary control circuit 82 of master controller 22a-22c with FIG. 5 illustrating an implementation of the control circuit 82 on a circuit board 71 and FIG. 6 providing a diagram of circuit 82. FIG. 7 illustrates sub-circuits of control circuit 82 that includes a preferred but exemplary electrical power supply circuit 87 that preferably can and does has a battery protection circuit 100 and/or an electrical power distribution circuit 106 as discussed in more detail below. FIG. 8 illustrates another sub-circuit of control circuit 82 that is a user manipulable control and user-perceptible display interface circuit 89 that provides or helps provide at least a portion of user interface 44 including at least a portion of hardware interface 62 and/or display interface 45 of master controller 22a-22c as also discussed in more detail below. FIG. 9 illustrates a preferred but exemplary embodiment of a user-perceptible indicator driver circuit 132 used to drive one or more user perceptible indicators, such as buzzer 76 and/or vibrator 80, which have higher electrical power requirements as also discussed in more detail below.

Control circuit 82 has a processor 84 in electrical communication with various electrical components, including electrical components of user interface 44, of hardware interface 62 and/or of display interface 45, as well as with a two-way wireless communication system 86, and source of electrical power 88, all of which are preferably enclosed within the housing 30 of master controller 22*a*-22*c*. As reiterated throughout, base units 24*a*-24*g* are also equipped with a similar control circuit as discussed in more detail below that preferably includes the same or substantially the same wireless communication system 86, electrical power supply circuit 87 and/or user-perceptible indicator driver circuit 132.

Master controller processor 84 is electrically connected to a two-way wireless communications system 86 disposed onboard controller 22*a*-22*c*, e.g., located within controller housing 30, with a preferred communications system 86 having a wireless receiver 90 electrically connected to an antenna 96 enabling wireless messages from one of base units 24*a*-24*g* to be received. Wireless receiver 90 preferably is a wireless transceiver 91, e.g., radio 92, electrically connected by receive-transmit switch 94, e.g. RX/TX switch, to antenna 96 enabling bi-directional wireless communications between controller 22*a*-22*c* and any of base units 24*a*-24*g*. In order to help produce a compact, pocket-sized hand-held controller 22*a*-22*c* in accordance with the present invention, antenna 96 is disposed onboard controller 22*a*-22*c* such as by being housed within, carried by, or integrally formed as part of controller housing 30. While antenna 96 can be a wire antenna, telescoping antenna or another type of antenna, antenna 96 preferably is mounted to circuit board 71 and can be integrally formed therewith if desired. As discussed in more detail below, one preferred antenna 96 well suited for wireless communication system use is a chip antenna, antenna integrated circuit, ceramic chip antenna, or the like mounted to circuit board 71.

With additional reference to an electrical power supply circuit 87 shown in FIG. 7 used to supply and distribute electrical power to control circuit 82, power source 88 preferably is disposed onboard controller 22*a*-22*c* and includes at least one battery 98 (FIG. 6) and preferably includes a plurality of batteries 98*a*, 98*b* (FIG. 7), arranged in series to provide a master controller power supply battery voltage, $V_{BAT}$, of three volts direct current. Batteries 98*a*, 98*b* are releasably retained a battery holder, such as by battery holder clips (not shown) mounted to the side of circuit board 71 opposite that shown in FIG. 5. Each battery 98*a*, 98*b* can be a disposable battery, such as an alkaline battery, can be a rechargeable battery, such as a nickel metal-hydride or a lithium battery, or can be another type of battery, such as a super-capacitor. Each battery 98*a*, 98*b* can be a D-cell battery, C-cell battery, AA-cell battery, AAA-cell battery or another suitable commercially available battery capable of supplying suitable electrical power to operate controller 22*a*-22*c*. Where low temperature, e.g., outdoor, operation is contemplated, each battery 98*a*, 98*b* preferably is an alkaline battery, a low temperature lithium battery, e.g., lithium titanate, or another suitable low temperature battery, capable of providing sufficient electrical power to operate controller 22*a*-22*c* at a temperature less than zero degrees Fahrenheit and preferably less than minus ten degrees Fahrenheit. In a preferred controller embodiment, each battery 98*a*, 98*b* preferably is an AAA alkaline battery as use of such smaller sized batteries helps enable such a compact-sized lightweight body-carried or body-worn controller 22*a*-22*c* in accordance with that discussed above to be produced.

With continued reference to FIG. 7, to minimize power use, prevent circuit damage, and optimize battery life, electrical power supply circuit 87 includes a battery protection circuit 100, schematically depicted in FIG. 7, which substantially completely prevents current flow if one, the other, or both batteries 98*a*, 98*b* are installed improperly, e.g., backwards, such as where one or both batteries 98*a*, 98*b* are installed their positive and negative battery terminals connected opposite what they should be. Battery protection circuit 100 employs a transistor 102, preferably a metal-oxide-semiconductor field effect transistor (MOSFET), more preferably a P-channel MOSFET, even more preferably a depletion-mode P-channel MOSFET 104, as a battery protection switch 103 connected between the batteries 98*a*, 98*b* and an electrical load of control circuit 82, e.g., electrical load of master controller 22*a*-22*c*, which includes at least processor 84 and wireless communications system 86. Master controller circuit load can further include the load from electrical components of master controller interface 42, including onboard electrical components of display interface 45, e.g., each onboard visually-perceptible indicator 48, 49*a*-49*f*, and/or 61, and/or hardware interface 62, e.g. manipulable controls 64*a*-64*f*, e.g., manipulable control buttons 66*a*-66*f*, as well as any other onboard electric power consuming user-perceptible indicators 46, 52, 60, 72 and/or 78.

In battery protection circuit 100 shown in FIG. 7, battery protection switch 103, preferably MOSFET 104, is connected between the positive side, $V_{BAT}$, of batteries 98*a*, 98*b* and supply voltage, $V_{DD}$, of control circuit 82. Battery protection switch 103 is also connected by a battery protection switching resistor 105 to ground, GND, which biases battery protection switch 103 to be turned on allowing electrical current flow from $V_{BAT}$ to $V_{DD}$ thereby powering circuit 82 when batteries 98*a*, 98*b* are properly connected and biasing battery protection switch 103 off blocking current flow $V_{BAT}$ to $V_{DD}$ when batteries are improperly connected thereby advantageously protecting circuit 82.

In a preferred battery protection circuit 100 employing a MOSFET that preferably is a P-channel MOSFET 104 as a battery protection switch 103, the drain of MOSFET 104 is electrically connected to the positive side, $V_{BAT}$, of batteries 98*a*, 98*b* and the source of battery protection switch MOSFET 104 is electrically connected to the supply side, $V_{DD}$, of control circuit 82 upstream of electrical load of circuit 82 normally powered when batteries 98*a*, 98*b* are properly inserted. Gate of MOSFET 104 is a switching terminal of battery protection switch MOSFET 104 connected by battery protection switching resistor 105 to ground, GND, producing a positive biasing voltage at the gate sufficient to turn MOSFET 104 on enabling $V_{DD}$ to power control circuit 82 when the batteries are properly connected. When batteries 98*a*, 98*b*, are improperly connected, either no biasing voltage or a negative biasing voltage present at the gate keeps MOSFET 104 switched off blocking any current flow from either battery 98*a*, 98*b* thereby protecting circuit 82 by preventing any current flow to $V_{DD}$ thereby blocking current flow to any part or electrical component of circuit 82. Such a battery protection switching resistor 105 is large enough, preferably at least about 1 million ohms, to produce a biasing voltage sufficient to bias MOSFET 104 on when batteries 98*a*, 98*b* are properly connected. Such a battery protection circuit 100 advantageously imparts minimal, preferably virtually no, electrical load on circuit 82 when batteries 98*a*, 98*b*, are properly connected and circuit 82 is powered up and which substantially immediately prevents virtually any current flow in a direction opposite desired current flow when batteries 98*a*, 98*b* are improperly connected substantially immediately protecting circuit 82 from damage.

When batteries 98*a*, 98*b* are connected correctly to control circuit 82, the gate of P-Channel MOSFET 104 is hooked to ground, GND, such that there is about zero volts at the gate and substantially full battery output voltage, e.g.

about three volts DC using two series-connected AAA batteries 98a, 98b, at the drain of MOSFET 104 which turns on switch 102 switching on MOSFET 104 thereby powering the circuit 82. However if one or both batteries 98a, 98b are inserted backwards, e.g., electrically connected backwards, there will be voltage, e.g. up to three volts DC with both batteries 98a, 98b connected backwards, at the gate of MOSFET 104 and about zero volts at the drain of MOSFET 104 turning off switch 102 by switching off MOSFET 104 thereby preventing any electrical power from any improperly connected battery 98a, 98b to be delivered to circuit 82 advantageously protecting circuit 82.

In a preferred control circuit 82, electrical power from batteries 98a, 98b is split by a power distribution circuit 106 via a ferrite bead 107, preferably a 1000 ohm ferrite bead, between one or first control circuit supply voltage, $V_{DD}$, and another or second control circuit supply voltage, $V_{DD\_RF}$. In a preferred power distribution circuit 106, $V_{DD}$ is upstream of ferrite power splitting bead 107 and connected to ground, GND, via a first capacitor 109 and downstream of bead 107 and connected to ground, GND, via second capacitor 111. When batteries 98a, 98b are connected correctly and P-Channel MOSFET 104 switched on powering control circuit 82, electrical power from batteries 98a, 98b is split by ferrite bead 107 between $V_{DD}$ and $V_{DD\_RF}$ with $V_{DD\_RF}$ electrically powering and/or biasing the wireless communication system 86 and $V_{DD}$ electrically powering and/or biasing the rest of the electrical components of control circuit 82 including processor 84.

A control circuit 82 equipped with such a battery protection circuit 100 that employs battery protection switch 103, e.g., transistor switch 102, preferably P-Channel MOSFET 104, advantageously minimally loads batteries 98a, 98b and circuit 82 during normal controller operation wasting virtually no battery power as compared to conventional diode-based battery protection circuits. In comparison to battery protection circuit 100 of the present invention, conventional battery protection circuits using only a conventional diode to block current flow in the opposite direction when batteries are improperly connected surprisingly undesirably waste considerable power when batteries are properly connected as a result of the diode imparting a significant load and producing a relatively large voltage drop between $V_{BAT}$ and $V_{DD}$ during normal operation.

As discussed in more detail below, each base unit 24a-24f preferably also is equipped with such an electrical power supply circuit 87 that also preferably includes battery protection circuit 100 and can and preferably does also include electrical power distribution circuit 106 two split the electrical power between a plurality of branches or sub-circuits of control circuit 82. As discussed in more detail below, each base unit 24a-24f preferably is powered by a plurality of AA alkaline batteries to provide even greater battery life including during periods of unattended operation.

With reference once again to FIG. 6, when batteries 98a, 98b are properly connected and control circuit 82 is powered up, processor 84 communicates with data storage 108, preferably in the form of memory 110, e.g., flash memory, programmable read only memory (PROM), erasable programmable read only memory (EPROM or EEPROM), and/or random access memory (RAM), located onboard master controller 22a-22c. Data storage 108, preferably onboard memory 110, holds software and/or firmware executed by processor 84 during master controller operation that configures and controls operation of master controller 22a-22c during alarm system operation. Processor 84 preferably is a microcontroller 112 with memory 110 onboard the microcontroller 112 holding master controller firmware or software configured with a preferred method of master controller operation in accordance with that described in more detail below that is executed by microcontroller 112 during master controller operation controlling operation of master controller 22a-22c as part of carrying out alarm system operation. While processor 84, preferably microcontroller 112, can use an onboard clock, e.g., internal oscillator, an external oscillator, such as a 32 kilohertz oscillator crystal, which can be temperature compensated, e.g., TXCO, if desired, can be and preferably is used as processor clock. Use of such a more precise external clock advantageously helps facilitate more precise communications timing during sending and receipt of wireless messages to and from base units 24a-24f. A preferred processor 84 is a low-power power microcontroller 112 of at least 16-bit architecture, preferably is of at least 32-bit architecture, with a particularly preferred processor 84 being a 32-bit reduced instruction set processor such as an ARM processor or microcontroller, such as an ARM Cortex-M type core microcontroller unit, preferably an ARM Cortex-M3 microcontroller, equipped with onboard flash memory and onboard RAM. If desired, a 64-bit or larger processor, e.g., microcontroller, can also be used.

Control circuit 82 preferably includes at least one user-perceptible indicator 46, 52, 60, 61, 72 and/or 78, such as one or more visually-perceptible indicators 48 and/or 52, e.g., one or more indicator LEDs 50a and/or 50b, and preferably includes a corresponding visually-perceptible indicator 49a-49f, e.g., LEDs 67a-67f, for each control 64a-64f all of which are preferably disposed onboard the master controller 22a-22c, such as by being anchored, e.g., mounted, to circuit board 71, carried by controller housing 30 and/or disposed, e.g., housed, within controller housing 30. Processor 84 preferably is electrically connected to at least one and preferably is electrically connected to each user-perceptible indicator of user interface 44 with processor 84 configured, such as in firmware and/or software, to drive and preferably activate, e.g., energize, one or more user-perceptible indicators when processor 84 determines radio 90 received a wireless message from one of base units 24a-24g configured to cause activation, e.g., energizing, thereof.

With reference to FIG. 6, processor 84 is electrically connected to user interface 44 and preferably therefore also is connected to both display interface 46 and hardware interface 62 of controller 22a-22c. Processor 84 is electrically connected to at least part of hardware interface 62 of user interface 44, including preferably by being electrically connected to user controls 64a-64f onboard controller 22a-22c.

As is best shown in FIGS. 2-5 and 8, manipulable controls 64a-64f of master controller 22a-22c include and preferably are provided by corresponding onboard user-manipulable electrical switches 70a, 70b, 70c, 70d, 70e, and 70f electrically connected to processor 84 which preferably also forms part of user manipulable control and user-perceptible display interface circuit 89 depicted in FIG. 8. Each one of switches 70a-70f can be a normally open pushbutton switch, such as a normally open tactile pushbutton switch, each of which provides a user-controlled input to processor 84 when corresponding control 64a-64f is manipulated by user, such as by user pressing associated button 66a-66f thereby closing corresponding switch 70a-70f. As also shown in FIGS. 2-5, disposed at or adjacent each switch 70a-70f is a corresponding visually-perceptible user-manipulable control-disposed user-perceptible indicator 49a-49f that preferably is an LED 67a-67f as discussed in more detail below.

Where each visually-perceptible user-manipulable control-disposed display 49a-49f is an LED 67a-67f, there preferably also is a corresponding current limiting resistor 69a-67f in series with each LED 67a-67f connected as shown in FIG. 8 between each LED 67a-67f and an electrical ground. As shown in the control and display interface circuit 89 of master controller 22a-22c shown in FIG. 8, each control-disposed user-perceptible indicator 49a-49f preferably is a corresponding LED 67a-67f that is connected in series with corresponding switch 70a-70f in turn connected to a control circuit supply voltage, $V_{DD}$, and also connected in series with respective pull down resistor 69a-69f to a ground that preferably is a node ground 73, LED GND 73, provided by a net tied to processor 84 with processor 84 configured to drive pull down resistors 69a-69f high or low to turn on or off respective LED 67a-67f when corresponding button 66a-66f is pushed closing associated switch 70a-70f. This enables processor 84 to be configured to turn on or turn off the LED 67a-67f corresponding to the switch 70a-70f closed when button 66a-66f associated with switch 70a-70f is pressed by master controller user. Since the LEDs 67a-67f are tied to a ground that is not the ground, GND, of control circuit 82 and its circuit board 71 but rather an active ground, LED GND 73, tied to a node or pin of processor 84 configured to provide ground, LED GND, configurable in processor firmware and/or software to be driven high or low depending on whether processor 84 is to light up or keep turned off LED 67a-67f connected to switch 70a-70f closed when button 66a-66f which operates the switch 70a-70f is pressed. While the switch 70a-70f and LED 67a-67f of each manipulable control 64a-64f can be formed of discrete or separate components, such as is depicted in FIG. 5, manipulable controls 64a-64f can be formed of a keyboard or keypad like keypad 65 depicted in FIGS. 2-4 but which is a membrane-type keypad where each switch 70a-70f is a membrane type switch and each LED 67a-67f is integral with corresponding switch 70a-70f so as to be part of the membrane-type keypad. In one aspect of the invention, a clear switch membrane type keyboard or keypad may be used so that an illuminated LED may be visible beneath the membrane.

Although not shown, in a preferred master controller and control circuit embodiment, each LED 67a-67f can be and preferably is independently electrically connected to processor 84 such as by preferably being respectively connected to a corresponding one or more control lines, e.g., I/O ports or pins, of processor 84 enabling processor 84 to drive, e.g., light up and/or flash, any particular one or more of LED(s) 67a-67f upon occurrence of a condition, event, or the like. In such a preferred embodiment, each LED 67a-67f shown in FIG. 8 is tied to common LED GND 73 at one end and electrically connected at its opposite end to a corresponding one of a plurality of control line(s), e.g., I/O port(s) or pin(s), preferably connected to its own control line, e.g., its own I/O port or pin, of processor 84. In another such embodiment, each LED 67a-67f shown in FIG. 8 is tied to ground, GND, of master controller control circuit board 71 at one end and electrically connected at opposite end to a corresponding one of a plurality of control line(s), e.g., I/O port(s) or pin(s), preferably connected to its own control line, e.g., its own I/O port or pin, of processor 84. In either embodiment, such a sub-circuit of control circuit, e.g., control circuit 82, of master controller 22a-22c, which enables LED(s) 67a-67f to be independently or separately driven preferably also includes a corresponding pull down resistor 69a-69f in series with respective LED 67a-67f.

In a preferred embodiment, each corresponding LED 67a-67f of manipulable control 64a-64f preferably is electrically connected to processor 84 separately or independently of switches 70a-70f, with a first LED 67a electrically connected to a first control line (not shown), e.g., I/O port or pin, of processor 84, a second LED 67b electrically connected to a second control line (not shown), e.g., I/O port or pin, of processor 84, a third LED 67c electrically connected to a third control line (not shown), e.g., I/O port or pin, of processor 84, a fourth LED 67d electrically connected to a fourth control line (not shown), e.g., I/O port or pin, of processor 84, a fifth LED 67e electrically connected to a fifth control line (not shown), e.g., I/O port or pin, of processor 84, and a sixth LED 67f electrically connected to a sixth control line (not shown), e.g., I/O port or pin, of processor 84. Where a master controller has more than six such LED-equipped user manipulable controls, e.g., more than six LED-disposed buttons, each such additional LED of each such additional control or button can also be separately or independently connected to its own control line, e.g., I/O port or pin, of processor 84, if desired. Of course, if the number of control lines of processor 84 is too few or otherwise limited, each one of LEDs 67a-67f can be electrically connected to a multiplexer (not shown) which is in turn connected to one or more control pines of processor 84 with processor 84 configured in firmware or software to direct via multiplexer to drive any one or more of LED(s) 67a-67f independently or separately of circuit 89 shown in FIG. 8. Such a sub-circuit (not shown) of a control circuit of master controller 22a-22c enables processor 84 to be configured in firmware and/or software to selectively drive one or more of the LED(s) 67a-67f individually, sequentially, sequentially, or substantially simultaneously in accordance with a firmware and/or software configuration of processor 84 in providing powered up/on status, during polling, and/or during wireless linking with one or more base unit(s) 24a-24f including when transmitting a wireless sensor detection event message to controller 22a-22c.

Processor 84 preferably is configured in firmware and/or software to drive the LED 67a-67f of manipulable control 64a-64f, preferably button 66a-66f, corresponding to a device identifier, preferably device number or DEV NUM, of the particular sensor base unit 24a-24f associated therewith which has transmitted a wireless sensor detection event message to master controller 22a-22c thereby providing user with a visually perceptible indication of exactly which base unit 24a-24f experienced the sensor detection event. Processor 84 preferably is further configured in firmware and/or software to enable user to acknowledge receipt of wireless sensor event message from the particular wireless sensor detection event message transmitting base unit 24a-24f that encountered the sensor detection event by pressing the particular manipulable control 64a-64f, preferably button 66a-66f, having the light up or flashing LED 67a-67f associated with the wireless sensor detection event message transmitting base unit turning off LED 67a-67f. As such, processor 84 is configured in firmware and/or software to keep lit up or flashing the LED 67a-67f of the particular manipulable control 64a-64f, e.g., particular button 66a-66f, associated with the specific one of base units 24a-24f which transmitted the sensor detection event message until the particular control 64a-64f, e.g., button 66a-66f, is manipulated by user turning the LED 67a-67f off.

If desired, processor 84 can also be configured in firmware and/or software to wirelessly broadcast a message to the particular base unit 24*a*-24*f* that experienced the sensor detection event communicating an acknowledgement thereto that master controller 22*a*-22*c* received the sensor detection event message. In such a method of alarm system operation, processor 84 can be further configured in firmware and/or software to reset the particular alarming base unit 24*a*-24*f* or re-arm the particular base unit 24*a*-24*f* to enable the particular base unit 24*a*-24*f* to resume sensor monitoring for occurrence of another sensor detection event. Where the particular base unit 24*a*-24*f* is monitoring a particular device or apparatus, such as discussed in more detail below, such a wireless message resetting or re-arming the particular base unit 24*a*-24*f* preferably causes the particular base unit 24*a*-24*f* to resume monitoring the device or apparatus, e.g., resume monitoring operation thereof, for occurrence of another sensor detection event related to a change in state, status or condition thereof, including in operation thereof.

In addition, one or more microcontroller indicator signals 63*a*, 63*b*, 63*c*, 63*d*, 63*e* and/or 63*f* may be coupled between ports of the microcontroller 112 and the visually-perceptible indicators 49*a*, 49*b*, 49*c*, 49*d*, 49*e* and/or 49*f*. In this way, if any one of the buttons 66*a*, 66*b*, 66*c*, 66*d*, 66*e* and/or 66*f* are depressed, the microcontroller 112 may receive a corresponding indication via any one of the microcontroller indicator signals 63*a*, 63*b*, 63*c*, 63*d*, 63*e* and/or 63*f*, respectively. Also, the microcontroller 112 may illuminate any one of LED(s) 67*a*, 67*b*, 67*c*, 67*d*, 67*e* and/or 67*f*, by driving power via any one of the microcontroller indicator signals 63*a*, 63*b*, 63*c*, 63*d*, 63*e* and/or 63*f*, respectively, which may the microcontroller 112 may do, for example, when there is an alarm or a poll response.

When master controller 22*a*-22*c* is operating in a low power mode, or when master controller 22*a*-22*c* is turned off, the microcontroller 112 may drive an LED GND 73 high so that when any one of the buttons 66*a*, 66*b*, 66*c*, 66*d*, 66*e* and/or 66*f* is pressed the LED(s) 67*a*, 67*b*, 67*c*, 67*d*, 67*e* and/or 67*f*, respectively, will not illuminate. Once the master controller 22*a*-22*c* returns to normal operation, the microcontroller 112 may drive the LED GND 73 low, may flashes the LED(s) 67*a*, 67*b*, 67*c*, 67*d*, 67*e* and/or 67*f*, and may activate a buzzer sequence, thereby indicating return of full power and normal operation.

Although also not shown, each manipulable control 64*a*-64*f* of master controller 22*a*-22*c* can also be itself separately or independently electrically connected to processor 84, such as to one or more other corresponding control line(s), e.g., I/O port(s) or pin(s), of processor 84, with processor 84 configured in firmware and/or software to monitor controls 64*a*-64*f*, e.g., monitor switches 70*a*-70*f*, to determine if any one or more of the controls 64*a*-64*f* have been pressed by user. In a preferred embodiment, the corresponding switch 70*a*-70*f* of manipulable control 64*a*-64*f* preferably is electrically connected to processor 84 separately or independently of LEDs 67*a*-67*f*, with a first switch 70*a* electrically connected to a first control line (not shown), e.g., I/O port or pin, of processor 84, a second switch 70*b* electrically connected to a second control line (not shown), e.g., I/O port or pin, of processor 84, a third switch 70*c* electrically connected to a third control line (not shown), e.g., I/O port or pin, of processor 84, a fourth switch 70*d* electrically connected to a fourth control line (not shown), e.g., I/O port or pin, of processor 84, a fifth switch 70*e* electrically connected to a fifth control line (not shown), e.g., I/O port or pin, of processor 84, and a sixth switch 70*f* electrically connected to a sixth control line (not shown), e.g., I/O port or pin, of processor 84. Where a master controller has more than six such LED-equipped user manipulable controls, e.g., more than six LED-disposed buttons, each such additional switch of each such additional control or button can also be separately or independently connected to its own control line, e.g., I/O port or pin, of processor 84, if desired.

With additional reference to FIG. 9, where any of the user-perceptible indicator(s), e.g., 46, 52, 60, 72 and/or 78, of master controller 22*a*-22*c* has electrical power requirements greater than what processor 84 can directly provide when trying to drive such higher power consuming user-perceptible indicator(s), control circuit 82 can include a driver circuit 132, such as schematically depicted in FIG. 9, to enable processor 84 to indirectly drive such high power user-perceptible indicator(s). Driver circuit 132 includes an amplifier 134, e.g., switching amplifier, connected between processor 84 and the particular user perceptible indicator(s) requiring more power than available from a control line 140, e.g., I/O port or pin, of processor 84 (rest of processor 84 not shown in FIG. 9) used to activate the user-perceptible indicator when driven high by processor 84.

With continued reference to FIG. 9, driver circuit 132 has an output 136 connected to high power consuming user-perceptible indicator, e.g. audibly-perceptible indicator 72 schematically depicted in FIG. 9, and an input 138 connected to a control line 140 of processor 84 configured in firmware or software to activate indicator 72 by driving the corresponding I/O port or pin of control line 140 high. Switching amplifier 134 of driver circuit 132 preferably is or includes a MOSFET 142 that more preferably is an N-channel MOSFET with its drain 119 connected to ground, GND, its gate functioning as a switching input 138 connected to processor control line 140, and its source functioning as a switched output 136 connected to indicator 72, with indicator 72 also connected to source voltage, e.g., V<sub>DD</sub>, provided by batteries 98*a*, 98*b* via electrical power supply circuit 87 (FIG. 7). When control line 140 of processor 84 configured in firmware and/or software to drive the gate or switching input 138 high upon occurrence of a particular event or condition goes high by outputting a high voltage logic state over line 138, switching amplifier 134 is switched on thereby powering indicator 72 causing indicator to output user-perceptible indication to user.

While FIG. 9 shows driver circuit 132 connected to one type of high power user-perceptible indicator that is an audibly-perceptible indicator 72, preferably buzzer 76, such a driver circuit 132 can also be used to drive another type of user-perceptible indicator including a tactile perceptible indicator 78, e.g., vibrating transducer 79, vibrator 80 (FIG. 6) and/or high power LED in a similar or substantially the same manner. Although not shown in FIG. 6, control circuit 82 depicted in FIG. 6 preferably has at least a plurality of driver circuits 132 with one of the driver circuits 132 used to drive buzzer 76 connected to one control line 140 (FIG. 9) of processor 84 and a second one of the driver circuits 132 used to drive vibrator 80 connected to a second control line (not shown) of processor 84. Where a high power LED is employed, control circuit 82 can include a third or another one of the driver circuits 132 used to drive the high power LED with the driver circuit 132 connected to a third or further control line (not shown) of processor 84.

In a preferred method of driving such a user-perceptible indicator, e.g., buzzer 76, processor 84 can be configured in firmware and/or software to output a signal to drive (a) buzzer 76, or (b) driver circuit 132 that drives buzzer 76 where the outputted signal preferably is a modulated output, more preferably a PWM output, which causes the buzzer 76 to audibly emit a plurality of time-spaced beeps or tones whose pattern can be and preferably is configured to provide a particular user-perceptible indication to master controller user. Such a PWM output or drive signal can also be outputted by processor 84 to indirectly drive via such a driver circuit or even directly drive vibrator 80 and/or high power LED.

Such a control circuit 82 constructed, e.g. in hardware, and configured, e.g. in firmware and/or software, in accordance with the present invention can and preferably does have a include more than one driver circuit 132, e.g., a plurality of driver circuits 132, with one driver circuit 132 used to drive one user perceptible indicator, such as preferably buzzer 76, e.g., buzzer alarm, and another driver circuit 132 used to drive another user perceptible indicator, such as preferably vibrator 80, e.g., vibrating alarm. Where control circuit 82 is configured for master controller use and operation, such as depicted in FIG. 6, circuit 82 preferably has at least plurality of driver circuits 132 with one control line 140 of processor 84 configured to cause one driver circuit 132 to drive buzzer 76 upon occurrence of a predetermined event, condition or status and another control line (not shown) of processor 84 configured to cause another driver circuit 132 to drive vibration alarm 80. Although not shown in FIG. 6, control circuit 82 can be further configured with still another driver circuit 132 where it is desired for processor 84 to drive still another high power user-perceptible indicator, such as a high power LED, during alarm system use and operation.

With reference once again to FIG. 6, during operation of wireless communication system 86 onboard master controller 22a-22c, radio 92 listens via antenna 96 for wireless messages sent by one of base units 24a-24f paired with controller 22a-22c and can be selectively operated by alarm system user to transmit wireless message(s) to one or more base units 24a-24f, including during base unit pairing with controller 22a-22c and/or during polling of one or more base units 24a-24f by controller 22a-22c after pairing. One or more preferred wireless communication system embodiment(s), configuration(s) and method(s) are discussed in more detail in a section below as a wireless communication system 86 in accordance with the present invention advantageously sends and/or receives wireless digital data containing messages at a relatively low transmission data rate and/or narrow bandwidth to thereby extend wireless digital data transmission range preferably using a fixed radio frequency while listening for wireless messages using an ultralow power method of operation configured to minimize the amount of time for radio 92 needs to be powered during each wireless message listening cycle of the radio 92 dramatically increasing battery life. Wireless messages received by wireless communications system 86 are formed of packets each having a battery-power conserving packet format in accordance with the present invention where a packet preamble used by wireless communications system 86, e.g., used by radio 92, to lock onto a wireless message containing signal has a length or transmission time duration greater than a length or transmission time duration of the digital-data containing packets payload with the battery-power conserving ultralow power method of wireless communication system operation configured to turn off at least radio 92 of system 86 for a period of time less than the packet preamble length or transmission time duration but greater than the digital-data containing packet payload during each wireless message listening cycle when listening for wireless messages during wireless communication system operation.

Such a two-way wireless communication system 86 constructed, configured and operated in accordance with the present invention is discussed in more detail below. As also discussed below, such a two-way wireless communication system 86 of the present invention is not only used by master controller 22a-22c to receive and preferably also send wireless messages during alarm system operation, but a wireless communication system constructed, configured and/or operated same or substantially similar to wireless communication system 86 can be and preferably is used by base units 24a-24g to send and preferably also receive wireless messages during alarm system operation.

Two-Way Wireless Communications System

During wireless communications system operation, radio 92 listens via antenna 96 for wireless messages, such as preferably messages sent by one of base units 24a-24f paired with master controller 22a-22c, and can be and preferably also is used to transmit wireless messages, such as preferably to one of base units 24a-24f, including during pairing with controller 22a-22c, and/or during polling of one of base units 24a-24f after pairing with controller 22a-22c. In a preferred embodiment, configuration and operating method, wireless communications system 86 is configured to send and/or receive digital data-containing wireless messages formed of one or more digital data packets at a relatively low wireless message transmission range extending bandwidth(s) where each wireless message is formed of one or more packets configured to enable wireless communications system operation in an ultralow power conserving mode of operation that is discussed in more detail below. In one such preferred embodiment, configuration and method, wireless communication system 86 is configured to send and/or receive wireless messages at a relatively low transmission range extending bandwidth of no greater than 600 kHz, preferably no greater than 500 kHz, using a radio frequency that preferably is a fixed transmission range maximizing megahertz radio frequency where communication system 86 is further configured with such an ultralow power mode of operation that minimizes the time communications system 86 is powered up listening for wireless messages to extend battery life. As discussed in more detail below, each base unit 24a-24f also has a wireless communications system constructed, configured and/or operated same or substantially similar to wireless communications system 86 that also is configured in firmware and/or software to operate using such an ultralow power method of operation to advantageously maximize battery life of base unit 24a-24f.

With continued reference to FIG. 6, processor 84 communicates over a digital communications bus 114, e.g., serial peripheral interface, with at least the radio 92 when configuring wireless communications system 86 for operation in receiving wireless messages. Likewise, processor 84 communicates over a digital communications bus 114, e.g., serial peripheral interface, with at least the radio 92 when configuring wireless communications system 86 for operation in sending a wireless message. Processor 84 is connected by communications bus 114 to radio 92 and radio 92 is connected by a radio frequency transmit/receive path 116 to RX/TX switch 94. RX/TX switch, which in turn is electrically connected via an antenna line 117 to antenna 96 such that wireless communication system 86 of the present invention preferably is a bi-directional wireless communication system capable of bidirectional wireless communication between controller 22a-22c and base unit(s) 24a-24g.

A preferred radio 92 is a wireless digital transceiver 91 configurable for low power, long range wireless send and receive, e.g. bidirectional, operation that also is configurable in firmware and/or software, including by processor 84 itself configured in firmware and/or software, to wirelessly receive and transmit digital-data containing wireless messages at a relatively low bandwidth that is sufficiently low enough to advantageously help maximize wireless message transmission distance. When configured to transmit or put into transmit mode, radio 92 is configured, such as in firmware and/or software, including by processor 84 itself configured in firmware and/or software, to build each wireless message to be transmitted of one or more data packets formed by radio 92 that includes digital data from processor 84 so each packet contains a preamble followed by a digital data-containing payload. As discussed in more detail below, in building such a message for wireless transmission, radio 92 is configured in firmware and/or software, including by processor 84 itself configured in firmware and/or software, to form the preamble of each packet so it is a uniquely modulated preamble, e.g. have a uniquely modulated preamble waveform, pattern and/or signature, with the preamble of each such packet of each such wireless message being the same uniquely modulated preamble advantageously facilitating wireless message detection during wireless communication system and alarm system operation.

One preferred radio 92 is a low power, long range digital wireless transceiver equipped with wireless message or signal modulated preamble detection, e.g., channel activity detection (CAD), configured in firmware and/or software of radio 92 and/or processor 84 to receive wireless messages when radio 92 is in receive mode only when an incoming wireless message contains one or more packets having the same uniquely modulated preamble that radio 92 is configured to include in forming packet(s) of a wireless message built by radio 92 for transmission. One such preferred radio 92 is equipped with CAD and preferably is further configurable, including via radio firmware and/or software and/or by processor 84 via its own firmware and/or software, to transmit and receive wireless messages at an RF frequency or RF frequencies of at least one MHz, which preferably range between 1 MHz and 5000 MHz, more preferably range between 860 MHz and 1020 MHz, and even more preferably range between 902 MHz and 928 MHz, at bandwidth(s) of no more than 600 kHz, preferably no more than 550 kHz, and more preferably no more than about 500 kHz, during wireless communications between controller 22*a*-22*c* and base unit(s) 24*a*-24*g*.

RX/TX switch 94 enables wireless communication system 86 to switch between receive mode in order to receive incoming wireless messages and transmit mode in order to transmit wireless messages. A preferred RX/TX switch 94 is a single-pole double throw (SPDT) radio frequency switch 95 that preferably is a solid-state RF switch, e.g., CMOS RF switch, capable of operating at radio frequencies of at least one megahertz and preferably can be capable of operating at gigahertz radio frequencies. One such preferred RX/TX switch 94 is a CMOS RF switch preferably of single-pole double throw (SPDT) construction having an RF frequency operating range that ranges between 10 megahertz and 3 gigahertz.

As previously indicated, antenna 96 is disposed onboard preferably by being carried, mounted to or otherwise integrally formed with control circuit 82. If desired, antenna 96 can be integrally formed of or by part of circuit board 71, integrally formed of, from or in housing 30, and/or provided by a separate antenna wire (not shown) attached thereto or carried thereby. Antenna 96 preferably is provided by a chip antenna disposed onboard control circuit 82 that preferably is mounted to circuit board 71.

Wireless Communications System Operation

In a preferred wireless communications systems operating method, one or both processor 84 and and/or radio 92 are configured in firmware and/or software to operate, preferably setup and/or configure, radio 92 and/or RX/TX switch 94, such that radio 92 is capable of transmitting and/or receiving digital data packet containing wireless messages at a radio frequency of at least one MHz, such as at a frequency falling within any one of the aforementioned RF frequency ranges discussed above, at a desirably low wireless message transmission range extending bandwidth that is low enough to produce a wireless communication system 86 constructed, configured and/or operated in accordance with the present invention that sends and receives wireless messages over distances of at least one mile between members 22*a*-22*c* and/or 24*a*-24*g* of alarm system 20 equipped with such a wireless communication system. Processor 84 preferably is configured in firmware and/or software to communicate via bus 114 with radio 92 when configuring radio 92 and/or the rest of wireless communication system 86, e.g. RX/TX switch 94, to receive wireless messages as well as when configuring radio 92 and/or the rest of wireless communication system 86 to send a wireless message. When processor 84 has configured radio 92 to send a digital data packet-containing wireless message, processor 84 communicates digital data to be included in the transmitted wireless message over bus 114 to radio 92 which in turn builds a wireless message containing one or more data packets each having the same unique modulated preamble and digital data-containing payload. Since wireless communication system 86 of master controller 22*a*-22*c* is similar to or substantially same as wireless communication system of each one of base unit(s) 24*a*-24*g*, use of the same unique modulated preamble in each data packet of each wireless message transmitted by controller 22*a*-22*c* and/or base unit(s) 24*a*-24*g* paired with controller 22*a*-22*c* to form alarm system 20 enables fast reliable wireless message or signal detection thereby during alarm system operation.

In one such preferred embodiment and wireless communications system method implementation, one or both processor 84 and/or radio 92 are configured in firmware and/or software to operate, set up and/or configure radio 92 and/or RX/TX switch 94 so radio 92 transmits and receives wireless messages at an RF frequency or RF frequencies of at least one MHz, which preferably range between 1 MHz and 5000 MHz, more preferably range between 860 MHz and 1020 MHz, and even more preferably range between 902 MHz and 928 MHz, at bandwidth(s) of no more than 600 kHz, preferably no more than 550 kHz, and more preferably no more than about 500 kHz, during operation of wireless communications system 86 during wireless communications between controller 22*a*-22*c* and base unit(s) 24*a*-24*g*. In another such preferred embodiment and method implementation, processor 84 and/or radio 92 are configured in firmware and/or software to wirelessly communicate at a fixed RF frequency within at least one of the aforementioned RF frequency ranges, preferably about 900 MHz, at a bandwidth of no more than 500 kHz that can be a bandwidth of as low as about 250 kHz, e.g. 250 kHz±25 kHz, and/or as low as about 125 kHz, e.g. 125 kHz±25 kHz, during operation of wireless communications system 86 thereby advantageously producing a wireless communications system 86 in accordance with the present invention having a wireless radio frequency communications range of at least one mile.

In one such preferred embodiment and wireless communication system method implementation, wireless communications system 86 is configured in firmware and/or software to send and receive wireless RF messages at a wireless communications bandwidth of no greater than 500 kHz where a single signal channel or fixed RF frequency is used by radio 92 for wireless communications. In another such preferred embodiment and method implementation, wireless communications system 86 is configured in firmware and/or software to send and receive wireless messages at a bandwidth of no greater than 250 kHz, such as where frequency hopping, e.g., multichannel or spread spectrum, is used thereby also advantageously producing a wireless communications system 86 in accordance with the present invention having a wireless radio frequency communications range of at least one mile. In still another such preferred embodiment and method implementation, wireless communications system 86 is configured in firmware and/or software to send and receive wireless messages at a bandwidth of no greater than 125 kHz, such as where frequency hopping, e.g., multichannel or spread spectrum, is used.

In a still further such preferred embodiment and method implementation, wireless communications system 86 is configured in firmware and/or software to send and receive wireless messages at a user, software and/or firmware selectable bandwidth of no greater than at least one of 500 kHz, 250 kHz and/or 125 kHz thereby once again advantageously producing a wireless communications system 86 in accordance with the present invention having a wireless radio frequency communications range of at least one mile. Where this is done, wireless communication system 86 preferably also is configured in firmware and/or software to send and receive wireless messages at a user, software and/or firmware selectable to use (a) such a fixed RF frequency as discussed above where wireless message bandwidth is less than 500 kHz, preferably between 500 kHz and 250 kHz, and (b) frequency hopping, e.g. spread spectrum, where the bandwidth is less than 500 kHz.

To help ensure more precise wireless communications system timing since the wireless messages are transmitted at such low bandwidths, timing of at least radio 92 of wireless communication system 86 can be and preferably is provided by an external oscillator or clock operating at a suitably high oscillator frequency. In a preferred embodiment, an external megahertz frequency oscillator, preferably an at least about 30 MHz frequency oscillator crystal, more preferably a 32 MHz frequency oscillator crystal, is connected to wireless communication system 86, preferably connected to radio 92. While an external non-temperature compensated oscillator crystal (X1), e.g. 32 MHz X1 crystal, preferably is used with wireless communication system 86 to enable sufficiently precise timing of wireless RF communications between controller 22a-22c and base unit(s) 24a-24g at such low digital data transmission bandwidths of no greater than 600 kHz, preferably no greater than about 550 kHz, and more preferably no greater than about 500 kHz (as discussed above), external wireless communication system oscillator can be a temperature compensated oscillator (TCXO), e.g. 32 MHz TCXO crystal.

Digital wireless message transmission during operation of wireless communications system 86, preferably during operation of radio 92 in particular, at such low bandwidth(s) advantageously helps maximize wireless message transmission distance. As previously stated, this enables a wireless communications system 86 of the present invention configured in firmware and/or software in accordance with that disclosed herein to send and receive wirelessly transmitted digital data packet containing messages over a distance of at least one mile between controller 22a-22c and base unit(s) 24a-24g (and vice versa).

During wireless communication system operation, whether radio 92 can receive or send wireless messages depends upon the configuration of RX/TX switch 94, which is set in either receive mode or transmit mode by radio 92 and/or processor 84. When in receive mode, RX/TX switch 94 routes wireless messages received by antenna 96 from switch 94 over RF transmit/receive path 116 to radio 92. When switch 94 is in transmit mode, outgoing wireless messages from radio 94 travel along RF transmit/receive path 116 through switch 94 to antenna 96 where they are transmitted wirelessly to base unit(s) 24a-24c.

Although not shown, one or more control lines of processor 84 can be provided, preferably in control circuit 82, which extend between processor 84 and/or radio 92 and RX/TX switch 94 to enable switch 94 to be selectively put into (a) transmit mode when it is desired to transmit a wireless message, such as to one of base unit(s) 24a-24g, and (b) receive mode when it is desired to listen for and receive a wireless message, such as from one of base unit(s) 24a-24g. Wireless communication system 86 preferably is configured in software and/or firmware to put switch 94 in transmit mode when processor 84 configures radio 92, such as via communications bus 114, to transmit a wireless message and to put switch 94 at substantially all other times in receive mode when processor 84 configures radio 92 to listen for and receive incoming wireless messages.

In one preferred wireless communications system operating method, processor 84 and/or radio 92 is configured in firmware and/or software to put switch 94 in transmit mode only when processor 84 configures radio 92 to transmit a wireless message and to keep switch 94 in receive mode at all other times with processor 84 configured in firmware and/or software to put radio 92 into a wireless message signal unique preamble detection mode, preferably channel activity detection (CAD) mode, to listen for incoming wireless messages. When radio 92 has been put into signal detection mode, such as preferably CAD mode, radio 92 is configured to listen for and receive incoming wireless messages, such as from base unit(s) 24a-24g. When an incoming wireless message is detected that contains packet(s) each having the same unique modulate preamble, i.e., valid preamble, used in transmitted wireless messages of wireless communications system 86 of controller 22a-22c and base unit(s) 24a-24g of the same alarm system 20 and alarm system network 26, processor 84 and/or radio 92 of wireless communication system 86 listening in CAD mode are configured in firmware and/or software to then receive the unique preamble packet-containing wireless message.

RX/TX switch 94 of communications system 86 is configured, preferably in firmware and/or software, by radio 92 and/or processor 84, to normally operate in receive mode, e.g. automatically default to receive mode, where RX/TX switch control line (not shown) controlling RX/TX switch configuration remains low thereby enabling a wireless message having packet(s) containing such a valid preamble transmitted by any base unit(s) 24a-24g received by antenna 96 to be communicated via antenna line 117 through switch 94 over receive/transmit path 116 to radio 92 and on to processor 84. When a wireless message is to be transmitted, processor 84 and/or radio 92 is configured, preferably in firmware and/or software, to change RX/TX switch control line from low to high putting switch 94 into transmit mode. When switch 94 is put in transmit mode, message formed by radio 92 using data from processor 84 is communicated by radio 92 over RX/TX path 116 to switch 94 which in turn relays message via antenna line 117 to antenna 96 from which the message is wirelessly broadcast.

When switch 94 is put into transmit mode, digital data to be transmitted wirelessly in a wireless message is communicated by processor 84 over processor-radio communications bus 114 to radio 92. Radio 92 encodes the data into one or more such unique or valid preamble containing packets in forming digital-data containing message sent by radio 92 over RX/TX path 116 to switch 94. With switch 94 in transmit mode, each packet of the message is wirelessly communicated by radio 92 through switch 94 to antenna 96 where antenna 96 wirelessly transmits the message at such a desired radio frequency and at such desirably wireless message transmission range extending bandwidth(s) in accordance with that discussed above.

During wireless message transmission, each packet of the wireless message is sent one at a time with the next packet not being transmitted until receipt of the previously sent packet is wirelessly acknowledged by wireless communication system of receiving base unit(s) 24a-24g. If receiving base unit(s) 24a-24g fails to acknowledge receipt of a transmitted packet, wireless communications system 86 is automatically initiates a retry sequence and retransmits previously transmitted packet until base unit(s) 24a-24g wirelessly acknowledges packet receipt. Each packet of the wireless message is sent in this manner until receipt of all of the packets of the wireless message is acknowledged by receiving base unit(s) 24a-24g. The converse of this procedure is carried out when receiving a wireless message with receiving wireless communications system 86 wirelessly sending transmitting wireless communication system acknowledgment of successful packet receipt telling transmitting wireless communication system to wirelessly broadcast the next packet of the wireless message. This is repeated until each packet of the wireless message is successfully received.

Once transmission of the wireless message is finished, RX/TX switch control line preferably automatically goes low putting switch 94 back into receive mode linking antenna 96 via receive RX/TX path 116 to radio 92 enabling radio 92 of wireless communication system to listen for a valid preamble of a packet of any incoming wireless message that would indicate the wireless message was from one of the members 22a-22c and/or 24a-24g of wireless alarm system network 26 of alarm system 20. In the case of master controller 22a-22c, once wireless message transmission is completed, RX/TX switch control line automatically goes low putting switch 94 back into receive mode linking antenna 96 via receive RX/TX path 116 to radio 92 enabling radio 92 to listen for a valid preamble of a packet of any incoming wireless message that would indicate the wireless message is from one of base unit(s) 24a-24g paired with controller 22a-22c.

In a preferred method of wireless communication system operation, either one or both processor 84 and radio 92 are configured, such as in firmware and/or software, to change the logic state of RX/TX switch control line from high to low when wireless message transmission is finished thereby putting switch 94 into receive mode causing radio 92 to listen for valid preamble-containing wireless messages from any base unit(s) 24a-24g. In one such communications system method implementation, radio 92 is configured, such as in firmware and/or software, to automatically change switch 94 to receive mode and listen for base unit wireless messages when radio 94 has finishing transmitting. In another such communications method implementation, processor 84 is configured, such as in firmware and/or software, to automatically cause radio 92 to put not only switch 94 into receive mode, e.g., by causing radio 92 to put switch 94 into receive mode, but also put radio 92 into receive mode causing radio 92 to listen for wireless messages having a valid preamble once transmission is finished.

In one preferred wireless communications system method implementation, radio 92 is configured to put switch 94 into receive mode when acknowledgment is received that the last packet of a message wirelessly transmitted by radio 92 is sent and either radio 92 is configured to automatically return to its receive mode, e.g., listening mode, or processor 84 is configured to automatically put radio 92 into receive mode when acknowledgment is received that the last packet has been sent. In one such preferred method implementation, processor 84 is configured to put radio 92 into receive mode when radio 92 communicates to processor 84, e.g., issues an interrupt, acknowledgment that the last packet wirelessly transmitted by radio 92 has been successfully received by receiving base unit 24a-24g (and last packet receipt has been wirelessly acknowledged by receiving base unit 24a-24g). In such a preferred method implementation, master controller 22a-22c, preferably processor 84, is configured, such as in firmware and/or software, to put at least one and preferably put both radio 92 and switch 94 into receive mode to listen for valid-preamble containing packet(s) of wireless messages detected upon power up of master controller 22a-22c and its wireless communication system 86.

To once again reiterate, each base unit 24a-24f of alarm system 20 paired with master controller 22a-22c to form alarm system network 26 preferably also is equipped with such a wireless communications system that is constructed, configured and/or operated same as or substantially similar to wireless communication system 86 and also is constructed, configured, and/or operated in ultralow power mode as discussed in more detail below.

Power Conserving Wireless Message Data Packet & Packet Format

With additional reference to FIGS. 10 and 11, the wireless communication system of not just master controller 22a-22c but preferably also of each member of alarm system 20, including each base unit(s) 24a-24f, is configured, including in processor and/or radio firmware and/or software, to build wireless alarm system messages for wireless broadcast so each wireless message packet 124 and/or 124' of each wireless message is formatted in accordance with energy conserving transmission range extending packet format(s) 125 and/or 125' to have a data-holding payload 128 that is smaller, preferably much smaller, than the preamble 126. Formatting each energy conserving transmission range extending packet 124 or 124' in accordance with respective packet format 125 and 125' so packet payload 128 is smaller than packet preamble 126 advantageously helps maximize transmission range when wirelessly transmitting alarm system messages at a transmission bandwidth of no greater than 600 kHz, preferably no greater than 550 kHz, and more preferably no greater than about 500 kHz at a megahertz or higher RF wireless message transmission frequency or frequencies. Formatting each packet 124 or 124' so its payload 128 is smaller than its preamble 126 advantageously also helps maximize battery life by significantly reducing the amount of time each communications system needs to be powered up when operating in receive mode listening for wireless messages.

With respect to wireless communication system 86 of master controller 22a-22c, but preferably also applicable to the wireless communication system of each member of alarm system 20 paired therewith, processor 84 and/or radio 92 of wireless communication system 86 is/are configured in firmware and/or software to format each digital-data containing packet 124 or 124' of each wireless message being built for wireless message broadcast to have packet format(s) 125 or 125' with an ultra-small payload 128 of no greater than about twelve bytes, preferably no greater than ten bytes, more preferably no greater than eight bytes, preferably about six bytes, e.g. data-holding bytes 133, 135, 137, 139, 141, and 143, thereby enabling preamble 126 of packet 124 or 124', to have a length and/or transmission time duration at least twice that of payload 128. Formatting each packet 124 or 124' to have such a packet format 125 or 125' such that the preamble 126 of each packet 124 or 124' is longer in length and/or transmission time duration than the payload 128 thereby enables the communication system of each alarm system member to be operated in a battery power conserving receive mode, such as the ultralow power mode discussed in more detail below, whose operational parameters preferably are based thereon. Formatting each battery life optimizing transmission range extending packet 124 or 124' with a larger or longer preamble 126, which preferably is at least twice as large or long as the payload 128, also advantageously helps enable the wireless radio to be able to lock onto even a relatively weak wireless message containing signal thereby advantageously increasing signal detection reliability and wireless message delivery even under weak-battery wireless message transmitting conditions.

With specific reference to FIG. 10, the packet 124 of each wireless message broadcast by an alarm system member is configured to have a packet format 125 with a preamble 126, preferably unique modulated preamble 126, longer in size and transmit time duration than a payload 128 having at least a plurality of pairs, i.e. at least three, of digital data holding bytes 133, 135, 137, 139, 141, and/or 143. As discussed in more detail below, use of packets 124 each formed having packet format 125 as depicted in FIG. 10 to form wireless alarm system messages where each packet 124 of each wireless message is configured so the preamble 126 of each packet 124 has at least twice the length, e.g., size, and transmit time of the payload 128 to help reduce electrical power usage during wireless communications system operation. Packets 124 formed having such a power-conserving packet format 125 advantageously enable the wireless communications system of each member of alarm system 20 to be operated in mode that conserves power during each cycle of wireless communications system operation where the wireless communications system is listening for wireless messages from other members of alarm system 20.

With continued reference to FIG. 10, payload 128 of packet 124 preferably has at least one byte, preferably a plurality of bytes, and more preferably at least a plurality of pairs, i.e., at least three, of bytes, e.g., data-holding bytes 133, 135, 137, and/or 139, configured in accordance with packet format 125 to collectively hold an alarm system identifier 127, preferably an ID number, e.g. ALARM ID 127, unique to each specific alarm system 20 that is used by each alarm system member 22a-22c and/or 24a-24f, to determine if packet 124 received thereby was broadcast by another alarm system member. Payload 128 also has a message 127 that includes at least one byte, e.g., data-holding byte 141, holding a message identifier, e.g., MSG ID 141, and at least one byte, e.g., data-holding byte, of additional payload which preferably holds a number of a device or member, e.g., DEV NUM 143, identifying the particular alarm system member 22a-22c and/or 24a-24f which packet 124 was broadcast from or was intended for receipt. Packet 124 preferably has packet format 125 where payload 128 is configured with (a) at least one and preferably at least a plurality of bytes, e.g., byte(s) 133, 135, 137, and/or 139, each holding at least a portion of ALARM ID 127, preferably each holding a different portion of ALARM ID, (b) at least one byte, e.g., byte, holding MSG ID 141, and (c) at least one byte, e.g., byte, holding DEV NUM 143 of the alarm system member which broadcast the packet 124 or of the alarm system member which is intended to receive and decode the packet 124. Although not shown, it is contemplated that packet format 125 can be configured with one or more additional payload bytes in addition to that shown in FIG. 10 and discussed above where additional wireless message packet functionality is desired.

ALARM ID 127 preferably is generated during alarm system manufacture, initial alarm system set up and/or initial alarm system startup to provide a digital identifier unique to each alarm system 20 to prevent wireless messages broadcast by any alarm system member 22a-22c and/or 24a-24f of one alarm system 20 of the present invention from interfering with operation of any nearby alarm system member 22a-22c and/or 24a-24f of another alarm system 20 of the present invention. In one preferred embodiment and method, an alarm system member is configured in firmware and/or software to generate ALARM ID 127 from or using a unique predefined device identifier, e.g. pre-assigned serial number or MAC ID, of alarm system member. In one such preferred embodiment and method, ALARM ID 127 is a unique 32-bit value or number generated by hashing a unique preexisting device identifier, e.g., manufacturer-provided serial number or MAC ID, of processor 84 onboard controller 22a-22c.

Once generated, ALARM ID 127 can be and typically is stored in base unit 24a-24f, and preferably may also be stored in onboard controller 22a-22c, e.g., stored onboard radio 92, with wireless communication system 86 configured in firmware and/or software to format each packet 124 to include 32-bit ALARM ID 127 formed of four 8-bit segments ALARM ID0 133, ALARM ID1 135, ALARM ID2 137, and ALARM ID3 139 as depicted in FIG. 10. As discussed in more detail below, ALARM ID 127 is communicated during pairing to each member, e.g., each base unit 24a-24f, being paired with controller 22a-22c such that ALARM ID 127 is thereafter stored onboard each paired alarm system member. Once paired with controller 22a-22c, each packet 124 of each wireless message transmitted or received by any paired member 22a-22c and/or 24a-24f of alarm system 20 contains packet(s) 124 each with the same ALARM ID 127 in its packet payload 128.

With continued reference to FIG. 10, packet 124 is configured to provide multi-part wireless message alarm system verification where an incoming packet lacking a valid preamble is automatically discarded and only decoded when a valid preamble is detected in order to check whether the incoming packet has a matching ALARM ID 127. Where wireless message is broadcast from controller 22a-22c, each incoming wireless message packet received by the wireless communication system of the other alarm system network members, e.g. base unit(s) 24a-24f, and detected as having a valid preamble in one part of such verification is checked to determine if its payload contains a valid matching ALARM ID in a second part of such verification. If the payload does contain a valid matching ALARM ID, the payload is further checked to determine if its payload also contains a DEV NUM that is the same as its own DEV NUM indicating the wireless message was intended for it in a third part of such verification. If the payload contains a matching DEV NUM, the payload of the packet is decoded to determine its MSG ID 141. Depending upon the decoded value of MSG ID 141, the MSG ID 141 can contain either a command identifier, e.g., COMMAND ID, of a task or command to be carried out by the receiving member, or a response identifier, e.g., RESPONSE ID, providing acknowledgment to the receiving member in response to a prior wireless message from the receiving member containing packet(s) 124 with a MSG ID 141 being a COMMAND ID of a task or a command to which RESPONSE ID relates. Messages may include, for example: (1) poll, (2) magnet alarm, (3) pair, (4) PIR alarm, (5) white light, (6) ping, (7) base off mode With reference once again to FIG. 11, packet 124' is similar to packet 124 shown in FIG. 10 but has a packet format 125' that includes at least one form or block of error correction 130, such as CRC block 131 located at the end of packet 124' in FIG. 11. In a preferred embodiment, each packet of each wireless message of alarm system 20 can be a packet 124' of a packet format 125' that includes such error correction 130, such as in the form of CRC block 131 located at the end of packet 124'.

Although not shown in FIGS. 10 and 11, it also is contemplated that each packet 124 or 124' of each wireless alarm system message can have a corresponding packet format 125 or 125' where there also is a header (and header error correction) located between the preamble 126 and payload 128 of each packet 124 or 124'. Where a header is present in each such packet 124 or 124' having packet format 125 or 125', the payload length and payload transmit time discussed below preferably also includes that of the header. Where both a header and header error correction are present in each such packet 124 or 124' having corresponding packet format 125 or 125', the payload length and payload transmit time discussed below not only includes the length and transmit time of the header but also includes the length and transmit time of the header error correction.

As such, where each packet 124 or 124' of each wireless alarm system message broadcast by a member, e.g., 22a-22c and/or 24a-24f, of alarm system 20 has a packet format 125 or 125' that includes a header (not shown), preferably an explicit payload header (not shown), located between the preamble 126 and payload 128 of each wirelessly transmitted packet 124 or 124', the header in each such header-equipped packet 124 or 124 is effectively considered as being part of the payload 128 when discussing payload length and payload transmit time elsewhere herein. Where each packet 124 or 124' of each wireless alarm system message broadcast by a member, e.g., 22a-22c and/or 24a-24f, of alarm system 20 having a packet format 125 or 125' has both a header and header error correction disposed between the preamble 126 and payload 128 of each packet 124 or 124', the header and header error correction are effectively both considered as being part of the packet payload 128 when referring to payload length and payload transmit time elsewhere herein.

Ultralow Power Mode Operation

The wireless communications system 86 of master controller 22a-22c, and preferably also of each alarm system member, 22a-22c and/or 24a-24f, is preferably configured in firmware and/or software to operate using a battery power conserving ultralow power method of operation when listening for wireless messages by operating in an ultralow power "listening" mode until taken out of ultralow power mode to receive packet(s) of an incoming wireless message or upon wireless communications system being switched to transmit mode in order to broadcast one or more packets of a wireless message. Processor, e.g. processor 84, and/or radio, e.g. radio 92, of wireless communication system, e.g. wireless communication system 86, are configured to operate in an ultralow power mode method of operation in accordance with the present invention where processor 84 and/or radio 92 are respectively configured in firmware and/or software to carry out such an ultralow power mode method of operation as discussed in more detail below. During ultralow power mode operation, wireless communications system is repeatedly cycled between (a) a power-conserving mode for one part of an ultralow power mode cycle period of time and wireless communication system operating loop, and (b) a wireless message "listening" signal detection mode for another part of the same ultralow power mode cycle time period and wireless communication system operating loop during which the wireless communications system is in a signal detection mode where radio 92 listens to detect whether incoming wireless messages transmitted by another alarm system member have any packet(s) 124 or 124' with a valid preamble 126. When wireless communications system is operating in signal detection mode during an ultralow power mode cycle and detects a valid preamble 126 of an incoming packet 124 or 124', the wireless communications system is taken out of ultralow power mode into full time receive mode until receipt of every packet 124 or 124' of the incoming wireless message is finished. When finished, wireless communications system preferably is then put back into ultralow power mode.

In a preferred method of wireless communication system operation, processor and/or radio is/are configured in firmware and/or software to automatically put the wireless communication system in ultralow power mode upon being powered up, to automatically return to ultralow power mode after finishing complete receipt of a wireless message from another alarm system member, and to automatically return to ultralow power mode after broadcasting a wireless message to one or more other alarm system members. As discussed in more detail below, processor and/or radio is/are configured in firmware and/or software to take the wireless communication system out of ultralow power mode when receiving a wireless message having one or more packets 124 or 124' detected as possessing a valid preamble 126 and to return to ultralow power mode upon complete receipt of the wireless message. Where reference is made elsewhere herein to the wireless communication system being configured in firmware and/or software, it means that processor, e.g., processor 84, and/or radio, e.g., radio 92, of wireless communications system, e.g., wireless communications system 86 of master controller 22a-22c, preferably are at least the components thereof respectively configured in firmware and/or software to carry out wireless communication system operation encompassing any such method of wireless communication system operation disclosed herein including ultralow power mode operation. While the below-discussion of ultralow power mode is made in reference to operation of the wireless communications system 86 of master controller 22a-22c, including related components, e.g., processor 84, radio 92, RX/TX switch 94, and/or antenna 86, it also applies to wireless communications system used in every other member of alarm system 20 paired with controller 22a-22c including each base unit 24a-24f.

In a preferred method of implementing ultralow power mode, wireless communication system 86 is configured in firmware and/or software to operate in sleep mode during power-conserving mode operation of each ultralow power mode wireless communication system operating cycle or operating loop where the wireless communications system is substantially completely powered down and uses less than 10%, preferably using less than 5%, and more preferably using less than 1%, of the electrical power normally used thereby when operating in receive mode or transmit mode. The wireless communication system 86, preferably processor 84 and/or radio 92, is configured in firmware and/or software to default to operating in at least signal detection mode and preferably in ultralow power mode upon (a) power up of alarm system member, e.g., master controller 22a-22c in present case, and/or power up of wireless communication system 86, (b) after receiving all packets of a wireless message, and (c) after finishing wireless message transmission. During power-conserving mode operation of each ultralow power mode operating cycle or loop, processor 84 and/or radio 92 are configured in firmware and/or software to at least put radio 92 into sleep mode that preferably is a preconfigured sleep mode of the radio 92. If desired, processor 84 and/or radio 92 can also be configured in firmware and/or software to operate any other electrically powered component of wireless communication system 86, including RX/TX switch 94, and/or antenna 96, in a manner that reduces power usage, e.g., turn(s) off and/or put(s) each into sleep mode, during power-conserving mode operation of each ultralow power mode operating cycle.

While processor 84 and/or radio 92 can be configured in firmware and/or software to operate wireless communications system 86 in a power-conserving mode where at least radio 92 is put into receive mode during power-conserving mode operation of each ultralow power mode wireless communications system operating cycle or loop, processor 84 and/or radio 92 preferably are configured in firmware and/or software to operate in a signal detection mode, preferably CAD mode, during power-conserving mode operation of each ultralow power mode operating cycle where wireless communications system 86, preferably radio 92, examines the preamble of each incoming packet to detect whether it is a valid preamble 126. As previously indicated, processor 84 and/or radio 92 is configured when in signal detection mode to examine the preamble of each incoming packet to determine whether the preamble detected is a valid preamble 126 that is the same as the unique modulated preamble 126 that radio 92 and/or processor 84 is set in firmware and/or software to look for as being a valid preamble 126 during signal detection mode. As also previously indicated, valid preamble 126 is not only the same as the unique modulated preamble 126 that radio 92 and/or processor 84 is configured in firmware and/or software to look to match when a preamble of an incoming packet is detected during signal detection mode operation, it also is the same preamble 126 used in packets 124 or 124' transmitted therefrom when taken out of ultralow power mode and put into transmit mode.

In a preferred ultralow power method implementation, processor 84 and/or radio 92 is/are configured in firmware and/or software to at least temporarily take wireless communications system 86 out of ultralow power mode and keep wireless communications system 86 in receive mode long enough to determine whether an incoming packet detected as having a valid preamble 126 also has a payload 128 with a valid alarm system identifier, preferably valid ALARM ID 127, that matches the same alarm system identifier, preferably ALARM ID 127, inserted by wireless communications system 86 into each packet 124 or 124' of each wireless message broadcast thereby when operating in transmit mode. If the packet detected as having a valid preamble 126 lacks any valid alarm system identifier, i.e., lacks a valid ALARM ID, then processor 84 and/or radio 92 of wireless communications system 86 is/are configured in firmware and/or software to resume ultralow power mode operation. Where an incoming packet detected as having a valid preamble 126, e.g., preamble 126 that is same unique modulated preamble that processor 84 and/or radio 92 is configured in firmware and/or software to detect as being valid, and payload 128 is determined to contain a valid ALARM ID 127, such that it is confirmed the incoming packet is indeed a valid packet 124 or 124' of a wireless message packet 124 or 124' of alarm system 20, the processor 84 and/or radio 92 is/are configured in firmware and/or software to take wireless communications system 86 out of ultralow power mode and put wireless communications system 86 into full-time or continuous receive mode in order to receive and decode each packet 124 or 124' of incoming message of alarm system 20.

If desired, the processor, e.g., processor 84, of each alarm system member, e.g., master controller 22a-22c in present case, which is configured in firmware and/or software to operate in ultralow power mode also can be configured, such as in firmware and/or software, including under the direction of radio, e.g. radio 92, preferably also configured in firmware and/or software, to also operate processor, e.g., processor 84, in such a power-conserving mode, e.g. sleep mode, while the wireless communication system, e.g., wireless communications system 86, is operating in ultralow power mode thereby significantly reducing processor power usage during ultralow power mode operation to even further conserve battery power usage and extend battery life even more. In such an ultralow power mode method of operation that includes power-conserving ultralow power mode processor operation, processor, e.g., processor 84, preferably is configured in firmware and/or software to operate or configured by radio, e.g., radio 92, configured in firmware and/or software to operate in such a processor power-conserving mode, e.g. processor sleep mode, when or while the wireless communications system, e.g., wireless communications system 86, is operating in ultralow power mode. Radio, e.g., radio 92, preferably also is configured in firmware and/or software to wake up the processor, e.g., processor 84, upon the radio, e.g. radio 92, receiving any incoming packet of any wireless message, including upon detecting a valid preamble 126 of a valid incoming wireless message packet 124 or 124', e.g. having both a valid preamble 126 and a payload 128 containing a matching or valid ALARM ID 127 as well as upon occurrence of any of the conditions disclosed elsewhere herein that would ordinarily wake up the radio, e.g., radio 92, and/or otherwise cause exit of ultralow power mode wireless communications system operation. In such an ultralow power mode method of operation that includes power-conserving processor operation, e.g., also includes ultralow power mode processor operation, processor, e.g., processor 84, preferably is further configured to wake up on its own upon generation of any non-wireless communication system related interrupt including (a) any interrupt generated as a result of a user interacting with alarm system member 22a-22c and/or 24a-24f, which is equipped with such an ultralow power mode-equipped or configured processor, radio, wireless communications system, and/or (b) any interrupt generated by occurrence of a sensor detection event and/or alarm event.

While the rest of the discussion in this section of the detailed description is specifically directed to the ultralow power mode as implemented by master controller 22a-22c in a preferred method of operation of wireless communication system 86 of controller 22a-22c it also is applicable to each alarm system member, including each base unit 24a-24f paired with one particular master controller 22a-22c to form a network 26 of alarm system 20 of the present invention. During operation of wireless communication system 86 in ultralow power mode, when the wireless communication system 86 is in power-conserving mode, preferably in sleep mode, during each ultralow power mode operating cycle, at least radio 92 of the communications system 86 uses no more than 15%, preferably no more than 10%, and more preferably no more than 5% of the power normally used when not in power conserving or sleep mode. Processor 84 and/or radio 92 is/are configured, preferably in firmware and/or software, to operate wireless communications system 86 in ultralow power mode by keeping communications system 86, preferably at least radio 92, in power-conserving mode, preferably sleep mode, for at least 50%, preferably for at least 60%, and more preferably for at least 66% of each ultralow power mode operating cycle during the time of operation in ultralow power mode. In other words, during each ultralow power mode cycle time period of each ultralow power mode cycle of ultralow power mode operation, one or both of processor 84 and/or radio 92 are configured in firmware and/or software to operate wireless communication system 86, preferably at least radio 92, in power-conserving mode, preferably sleep mode, for at least 50%, preferably for at least 60%, and more preferably for at least 66% of each ultralow power mode of each ultralow power mode cycle during ultralow power mode operation. Operation of communications system 86 (and/or processor 84) in such an ultralow power mode advantageously increases battery life while also still ensuring incoming wireless messages are reliably detected and properly received.

In a preferred wireless communications system method of operation, wireless communication system 86 is operated in ultralow power mode at substantially all times other than when actually sending or receiving a wireless message. The same is true where processor 84 also is configured to operate in ultralow power mode operation. With reference once again to FIGS. 10 and 11, in a preferred ultralow power mode method of wireless communications system operation, each packet 124 or 124' of each wireless message broadcast by each member of alarm system 20 is formed to be of corresponding packet format 125 or 125' having a preamble 126 upstream of the payload 128 of a length and transmit time, e.g., broadcast time, greater than one half the (a) total packet length and/or (b) total packet transmit time. Formatting each wireless message packet 124 or 124' in accordance with corresponding packet format 125 or 125' as depicted in respective FIGS. 10 and 11 to have such an ultra-small payload 128 that is smaller, preferably less than half the length, e.g. size, and transmit time of the preamble 126, such that preamble length and transmit time is greater than (a) one-half total packet length and/or (b) one-half the total packet transmit time thereby enables implementation of ultralow power mode wireless communication system operation where the wireless communication system 86, preferably at least radio 92, can and preferably does remain in power-conserving mode, preferable sleep mode, for at least 50%, preferably for at least 60%, and more preferably for at least 66%, of each ultralow power mode cycle or cycle time period and still be in a wireless message listening mode, preferably in signal detection mode, long enough during each ultralow power mode cycle or cycle time period, to still be able to detect a valid preamble of an incoming packet preferably during the first time the packet was wirelessly sent.

During ultralow power mode operation, the total cycle time period of each ultralow power mode cycle preferably is a function of at least one of the transmit time of the preamble 126 of packet 124 or 124' and/or the total packet transmit time of packet 124 or 124' to help prevent the power-conserving mode from occurring during any ultralow power mode cycle at substantially the same time the preamble 126 of the packet 124 or 124' is being wirelessly transmitted by the wireless communication system of another member of alarm system 20. In one such preferred ultralow power mode method of operation, the total cycle time of each ultralow power mode cycle is a function of at least one of the transmit time of the preamble 126 of packet 124 or 124' and/or total packet transmit time of packet 124 or 124'. In either ultralow power mode method implementation, the wireless communications system 86 preferably is configured in firmware and/or software to have an ultralow power mode cycle time no greater than a maximum total packet transmit time of packet 124 or 124' for the particular bandwidth and frequency each wireless alarm system message packet 124 or 124' is being transmitted at and preferably is configured to have an ultralow power mode cycle time no greater than, preferably substantially same as, the actual total packet transmission time it takes for each wireless communications system of each alarm system member to transmit such a packet 124 or 124'. In either ultralow power mode method implementation, by preventing the power-conserving mode of each ultralow power mode cycle from becoming synchronized with transmission of the preamble 126 of wirelessly transmitted packet(s) 124 or 124' during operation of wireless communications systems of all members, e.g., 22a, 22b, 22c, 24a, 24b, 24c, 24d, 24e, and/or 24f, of alarm system 20, it helps ensure that the listening mode of each ultralow power mode cycle, during which the wireless communications system 86 is in signal detection mode, occurs when the preamble 126 of a packet 124 or 124' transmitted by the wireless communication system of another alarm system member is being received by wireless communications system 86 operating in ultralow power mode.

In one preferred ultralow power mode method of operation, processor 84 and/or radio 92, is/are configured, such as in firmware and/or software, to put communication system 86, preferably at least radio 92, into power conserving mode, e.g., sleep mode, for a time period during each ultralow power mode cycle that is greater than one half of packet transmit time and greater than one half of preamble transmit time, but preferably no greater than the preamble transmit time. In another preferred ultralow power mode method of operation, master controller 22a-22c, preferably processor 84 and/or radio 92, is/are configured, such as in firmware and/or software, to put communication system 86, preferably at least radio 92, into power conserving mode, e.g., sleep mode, for a time period during each ultralow power mode cycle that is greater than one half of packet transmit time and also greater than one half of preamble transmit time, but no greater than preamble transmit time.

In a preferred wireless message packet configuration well suited for use with a wireless communication system 86 operating in such an ultralow power mode method of operation in accordance with the present invention, each packet 124 or 124' of each message wirelessly received or transmitted by communication system 86 has a maximum wireless packet transmission time of no greater than about 400 milliseconds (ms) and an actual packet transmit time of no greater than about 370 ms that preferably ranges between 345 ms and 365 ms and more preferably ranges between 350 ms and 360 ms. In one such preferred packet configuration, each packet 124 or 124' has an actual transmit time of about 354 ms, e.g., 354 ms±5 ms.

In one such preferred packet configuration, the preamble 126 of each packet 124 or 124' of each wireless message, has a maximum preamble transmission time of no greater than 260 ms and an actual preamble transmit time of no greater than about 265 ms that preferably ranges between 235 ms and 260 ms and more preferably ranges between 240 ms and 250 ms. In one such preferred packet configuration, each packet 124 or 124' has an actual preamble transmit time of about 247 ms, e.g., 247 ms±5 ms. In at least one such preferred packet configuration, each packet 124 or 124' has an actual packet transmit time of about of about 354 ms, e.g., 354 ms±5 ms, and an actual preamble transmit time, of about 247 ms, e.g., 247 ms±5 ms.

In one preferred ultralow power mode method of wireless communication system operation, at least radio 92 of communication system 86 is cycled between power-conserving sleep mode and signal detection mode, e.g., CAD mode, for a cycle period of time during ultralow power mode operation that preferably is no greater than the maximum wireless data packet transmit time of incoming packet(s) 124 or 124' in a packet-containing message wirelessly broadcast by an alarm system member, such as preferably transmitted by a base unit 24a-24g paired with master controller 22a-22c. In one such preferred ultralow power mode method implementation, each ultralow power mode cycle has a cycle period of time that preferably is substantially the same as the actual packet RF wireless transmission time of each wireless message packet 124 or 124'.

In a preferred method of ultralow power mode wireless communication system operation, processor 84 and/or radio 92, is/are configured, such as in firmware and/or software, so at least radio 92 of wireless communication system 86 remains in power-conserving mode, e.g., sleep mode, for a longer duration of time during each ultralow power mode cycle than the duration of time wireless communication system 86 is operated in signal detection mode listening for a valid preamble. In one preferred method implementation, master 22a-22c, preferably processor 84 and/or radio 92, is/are configured in firmware and/or software to put at least radio 92 in sleep mode for a duration of time during each cycle that is greater than the duration of time in signal detection mode with the sleep mode duration of time during each ultralow power mode cycle being (a) at least half of each ultralow power mode cycle period and (b) more than one-half actual packet transmission time, but preferably no greater than the packet preamble transmit time, e.g., the time it takes to wirelessly transmit the packet preamble 126 by sending alarm system member.

Configuring processor 84 and/or radio 92, in firmware and/or software to put at least radio 92 of communication system 86 in sleep mode for such a preamble and/or packet transmission related duration of time during power-conserving mode operation of each ultralow power mode cycle of wireless communications system operation advantageously prevents synchronization of sleep mode cycles with the preamble transmission thereby helping ensure consistent reliable wireless signal detection, preferably also helping ensure consistent reliable preamble detection, occurs during operation of wireless communication system 86 in ultralow power mode. In one such preferred method implementation where the duration of time that at least radio 92 is put into sleep mode is more than one-half packet transmission time but less than packet preamble transmission time, the sleep mode operation duration of time during each ultralow power mode cycle is greater than one-half packet preamble transmission time, preferably is at least two-thirds of packet preamble transmission time, and more preferably is at least 85% of packet preamble transmission time to prevent sleep mode and/or signal detection "listening" mode during ultralow power mode cycling from becoming synchronized with preamble transmission including during transmission of a plurality, typically at least a plurality of pairs, i.e., at least three, of sequentially transmitted packets 124 or 124' of a wirelessly transmitted alarm system message. In another such preferred implementation, the sleep mode operation duration of time of each cycle of ultralow power mode communications system operation can be and preferably is greater than the preamble transmission time with master 22a-22c, preferably processor 84, configured in firmware and/or software to set the sleep mode operation duration of time of each ultralow power mode cycle so it is not equal to packet preamble transmission time but instead set within a range of between about 90% and 110% of preamble transmission time to prevent preamble transmission synchronization from occurring. Such preferred ultralow power mode method implementations advantageously provide significant wireless communication system energy savings and improved battery life.

In such an implementation of a preferred method of ultralow power mode wireless communication system operation, when at least radio 92 of wireless communication system 86 is not in sleep mode, at least radio 92 of the communication system 86 is in signal detection mode. In one such implementation, processor 84 and/or radio 92, is/are configured in firmware and/or software to put at least radio 92 in sleep mode for one part of each ultralow power mode cycle before duty cycling at least radio 92 of communication system 86 for the rest of the cycle in signal detection mode by putting at least radio 92 of communication system 86 in signal detection mode for the rest of the cycle.

In a preferred ultralow power mode wireless communication system method implementation, at least radio 92 of communication system 86 is put into signal detection mode for a duty cycle of no more than 40%, preferably no more than 35%, more preferably no more than 30%, of the total ultralow power mode cycle period such that at least radio 92 of communications system 86 is operational in signal detection mode for no more than 30%, preferably no more than 35%, more preferably no more than 40%, of each ultralow power mode cycle. In one such preferred method implementation, to help achieve significant reduction in energy use, master controller 22a-22c, preferably processor 84, is configured to put at least radio 92 of communication system 86 into signal detection mode during each ultralow power mode cycle for no more than 45%, preferably no more than 35%, more preferably no more than 30%, of the total packet transmission time of packets 124 or 124' of a wireless message transmitted from base unit 24a-24g.

In such a preferred implementation, master controller 22a-22c, preferably processor 84, is configured to put at least radio 92 of communication system 86 into signal detection mode during each ultralow power mode communications system operating cycle for no more than 65%, preferably no more than 60%, more preferably no more than about 55%, of the preamble transmission time of packets 124 or 124' of an incoming wireless base unit message. Doing so advantageously helps provide reliable, consistent wireless signal detection by helping to ensure at least radio 92 of communication system 86 is always put in signal detection mode long enough during each cycle for at least a portion of the preamble 126 of any packet 124 or 124' wirelessly transmitted by a base unit 24a-24g to be received by communication system 86 while communication system 86 is in signal detection mode for the preamble to be detected. In another such preferred implementation, master controller 22a-22c, preferably processor 84, is configured to put at least radio 92 into signal detection mode during each cycle for no more than 50%, preferably no more than 45%, more preferably no more than about 40%, of the preamble transmission time of the packets 124 or 124' of an incoming wireless base unit message.

In a preferred embodiment, master controller 22a-22c, preferably processor 84, is configured, such as in firmware and/or software, to cycle at least radio 92 between (a) power conserving mode, e.g., sleep mode, and (b) signal detection mode, during each cycle of ultralow power mode wireless communication system operation. When radio 92 is put in the power conserving mode, e.g., sleep mode, radio 92 uses less electrical power than when radio 92 is in any other mode including receive mode, e.g., signal detection mode, and transmit mode. When radio 92 is put in sleep mode, radio 92 preferably consumes no more than 15%, preferably no more than 10%, and more preferably no more than 5% of the electrical power consumed by radio 92 when in either receive or transmit mode. When radio 92 is cycled by processor 84 between sleep and signal detection modes during ultralow power mode operation in accordance with one or more of the above sleep mode time durations and/or signal detection mode duty cycles, radio 92 consumes no more than 40%, preferably no more than 35%, and more preferably no more than 30% of the electrical power radio 92 would ordinarily consume when operating substantially continuously, e.g., full time, in either receive or transmission mode.

In one preferred ultralow power mode cycle method implementation, radio 92 is put into a signal detection mode that is the same as the receive mode of radio 92 used when receiving wireless packet-containing messages with radio 92 configured in firmware and/or software to detect whether an incoming packet, e.g., packet 124 and/or 124', has a valid preamble, i.e., unique modulated preamble 126, radio 92 is configured specifically to detect. In another preferred method implementation, radio 92 is configured with a signal detection mode different from the receive mode of radio 92. In one preferred radio embodiment, radio 92 is a digital wireless transceiver 93 configured with a signal detection mode that preferably is a channel activity detection (CAD) mode used to listen over antenna 96 for an incoming wireless message from one of base units 24a-24g by detecting whether incoming wireless message has a valid preamble 126 that is a particular unique modulated preamble 126 radio 92 is configured to specifically detect. In at least one such embodiment where radio 92 is equipped with such a CAD signal detection mode, radio 92 can be configured to use less electrical power in CAD mode than when in either receive mode or transmission mode.

If a wireless signal, e.g., wireless packet-containing message, is detected by radio 92 as having a valid preamble 126 when radio 92 is in signal detection mode during a cycle of ultralow power mode operation, communication system 86 is taken out of ultralow power mode in order to enable radio 92 to receive the entirety of the wireless signal by receiving all of its packets 124 or 124'. When taken out of ultralow power mode, radio 92 is put or remains substantially continuously in receive mode until all of the packets 124 or 124' of the entire wireless message are received. Where the signal detection mode is the same as receive mode, radio 92 is taken out of ultralow power mode when a valid preamble is detected by keeping radio 92 substantially continuously in receive mode until all of the packets of the incoming wireless message are received. Where the signal detection mode is different than receive mode, such as where the signal detection mode is a CAD mode, radio 92 is taken out of signal detection mode upon detection of a valid preamble and put into receive mode until radio 92 receives all of the packets 124 or 124' of the wireless message. After receipt of the entire wireless message is completed, radio 92 preferably is put back into ultralow power mode by processor 84.

In a preferred embodiment and method implementation, the master controller processor 84 is configured, such as in firmware or software, to operate at least radio 92 of communication system 86 in ultralow power mode when a wireless packet-containing message is not being transmitted or received by master controller 22a-22c. When in ultralow power mode, processor 84 is configured to cycle radio 92 between signal detection mode and sleep mode until (a) radio 92 detects a valid preamble 126 or a portion of a valid preamble 126, or (b) processor 84 puts radio 92 into transmission mode in order to transmit a wireless message, e.g., polling message, to one of base units 24a-24g. When radio 92 detects a valid preamble 126, or portion thereof, processor 84 is configured to take radio 92 out of ultralow power mode by ceasing cycling of radio 92 into sleep mode, e.g., processor 84 stops putting radio 92 into sleep mode. Where radio 92 has a signal detection mode, e.g., CAD mode, different than its receive mode, processor 84 is configured to put radio 92 into receive mode, in which mode it remains until all of the packets 124 or 124' of the wireless message are received. Where the signal detection mode is the same as the receive mode, processor 84 is configured to exit the ultralow power mode when radio 92 detects a valid wireless message preamble 126 by putting and keeping radio 92 in receive mode, in which mode radio 92 remains until all of the packets 124 or 124' of the wireless message are received.

In one preferred implementation of a method of ultralow power mode operation, processor 84 is configured in firmware and/or software to exit ultralow power mode upon receipt of a signal, e.g. interrupt, from radio 92 when radio 92 detects a valid preamble 126 or portion of a valid preamble 126 of an incoming wireless message. When processor 84 receives such a signal, e.g., interrupt, from radio 92, processor 84 exits the ultralow power mode by no longer putting radio 92 into sleep mode and no longer cycling radio 92 between sleep and signal detection modes.

In another such preferred wireless communications system embodiment and ultralow power mode operating method implementation, processor 84 and/or radio 92 is/are further configured in firmware and/or software with an enhanced ultralow power mode where the signal detection mode, e.g., CAD mode, is configured with a signal detection mode able to detect even a fragment or fraction of a preamble of an incoming packet and with such an enhanced ultralow power mode configured to be at least temporarily suspended or exited upon a fragment or fraction of a preamble of an incoming packet being detection during operation in signal detection mode of any ultralow power mode operating cycle. In such a preferred embodiment and enhanced ultralow power mode method implementation, processor 84 and/or radio 92 is/are configured to cause the wireless communications system 84 to be put full time into receive mode when a fragment or fraction of a valid preamble of a partially received packet is detected by radio 92 in signal detection mode thereby enabling radio 92 to operate full time in receive mode long enough to detect and/or confirm whether the preamble was indeed valid when the packet is retransmitted or resent. Such an enhanced ultralow power mode method implementation where wireless communications system 86 is configured with such a valid preamble fragment detecting signal detection mode that enables valid preamble fragment detection to be done during signal detection mode operation of each enhanced ultralow power mode operating cycle further enables the time of power-conserving mode operation during each enhanced ultralow power mode operating cycle to be increased further increasing battery power savings and battery life. An alarm system member having such a wireless communications system configured to be able to operate in such a valid preamble fragment detecting signal detection mode during each cycle of ultralow power mode operation advantageously enables the duty cycle of each signal detection mode portion of each ultralow power mode cycle to be reduced and the power-conserving mode portion of each ultralow power mode cycle to be increased thereby further reducing battery power consumption and correspondingly increasing battery life.

When less than a complete preamble of a portion or fragment of less than a complete incoming packet is detected as potentially or even likely being a valid preamble 126, processor 84 and/or radio 92 is configured in firmware and/or software to exit ultralow power mode and put wireless communications system in receive mode until the same packet can be retransmitted or resent. The processor 84 and/or radio 92 is configured in firmware and/or software to remain in receive mode until the preamble of the retransmitted or resent packet is confirmed as being valid and the payload of the retransmitted or resent packet examined to determine whether it contains a valid alarm system identifier, preferably a valid ALARM ID 127, e.g., contains same/valid ALARM ID0 133, ALARM ID1 135, ALARM ID2 137 and ALARM ID3 139. If either the preamble or the payload of the retransmitted or resent packet is not valid, processor 84 and/or radio 92 is configured in firmware and/or software to return wireless communications system operation to ultralow power mode. If both the preamble 126 and payload 128 of the resent or retransmitted packet 124 or 24' are determined to be valid, then the processor 84 and/or radio 92 is/are configured in firmware and/or software to remain in receive mode until each valid packet 124 or 124' of the wireless alarm system message are received. Thereafter, of course, the wireless communications system 86 returns to ultralow power mode operation.

Such an enhanced ultralow power mode method of wireless communications system operation configured with valid preamble fragment signal detection mode operation is particularly well suited for use(s) or application(s) of alarm system 20 which are more tolerant of packet retransmission of up to a plurality of pairs, i.e., up to three, of times, preferably no more than four retries, before ensuring at least a fragment or fraction of a valid preamble 126 of an incoming packet 124 or 124' of a wireless message from another alarm system member will be successfully detected, received and decoded. In such an enhanced ultralow power mode method implementation, where only a fragment of a valid preamble 126 of a partial or incomplete incoming packet is detected during signal detection mode operation of an ultralow power mode operating cycle that might not be enough to lock onto the wirelessly transmitted signal of a wireless message from another member of alarm system 20, the wireless communications system 86 is configured to then be put into constant receive mode long enough to determine whether to lock onto the wireless message signal on the next packet retry when the packet whose preamble detected in signal detection mode as being valid is resent. In such more tolerant alarm system applications, this advantageously enables wireless communication system 86 to remain in power-conserving mode, preferably sleep mode, during a greater percentage or proportion of each ultralow power mode cycle of wireless communications system operation (and correspondingly reduce the duty cycle of signal detection mode).

Radio 92 can be configured, such as in hardware, firmware or software, to automatically switch from signal detection mode, e.g., CAD mode, to receive mode upon detecting a valid preamble 126, or portion thereof, of an incoming message along with notifying, e.g. sending an interrupt, processor 84 that a valid preamble 126, or portion thereof, has been detected. Once this occurs, processor 84 is configured, such as in firmware or software, to exit ultralow power mode by no longer cycling radio 92 between sleep mode and signal detection mode thereby preventing radio 92 from being put into sleep mode while incoming wireless message is being received.

To enable at least radio 92 of wireless communication system 86 to be operated in such an ultralow power mode in a manner that significantly extends battery life while still being able to monitor alarm system network 26, a communications system and method of the present invention utilizes a preferred wireless packet format, such as depicted by packets 124 and 124' respectively shown in FIGS. 8 and 9, configured to have preferred packet and preamble transmit time(s) as discussed above, used during wireless alarm system communication advantageously helping extend both wireless communication range and battery life. In one such preferred communication system 86, wireless messages transmitted or received by radio 92 are formed of such packets 124 or 124' transmitted or received at a radio frequency that preferably is a fixed radio frequency of at least one megahertz at a digital data transmission bandwidth less than 600 MHz, preferably less than 550 MHz, and more preferably no greater than about 500 kHz, e.g., no greater than 500 kHz±50 kHz, enabling extended range wireless alarm system message communications over a distance of at least one mile between members 22a-22c and/or 24a-24g of alarm system network 26 of the present invention.

Packets 124 or 124' of such a preferred wireless message packet format preferably have a preamble 126 with a length or transmission time greater than the length or transmission time of the payload 128 to not only provide a preamble transmission time long enough relative to the signal detection duty cycle or time length during ultralow power mode operation for the preamble 126 of an incoming packet 124 to be detected by radio 92 of communications system 86, but which also allows a shorter smaller payload 128 to be used in each packet 124 or 124' advantageously enabling extended range transmission of wireless alarm system messages at a desired fixed radio frequency over distances greater than one mile at range-extending bandwidths of less than 600 kHz, preferably less than 550 kHz, more preferably no greater than about 500 kHz, e.g., preferably no greater than 500 kHz±50 kHz. In one such preferred wireless message packet format embodiment, each packet 124 or 124' has a preamble 126 with a length or transmit time at least 1.5 times, preferably at least about 2 times, greater than the length or transmit time of the payload 128 thereby producing packets 124 or 124' with a preamble 126 having a length or transmission time greater or longer enough than the signal detection duty cycle of at least radio 92 of communications system 86 in ultralow power mode for preamble detection to quickly and consistently happen.

Such a preferred wireless packet format therefore utilizes packets 124 or 124' having a relatively small payload 128 relative to overall packet size and transmission time with a preferred packet payload 128 containing at least a plurality of bytes, preferably containing at least a plurality of pairs, i.e., at least three, of bytes and which preferably contains no more than ten bytes, preferably no more than six bytes, and more preferably no more than five bytes, e.g. preferably no more than about four bytes. In one such preferred wireless message packet format embodiment, each packet 124 or 124' has a relatively short alarm system related data-holding payload 128 having a length or transmission time relative to the overall length or transmission time of the packet 124 or 124' itself containing the payload 128 that is no greater than one-half total packet length or transmission time, preferably no greater than one-third total packet length or transmission time, and more preferably no greater than about one-quarter total packet length or transmission time, e.g., 25%±5% of total packet length or transmission time.

In one such preferred packet configuration, payload 128 of each packet 124 or 124' of each wireless message has a maximum payload transmission time of no greater than 150 ms and an actual upstream preamble transmit time, of no greater than about 140 ms that preferably ranges between 85 ms and 135 ms and more preferably ranges between 100 ms and 130 ms. In one such preferred packet configuration, each packet 124 or 124' has an actual payload transmit time of no more than about 130 ms, e.g., no more than about 128 ms±5 ms. In at least one such preferred packet configuration, each packet 124 or 124' has an actual packet transmit time of about of about 354 ms, e.g., 354 ms±5 ms, an actual packet preamble transmit time of about 247 ms, e.g., 247 ms±5 ms, and an actual payload transmit time of between about 100 ms and 130 ms.

Where communications system 86 is equipped with RX/TX switch 94, master controller 22a-22c, preferably processor 84 and/or radio 92, can be configured, such as in hardware, firmware and/or software, to also alternately and repeatably cycle switch 94 between a power conserving mode, e.g., sleep mode, and an operational mode, e.g. receive mode, during ultralow power mode communications system operation with switch 94 enabling radio 92 to detect or listen for wireless messages transmitted by one of base units 24a-24g when in receive mode. In one preferred implementation of a wireless communication system ultralow mode method of operation where switch 94 is cycled between sleep mode and receive mode, radio 92 preferably is configured, such as in hardware, firmware and/or software, to put switch 94 into sleep mode when radio 92 is put or goes into sleep mode and to put switch 94 into receive mode when radio 92 is put or goes into receive mode. Where switch 94 also is cycled between sleep and receive modes during ultralow power mode operation, switch 94 preferably is cycled between sleep and receive modes substantially in sync with cycling of radio 92 between sleep and receive modes with switch ultralow power mode cycle having a cycle period of time substantially same as the cycle period of time for radio 92.

When master controller 22a-22c is powered up, processor 84 is configured, such as in firmware and/or software, to put wireless communication system 86, including at least radio 92, into ultralow power mode, where communications system 86, preferably at least radio 92, is repeatedly cycled by processor 84 between signal detection mode and sleep mode until radio 92 detects a valid preamble 126 or portion thereof of a packet 124 or 124' of incoming wireless message. When a valid preamble 126 or portion thereof is detected by radio 92, communication system 86, including at least radio 92, is taken out of ultralow power mode putting or keeping communications system 86, including at least radio 92, in receive mode until all of the packets 124 or 124' of incoming message are received. Wireless communications system 86, preferably at least radio 92, remains in constant receive mode full time for a sufficient period of time until the full or complete wireless message is received to ensure even any and all retry packets 124 or 124' are received. When the full message is received, communications system 86, including at least radio 92, is taken out of constant receive mode and once again operated in ultralow power mode.

When a wireless message, e.g., polling message, is to be transmitted from the master controller 22a-22c to one or more of the base units 24a-24g, processor 84 and/or radio 92 is/are configured in firmware and/or software to take wireless communication system 86 out of ultralow power mode and put it into transmit mode. When finished transmitting the wireless message, processor 84 is configured to put communications system 86 back into ultralow power mode. Before putting wireless communication system 86 back into ultralow power mode, processor 84 and/or radio 92 is/are configured in firmware and/or software to watch for an acknowledgment, e.g., ACK, from the base unit 24a-24f that received the wireless message transmitted by master controller 22a-22c indicating the complete wireless message has been received. Processor 84 preferably is configured in firmware and/or software to provide a user-perceptible indication, such as in the form of a user-perceptible audible alarm, vibratory alarm and/or visually perceptible indication to master controller user that the wireless message, e.g., polling message, transmitted to the particular base unit 24a-24f was indeed received thereby. This advantageously also provides confirmation to master controller user that the particular base unit 24a-24f that acknowledged receipt of the master controller transmitted wireless message, e.g., polling message, is still in RF communications range.

Master Controller Operation

With continued reference to FIGS. 2-6, when a wireless message from a base unit 24a-24g is received by master controller 22a-22c, processor 84 is configured in firmware and/or software to cause at least one user perceptible indicator 46, 52, 60, 72 and/or 78 to provide, e.g. output, a user perceptible indication to a user of master 22a-22c that wireless communication has occurred, e.g., that a wireless RF link has been established. In one method of controller operation, processor 84 is configured to cause at least one user perceptible indicator 46, 52, 60, 72 and/or 78 to provide a user perceptible indication indicating that a wireless link between controller 22a-22c and one of the base units 24a-24g has not only been established but was due to a sensor detection event. In one such method implementation, processor 84 is configured to cause at least at least one user perceptible indicator 46, 52, 60, 72 and/or 78 to provide a user perceptible indication indicating to user specifically when wireless communication of a sensor detection event of one of the base units 24a-24g has been received by master 22a-22c.

In one such preferred method implementation, processor 84 is configured to cause at least one visually perceptible indicator 46, 48, 52, and/or 61, preferably a light or lamp, e.g., LED 50a and/or 50b, to provide at least one visually perceptible indication to user when a wireless message from a base unit 24a-24g, including a wireless sensor detection event message, has been received by master controller 22a-22c. In such a preferred embodiment where at least a light or lamp, e.g., LED 50a and/or 50b, is used to provide a visually perceptible indication of establishment of a wireless link, processor 84 activates, e.g., energizes, LED 50a and/or 50b upon processor 84 and/or radio 92 detecting receipt of wireless message from transmitting base unit 24a-24g. In another such preferred embodiment where the same light or lamp, e.g., LED 50a and/or 50b, is used to provide a visually perceptible indication of when one of the base units 24a-24g has experienced a sensor detection event, processor 84 activates the LED 50a and/or 50b upon processor 84 and/or radio 92 detecting receipt of wireless message from that transmitting base unit 24a-24g that triggered into sending wireless message by experiencing the sensor detection event.

When not being activated upon establishment of a wireless link or receipt of a wireless sensor detection event message, processor 84 can be configured in firmware and/or software to operate the light or lamp, e.g., LED 50a and/or 50b, in a manner that provides a different visually perceptible indication of some other status, condition or other event of alarm system 20, including a status, condition or other event of master controller 22a-22c. In one such implementation of a preferred master controller method of operation, processor 84 can be configured (a) to activate the at least one visually perceptible indicator 46, 48, 52, and/or 61, preferably at least the light or lamp, e.g., LED 50a and/or 50b, in a first visually perceptible indication mode that outputs one type of visually perceptible indication when processor 84 has detected or been communicated occurrence of a status, condition or other event different than establishment of a wireless link or receipt of a wireless sensor detection event message, and (b) to activate the at least one visually perceptible indicator 46, 48, 52, and/or 61, preferably at least the same light or lamp, e.g., LED 50a and/or 50b, in a second visually perceptible indication mode to output a second type of visually perceptible indication upon establishment of a wireless link or receipt of a wireless sensor detection event message. In a further such method implementation, processor 84 can be configured (a) to activate the at least one visually perceptible indicator 46, 48, 52, and/or 61, preferably at least the light or lamp, e.g., LED 50a and/or 50b, in a first visually perceptible indication mode that outputs one type of visually perceptible indication when processor 84 has detected or been communicated occurrence of a status, condition or other event different than establishment of a wireless link or receipt of a wireless sensor detection event message, e.g., power up or being operational, (b) to activate the at least one visually perceptible indicator 46, 48, 52, and/or 61, preferably at least the same light or lamp, e.g., LED 50a and/or 50b, in a second visually perceptible indication mode to output a second type of visually perceptible indication upon one of establishment of a wireless link and receipt of a wireless sensor detection event message, and (c) to activate the at least one visually perceptible indicator 46, 48, 52, and/or 61, preferably at least the same light or lamp, e.g., LED 50a and/or 50b, in a third visually perceptible indication mode to output a third type of visually perceptible indication upon the other one of wireless link establishment and receipt of wireless sensor detection event message.

In one such method implementation, processor 84 is configured to activate the at least one visually perceptible indicator 46, 48, 52, and/or 61, preferably at least LED 50a and/or 50b, in the first mode to provide a visually perceptible indication of controller 22a-22c being powered up. In one such preferred method implementation, processor 84 is configured to activate the at least one visually perceptible indicator 46, 48, 52, and/or 61, preferably at least LED 50a and/or 50b, in the second mode when a wireless link between master 22a-22c and one of the base units 24a-24g has been established. In another such preferred method implementation, the processor 84 is configured to activate the at least one visually perceptible indicator 46, 48, 52, and/or 61, preferably at least LED 50a and/or 50b, in the second mode when the link established was due to a wireless sensor detection event message from transmitting base unit 24a-24g. In a still further preferred method implementation, processor 84 is configured (a) to activate the at least one visually perceptible indicator 46, 48, 52, and/or 61, preferably at least LED 50a and/or 50b, in one of a second and third mode when a wireless link has been established, and (b) to activate the at least one visually perceptible indicator 46, 48, 52, and/or 61, preferably at least LED 50a and/or 50b, in the other one of the second and third mode when the link established was by a wireless sensor detection event message.

Where the at least one visually perceptible indicator is or includes at least one LED, e.g., LED 50a and/or 50b, the first mode can be provided or defined by a first illumination pattern, a first on-off, e.g., flashing, sequence, a first brightness level, a first color or the like of LED 50a and/or 50b, and the second mode can be defined by a second illumination pattern, a second on-off, e.g., flashing, sequence, a second brightness level, a second color or the like of LED 50a and/or 50b. Where processor 84 is configured in firmware and/or software to operate the at least one visually perceptible indicator that includes at least one LED, e.g., LED 50a and/or 50b, in a third mode, the third mode can be defined by a third illumination pattern, a third on-off, e.g., flashing, sequence, a third brightness level, a third color or the like of LED 50a and/or 50b.

In another preferred master controller method of operation, master controller 22a-22c has a display interface 45, such as depicted in FIG. 3, having a plurality of visually perceptible indicators 46, 48, 52, and/or 61 which can be or include lights or lamps, e.g., LEDs 50a and/or 50b, with one light or lamp, e.g., LED 50a, activated to provide a visually perceptible indication of when controller 22a-22c is powered up and another LED 50b being activated by processor 84 upon processor 84 detecting establishment of a wireless link and/or receipt of a wireless sensor detection event message. In such a method implementation, processor 84 can be configured to cause one LED 50a to flash or otherwise light up to indicate master 22a-22c being powered, e.g., operational, and configured to cause another LED 50b to flash or otherwise light up to indicate when a wireless message, preferably a wireless sensor detection event message, sent by one of base units 24a-24g has been received by controller 22a-22c. In one such preferred method implementation, one LED 50a has one color, e.g. red, which is activated, e.g., energized or lit up, by processor 84 when controller 22a-22c is powered up, and another LED 50b has a different color, e.g. green, which is activated by processor 84 when a wireless link between controller 22a-22c and one of base units 24a-24g has been established. In another such preferred method implementation, one LED 50a has one color, e.g. red, which is activated, e.g., energized or lit up, by processor 84 when controller 22a-22c is powered up, and another LED 50b has a different color, e.g. green, which is activated by processor 84 when a wireless sensor detection event message transmitted by one of base units 24*a*-24*g* has been received by controller 22*a*-22*c*.

If desired, master controller processor 84 can be configured in firmware and/or software to cause at least one other type of user perceptible indicator to be activated upon establishment of a wireless link with base unit 24*a*-24*g*. In one such implementation of a master controller method operation, processor 84 can be configured to cause activation of the at least one other type of user type of user perceptible indicator, e.g., at least one of user perceptible indicators 72 and/or 78, when such a wireless link with controller 22*a*-22*c* has been established. In another such implementation of a master controller method operation, processor 84 can be configured to cause activation of the at least one other type of user type of user perceptible indicator, e.g., at least one of user perceptible indicators 72 and/or 78, when a wireless sensor detection event message from one of base units 24*a*-24*g* has been received by master controller 22*a*-22*c*.

In one preferred method implementation, processor 84 is configured in firmware and/or software to activate an audibly perceptible indicator 72, such as an audible transducer 74, preferably a buzzer 76, to provide a user of controller 22*a*-22*c* with an audibly perceptible indication when a wireless link has been established between master 22*a*-22*c* and one of the base units 24*a*-24*g*. In one such preferred method implementation, processor 84 is configured to activate such an audibly perceptible indicator 72, e.g., audible transducer 74, preferably buzzer 76, to output user audible indication when a wireless sensor detection event message from one of base units 24*a*-24*g* has been received by controller 22*a*-22*c*.

In another preferred method implementation, processor 84 is configured in firmware or software to activate a tactile perceptible indicator 78, such as a tactile transducer 79, preferably a vibrating oscillator 80, to provide a user of controller 22*a*-22*c* with a tactile perceptible indication when a wireless link has been established between the controller 22*a*-22*c* and base unit 24*a*-24*g*. In another such preferred method implementation, processor 84 is configured to activate such a tactile perceptible indicator 78, e.g., vibrating transducer 79, preferably vibrating oscillator 80, to output user tactile indication when a wireless sensor detection event message transmitted by one of base units 24*a*-24*g* has been received.

In a currently preferred embodiment where master controller 22*a*-22*c* is equipped with manipulable controls 64*a*-64*f* equipped with corresponding visually perceptible indicators 49*a*-49*f*, preferably buttons 66*a*-66*f* equipped with respective LEDs 67*a*-67*f*, controller 22*a*-22*c*, preferably controller processor 84, is configured in firmware and/or software to activate or energize the particular control-disposed visually perceptible indicator 49*a*-49*f*, preferably the particular button-equipped LED 67*a*-67*f*, corresponding to the base unit device number or DEV NUM # of the particular base unit 24*a*-24*f* that transmitted a wireless sensor detection event message received by controller 22*a*-22*c* to provide a visually perceptible alarm to master controller user. In a preferred embodiment and method of master controller operation, master controller processor 84 also is configured to activate audibly perceptible indicator 72, preferably audible transducer 74, more preferably buzzer 76, and/or tactile perceptible indicator 78, preferably tactile transducer 79, more preferably vibrator or vibration alarm 80, to provide an audibly perceptible and/or tactile perceptible alarm to user when an LED 67*a*-67*f* alarm is activated. Where a sensor detection event wireless message has been sent to master controller 22*a*-22*c* by a particular base unit 24*a*-24*f* that experienced a sensor detection event, master controller 22*a*-22*c* is configured in firmware and/or software to cause the particular LED 67*a*-67*f* of the respective button 66*a*-66*f* having the same device number or DEV NUM # as the particular transmitting base unit 24*a*-24*f* to light up, preferably flash. Doing so provides user of controller 24*a*-24*c* with a visually perceptible alarm with the particular LED 67*a*-67*f* light up, e.g., flashing, as a result indicating to user which particular base unit 24*a*-24*f* encountered a sensor detection event causing it to wirelessly link with controller 24*a*-24*c*. This advantageously enables user to be able to go over to the particular alarming base unit 24*a*-24*c* to check on it and/or any device monitored thereby.

Processor 84 preferably is configured in firmware and/or software to drive the LED 67*a*-67*f* of manipulable control 64*a*-64*f*, preferably button 66*a*-66*f*, corresponding to a device identifier, preferably device number or DEV NUM, of the particular sensor base unit 24*a*-24*f* associated therewith which has transmitted a wireless sensor detection event message to master controller 22*a*-22*c* thereby providing user with a visually perceptible indication of exactly which base unit 24*a*-24*f* experienced the sensor detection event. Processor 84 preferably is further configured in firmware and/or software to enable user to acknowledge receipt of wireless sensor event message from the particular wireless sensor detection event message transmitting base unit 24*a*-24*f* that encountered the sensor detection event by pressing the particular manipulable control 64*a*-64*f*, preferably button 66*a*-66*f*, having the light up or flashing LED 67*a*-67*f* associated with the wireless sensor detection event message transmitting base unit turning off LED 67*a*-67*f*. As such, processor 84 is configured in firmware and/or software to keep lit up or flashing the LED 67*a*-67*f* of the particular manipulable control 64*a*-64*f*, e.g., particular button 66*a*-66*f*, associated with the specific one of base units 24*a*-24*f* which transmitted the sensor detection event message until the particular control 64*a*-64*f*, e.g., button 66*a*-66*f*, is manipulated by user turning the LED 67*a*-67*f* off. Where such an audibly perceptible alarm and/or tactile perceptible alarm is provided, it can be and preferably is substantially continuously provided until master controller user manipulates the particular control 64*a*-64*f*, preferably pressing corresponding specific button 66*a*-66*f*, which turns the associated LED 67*a*-67*f* off.

Where each button 66*a*-66*f* is equipped with a corresponding LED 67*a*-67*f*, LED(s) 50*a* and/or 50*b* are not needed and preferably not used. Where each button 66*a*-66*f* is equipped with a corresponding LED 67*a*-67*f*, one of the button-disposed or button-carried LEDs 67*a*-67*f* can be and preferably is configured to operate as a power indicator in place of one of removed LEDs 50*a* and/or 50*b*. In such a currently preferred embodiment, where each button 66*a*-66*f* is equipped with a corresponding LED 67*a*-67*f*, master controller 22*a*-22*c* preferably has no LED 50*a* and preferably also has no LED 50*b*.

Master Controller Controls and Controls Operation

With continued reference to FIGS. 5-7, each one of master controller controls 64*a*-64*f*, preferably control buttons 66*a*-66*f*, operably cooperate(s) with a corresponding one of switches 70*a*-70*f* when manipulated by user of controller 22*a*-22*c* to cause the particular switch to close during alarm system operation including when a base unit 24*a*-24*f* is being paired with the controller 22*a*-22*c*, as well as when communicating with each paired base unit 24*a*-24*f* during alarm system operation, including when polling particular base unit 24a-24f, e.g., by device number or DEV NUM #, after being paired. During pairing of a particular one of base units 24a-24f with controller 22a-22c, a specific one of buttons 66a-66f pressed by user causes corresponding one of switches 70a-70f to close thereby assigning the specific button depressed by user to the particular base unit 24a-24f being paired with controller 22a-22c. From that point on, that particular base unit 24a-24f remains associated with the specific button 66a-66f of controller 22a-22c pressed by user during pairing of particular base unit 24a-24f with controller 22a-22c until being un-paired.

Once a particular base unit 24a-24f is paired with controller 22a-22c and assigned, e.g., by base unit DEV NUM #, to a specific control button 66a-66f, thereafter pressing the specific button 66a-66f in the future wirelessly links controller 22a-22c to that particular base unit 24a-24f. This enables master controller user pressing the specific button 66a-66f associated with the particular base unit 24a-24f to wirelessly poll that particular base unit 24a-24f requesting the particular base unit 24a-24f to wirelessly communicate back its status to controller 22a-22c. In doing so, the particular polled base unit 24a-24f advantageously confirms that it still is in radio frequency communications range of controller 22a-22c. If desired, in addition to controller 22a-22c being able to poll each base unit 24a-24f paired therewith, processor 84 is configured in firmware and/or software to send wireless messages to a particular one, more than one, or all of the paired base units 24a-24f containing a message identifier, MSG ID 141, holding a command for the intended base unit(s) 24a-24f to carry out.

Each one of normally open switches 70a-70f of controller 22a-22c is not only connected to a corresponding I/O port or pin of processor 84, but is also connected between supply voltage, V$_{DD}$, and ground, GND, such that pressing any single one of buttons 66a-66f closes the switch 70a-70f associated with pressed button 66a-66f thereby causing the particular button control line of the I/O port or pin connected to the closed switch 70a-70f to go high indicating to processor 84 that the particular button 66a-66f associated with the closed switch 70a-70f has been pressed. One end of each switch 70a-70f, preferably the normally open end, is tied to V$_{DD}$, and the other end of each switch is tied to ground, GND, by a pull down resistor that maintains a low enough voltage when switch 70a-70f is open, e.g. when its corresponding button 66a-66f has not been pressed, to present a logic low condition to the corresponding processor I/O port or pin to which the switch 70a-70f is connected. When one of the buttons 66a-66f is pressed, its corresponding switch 70a-70f is closed causing the voltage level applied to the associated I/O port or pin connected to the closed switch 70a-70f to change from a low logic condition to a high logic condition. Where there also is an LED 67a-67f associated with each switch 70a-70f, each switch 70a-70f can be in series with corresponding LED 67a-67f being connected to supply voltage, V$_{DD}$, at one end and connected to node ground, LED GND 73, of processor 84 at an opposite end such as is depicted in user manipulable control and user-perceptible display interface circuit 89 of FIG. 8 previously discussed above.

In a method of pairing an alarm system member, preferably a base unit 24a-24f, with controller 22a-22c, the particular alarm system member, preferably the particular base unit 24a, 24b, 24c, 24d, 24e, or 24f, being paired with controller 22a-22c is assigned to a specific single one of the controls 64a, 64b, 64c, 64d, 64e, or 64f of the controller 22a-22c by user manipulating the specific control 64a, 64b, 64c, 64d, 64e, or 64f that user desires to configure controller processor 84 in firmware and/or software to thereafter be associated with the particular base unit 24a, 24b, 24c, 24d, 24e, or 24f being paired. Master controller processor 84 is configured in firmware and/or software to initiate an alarm system member pairing procedure, preferably base unit pairing procedure, when a wireless message that is a pairing request message is received from the particular alarm system member, preferably base unit 24a, 24b, 24c, 24d, 24e, or 24f, which user is seeking to pair with controller 22a-22c. In a preferred alarm system embodiment, each alarm system member, e.g., base unit(s) 24a-24f, configured in its own firmware and/or software to be paired with a master controller 22a-22c of an alarm system 20 preferably also has at least one user-manipulable control the user manipulates to cause such a wireless pairing request message to be broadcast to controller 22a-22c.

In one aspect, before base unit(s) 24a-24f send messages which may relate to pairing, base unit(s) 24a-24f may temporarily disconnect antenna 96 via RF switch 95. This "non-antenna" low pairing message broadcast range mode of communication still operates radio 92 of master controller wireless communications system 86 but disables antenna 96 by turning off or electrically disconnecting antenna 96 from radio 92 thereby providing a pairing message broadcast range that is less than the broadcast range of polling messages, task messages and other non-pairing messages wirelessly communicated between controller 22a-22c and base units 24a-24f after pairing.

In a preferred method implementation, the processor 84 of controller 22a-22c is configured in firmware and/or software when operating in pairing mode with the RF switch 95 off or in a mode electronically disconnecting antenna 96 from radio 92 of controller 22a-22c limiting wireless broadcast range of pairing messages from controller 22a-22c to a base unit 24a-24f being paired therewith to no more than one-half, preferably no more than one-quarter, and more preferably no more than one-tenth the wireless broadcast range of non-pairing wireless messages, including polling message and task messages, transmitted from controller 22a-22c to base unit(s) 24a-24f. In one such preferred implementation, when the controller 22a-22c operates in pairing mode or is put into pairing mode, such as by a user of the controller 22a-22c and/or receipt by controller 22a-22c of a wireless pairing message from a particular one of the base units 22a-22f being paired with controller 22a-22c, controller 22a-22c is configured in firmware and/or software to cause RF switch 95 to disconnect antenna 96 of controller 22a-22c from radio 92 of controller 22a-22c so that wireless pairing messages from controller 22a-22c have such a reduced wireless broadcast or transmission range the preferably is no more than 400 feet, preferably no more than 250 feet, more preferably no more than 125 feet, and still more preferably no more than 75 feet. After pairing is completed and/or controller 22a-22c is taken out of pairing mode, processor of controller 22a-22c is configured in firmware and/or software to cause the RF switch 95 to connect or re-connect antenna 96 to radio 92 so wireless non-pairing messages, including polling messages, task messages and the like are wirelessly transmitted in accordance with the much greater wireless message broadcast range(s) or transmission distance(s) disclosed elsewhere herein.

If desired, each base unit 24a-24f can also be configured in firmware and/or software to operate in a pairing mode where the base unit processor sets, operates or otherwise causes the RF switch of base unit 24a-24f to disconnect base unit radio from base unit antenna during pairing with master controller 22*a*-22*c* thereby limiting wireless pairing message broadcast range or transmission distance to no more than one-half, preferably no more than one-quarter, and more preferably no more than one-tenth the wireless broadcast range or wireless transmission distance of non-pairing wireless messages during pairing, and preferably limiting wireless pairing message broadcast range or transmission distance no more than 400 feet, preferably no more than 250 feet, more preferably no more than 125 feet, and still more preferably no more than 75 feet. After pairing is completed and/or base unit 24*a*-24*f* is taken out of pairing mode, processor of base unit 24*a*-24*f* is configured in firmware and/or software to cause base unit RF switch to connect or re-connect base unit antenna to base unit radio so wireless non-pairing messages, including polling messages, task messages and the like are wirelessly transmitted in accordance with the much greater wireless message broadcast range(s) or transmission distance(s) disclosed elsewhere herein.

Each wireless pairing request message preferably is formed of packet(s) 124 or 124' of corresponding packet format 125 or 125' where the payload 128 contains pairing request data that controller processor 84 is configured in firmware and/or software to initiate the pairing procedure when received by controller 22*a*-22*c*. Each packet 124 or 124' of such a wireless pairing request message broadcast by the particular alarm system member, preferably base unit 24*a*, 24*b*, 24*c*, 24*d*, 24*e*, or 24*f*, sought to be paired is configured with a packet payload 128 that holds data indicating the particular alarm system member, preferably base unit 24*a*, 24*b*, 24*c*, 24*d*, 24*e*, or 24*f*, sought to be paired is unpaired.

In a preferred pairing request packet embodiment, the payload 128 of each packet 124 or 124' of a preferred wireless pairing request message contains at least one byte of data preferably holding a pairing request message identifier with controller processor 84 and/or radio 92 configured in firmware and/or software to carry out the pairing procedure when a packet of a wireless message from one of the alarm members, i.e., one of base units 24*a*-24*f*, received and decoded by controller 22*a*-22*c* contains such a pairing request message identifier. In one preferred pairing procedure implementation, controller processor 84 is configured in firmware and/or software to initiate the pairing procedure when a received wireless message contains a packet with a payload 128 having a particular predetermined null value that processor 84 is configured in firmware and/or software to interpret as being or corresponding to a pairing request identifier. In one preferred wireless pairing request message packet implementation, each byte of the payload 128 of each wireless pairing request message packet contains such a null value such that processor 84 automatically executes the pairing procedure when such a wireless pairing request message packet is received by controller 22*a*-22*c*.

In one such preferred wireless pairing request packet implementation, each one of the alarm system identifier holders, namely ALARM ID0 133, ALARM ID1 135, ALARM ID2 137 and ALARM ID3 139, of the wireless pairing request packet payload 128 holds a polling request value that preferably is a predetermined null value, such as preferably hex value 0xFF. Controller processor 84 can be and preferably is configured in firmware and/or software to initiate the pairing procedure when such a predetermined null value, preferably 0xFF, is detected or determined as being in a wireless message packet received by controller 22*a*-22*c*. The message identifier, MSG ID 141, preferably also holds a polling request value that preferably also is a predetermined null value, such as preferably hex value 0x02. Controller processor 84 can also be and preferably is configured in firmware and/or software to initiate the pairing procedure when such a predetermined null value, preferably 0x02, is detected or determined as being in a wireless message packet received by controller 22*a*-22*c*. In addition, the device identifier, preferably broadcasting device identifier, DEV NUM 143, preferably also holds a polling request value that preferably is set to a value, e.g. null value, such as preferably hex value 0xFF, which controller processor 84 is configured in software and/or firmware to interpret as coming from an alarm system member, preferably base unit 24*a*, 24*b*, 24*c*, 24*d*, 24*e*, or 24*f* that lacks a controller-assigned device identifier or device number. Controller processor 84 can also be and preferably is configured in firmware and/or software to initiate the pairing procedure when such a predetermined null value, preferably 0xFF, is detected or determined as being in a wireless message packet received by controller 22*a*-22*c*. In a preferred operating method in carrying out pairing, processor 84 preferably is configured in firmware and/or software to initiate the pairing procedure when a wireless message is received containing a packet 124 a 124' where any one, more or preferably all of ALARM ID0 133, ALARM ID1 135, ALARM ID2 137, ALARM ID3 139, MSG ID 141, and/or DEV NUM 143 of the packet payload 128 hold(s) a pairing request message identifier that preferably is a corresponding one of predetermined null values, preferably 0xFF, 0x02, and/or 0xFF.

Once controller 22*a*-22*c* receives a wireless message from one of base units 24*a*-24*f* containing such a pairing request and initiates the pairing procedure, processor 84 is configured in firmware and/or software to drive at least one user-perceptible indicator onboard controller 22*a*-22*c* to provide feedback to user that the pairing procedure has been initiated. In such a preferred pairing procedure implementation, each user-perceptible indicator driven upon initiation of pairing preferably continues to be driven for either a predetermined period of time and/or until user manipulates a desired specific one of controls 64*a*, 64*b*, 64*c*, 64*d*, 64*e*, or 64*f*, preferably presses a desired specific one of buttons 66*a*, 66*b*, 66*c*, 66*d*, 66*e*, or 66*f*, in order to assign the specific control 64*a*, 64*b*, 64*c*, 64*d*, 64*e*, or 64*f*, preferably the specific button 66*a*, 66*b*, 66*c*, 66*d*, 66*e*, or 66*f*, to the particular alarm system member, preferably the particular base unit 24*a*, 24*b*, 24*c*, 24*d*, 24*e*, or 24*f* that broadcast the wireless pairing request message.

In a preferred embodiment and implementation, where controller 22*a*-22*c* is equipped with either or both a buzzer 76 and/or vibrator 80, processor 84 is configured in firmware and/or software to drive buzzer 76 and/or vibrator 80, such as by being beeped or pulsed, upon initiation of the pairing procedure by base unit 24*a*, 24*b*, 24*c*, 24*d*, 24*e*, or 24*f* until completion of the pairing procedure. Upon completion of the pairing procedure when the alarm system member, preferably base unit 24*a*, 24*b*, 24*c*, 24*d*, 24*e*, or 24*f*, seeking to be paired with controller 22*a*-22*c* has indeed been paired with controller 22*a*-22*c*, processor 84 is configured to stop driving or turn off buzzer 76 and/or vibrator 80.

In such a preferred pairing procedure, processor 84 is configured to assign the alarm system identifier, ALARM ID 127, unique to the particular alarm system network 26 and alarm system 20 to the particular alarm system member, preferably to the particular base unit 24*a*, 24*b*, 24*c*, 24*d*, 24*e*, or 24*f*, being paired with controller 22*a*-22*c*. Upon user assigning the desired specific control 64*a*, 64*b*, 64*c*, 64*d*, 64*e*, or 64*f*, preferably specific button 66*a*, 66*b*, 66*c*, 66*d*, 66*e*, or 66*f*, of controller 22*a*-22*c* to the particular alarm system member, preferably the particular base unit 24a, 24b, 24c, 24d, 24e, or 24f, seeking to be paired, controller processor 84 is configured to send a wireless pairing confirmation message to the particular alarm system member, preferably the particular base unit 24a, 24b, 24c, 24d, 24e, or 24f, which provides pairing information including the unique alarm system identifier, ALARM ID 127, e.g., such as in the form of ALARM ID0 133, ALARM ID1 135, ALARM ID2 137 and ALARM ID3 139, and device identifier or device number, DEV NUM #, corresponding to the specific control 64a, 64b, 64c, 64d, 64e, or 64f, preferably specific button 66a, 66b, 66c, 66d, 66e, or 66f, associated therewith when manipulated or pressed by user during pairing.

In such a preferred pairing procedure, processor 84 preferably is therefore configured to assign a specific identifier or identifier number to a particular base unit 24a-24f when paired, preferably during pairing, with controller 22a-22c that preferably also corresponds to the particular one of the controls 64a-64f, preferably buttons 66a-66f, associated with the particular base unit 24a-24f during pairing with controller 22a-22c. In one such pairing procedure implementation, (a) a first one of the base units, e.g., base unit 24a, is paired with controller 22a-22c and assigned a first one of a plurality of device identifiers or device numbers, e.g., DEV NUM #1, by user manipulating first control 64a, preferably by pressing first button 66a, e.g., button #1, during pairing of base unit 24a with controller 22a-22c thereby also assigning first base unit 24a to first control 64a, preferably to first button 66a, (b) a second one of the base units, e.g., base unit 24b, is paired with controller 22a-22c and assigned a second one of a plurality of device identifiers or device numbers, e.g., DEV NUM #2, by user manipulating second control 64b, preferably by pressing second button 66b, e.g., button #2, during pairing of base unit 24b with controller 22a-22c thereby also assigning second base unit 24b to second control 64b, preferably to second button 66b, (c) a third one of the base units, e.g., base unit 24c, is paired with controller 22a-22c and assigned a third one of a plurality of device identifiers or device numbers, e.g., DEV NUM #3, by the user manipulating a third control 64c, preferably by pressing third button 66c, e.g., button #3, during pairing of base unit 24c with controller 22a-22c thereby also assigning third base unit 24c to third control 64c, preferably to first button 66c, (d) a fourth one of the base units, e.g., base unit 24d, is paired with controller 22a-22c and assigned a fourth one of a plurality of device identifiers or device numbers, e.g., DEV NUM #4, by user manipulating fourth control 64d, preferably by pressing fourth button 66d, e.g., button #4, during pairing of fourth base unit 24d with controller 22a-22c thereby also assigning fourth base unit 24d to fourth control 64d, preferably to fourth button 66d, (e) a fifth one of the base units, e.g., base unit 24e, is paired with controller 22a-22c and assigned a fifth one of a plurality of device identifiers or device numbers, e.g., DEV NUM #5, by user manipulating fifth control 64e, preferably by pressing fifth button 66e, e.g., button #5, during pairing of fifth base unit 24e with controller 22a-22c thereby also assigning fifth base unit 24e to fifth control 64e, preferably to fifth button 66e, and (e) a sixth one of the base units, e.g., base unit 24f, is paired with controller 22a-22c and assigned a sixth one of a plurality of device identifiers or device numbers, e.g., DEV NUM #6, by user manipulating sixth control 64e, preferably by pressing sixth button 66e, e.g., button #6, during pairing of sixth base unit 24f with controller 22a-22c thereby also assigning sixth base unit 24f to sixth control 64f, preferably to sixth button 66f.

As previously discussed, each one of manipulable controls 64a-64f, e.g., buttons 66a-66f, of master controller 22a-22c includes or operatively cooperates with corresponding switches 70a-70f, preferably normally open tactile switches, each of which is connected to an associated I/O port or pin of processor 84 configured in firmware or software to control operation of a corresponding one of a plurality, preferably at least a plurality of pairs, i.e., at least three, of base units 24a-24f, once each base unit 24a-24f has been paired with the controller 22a-22c and assigned by or in processor 84 to a specific one of controls 64a-64f. Where each control 64a-64f corresponds to an associated physical manipulable button 66a-66f, each base unit is assigned by processor 84 to a specific one of buttons 66a-66f as part of pairing procedure.

Processor 84 preferably is configured in firmware and/or software to monitor each one of its button control lines, i.e., each I/O port or pin connected to corresponding one of the switches 70a-70f, and cause one of a plurality of different alarm system tasks to be executed depending upon whether only a single one of the control buttons 66a-66f is pressed or whether a plurality of the buttons 66a-66f are pressed at the same time. Processor 84 preferably is configured to cause at least one of a plurality of different tasks to be executed when a single button 66a-66f is pressed and at least one other of the plurality of different tasks to be executed when a plurality of buttons 66a-66f are pressed at the same time.

In one preferred method of master controller operation, processor 84 is configured in firmware and/or software to cause at least one of a plurality of different alarm system tasks to be executed depending on how long a single one of the buttons 66a-66f is pressed with processor 84 preferably configured (a) to cause a first one of the plurality of tasks to be executed when single button 66a-66f is pressed for a button press time period that is less than a predetermined task determining period of time, and (b) to cause a second one of the plurality of tasks to be executed when single button 66a-66f is pressed for a button press time period that is longer than the task determining period of time. In one preferred method implementation, processor 84 is further configured to cause at least one, e.g., another one, of such a plurality of tasks to be executed depending on how long a plurality of substantially simultaneously pressed buttons 66a-66f remain substantially simultaneously pressed with processor 84 preferably configured (a) to cause a third one of such a plurality of tasks to be executed when the plurality of pressed buttons 66a-66f remain substantially simultaneously pressed for a simultaneous button press time period that is less than such a task determining period of time, and (b) to cause a fourth one of such a plurality of tasks to be executed when the plurality of pressed buttons 66a-66f remain substantially simultaneously pressed for a simultaneous button press time period that is longer than such a task determining period of time. In one such preferred method implementation, the task determining period of time used by processor 84 when a single button 66a-66f is pressed to determine which one of the first and second of the plurality of tasks is to be executed can be and preferably is substantially the same as or equal to the task determining period of time used by processor 84 when a plurality of buttons 66a-66f are pressed at the same time to determine which one of the third and fourth of the plurality of tasks is to be executed.

In one preferred method implementation, when a single button 66a-66f is pressed, processor 84 is configured (a) to cause a first one of a plurality of alarm system tasks to be executed by the particular base unit 24a-24f associated, preferably by device number or DEV NUM #, during pairing with the specific single button 66a-66f when the specific button 66a-66f is pressed for a button press time period less than the task determining period of time, and (b) to cause a second one of the plurality of alarm system tasks to be executed by the particular base unit 24a-24f if the single button 66a-66f associated during pairing with the particular base unit is pressed for a button press time period longer than the task determining period of time. Processor 84 can be and preferably is further configured to cause a third one of the plurality of alarm system tasks to be carried out, such as by controller 22a-22c, when a plurality of buttons 66a-66f are pressed at the same time.

In one such preferred method implementation, (a) one of the plurality of tasks processor 84 is configured in firmware and/or software to cause to be executed when a single button 66a-66f is pressed for a first duration of time is to send a wireless message to the particular base unit 24a-24f associated during pairing with the specific single pressed button 66a-66f polling the particular associated base unit 24a-24f thereby causing the associated base unit 24a-24f to send a reply wireless message to controller 22a-22c that communicates to controller 22a-22c at least one of a plurality of different statuses or conditions of the particular associated base unit 24a-24f, and (b) another one of the plurality of tasks processor 84 is configured to cause to be executed when a single button 66a-66f is pressed for a second duration of time different than the first duration of time is a control task, which preferably activates or otherwise controls, something onboard the particular base unit 24a-24f associated during pairing with the specific single button 66a-66f pressed.

Preferably, processor 84 is configured (a) to poll the particular base unit 24a-24f associated with the specific single button 66a-66f pressed when pressed for a single button press time period that is no greater than the task determining time period, and (b) to control, preferably activate or otherwise perform, something onboard the particular associated base unit 24a-24f when the specific single button 66a-66f is pressed for a single button press time period that is longer than the task determining time period. Where each base unit 24a-24f has a visually perceptible indicator onboard, e.g., light, strobe, flasher, etc., the visually perceptible indicator onboard the particular base unit 24a-24f associated with the specific single controller button pressed is activated when the single button is pressed for a single button press time period at least as long as and preferably longer than the task determining time period.

In one such preferred method implementation, processor 84 is configured with a task determining period of time of about two seconds, preferably exactly two seconds. In another preferred method implementation, the processor 84 is configured with a task determining period of time of about three seconds, preferably exactly three seconds. In a still further preferred method implementation, processor 84 is configured to enable a user to set the task determining period.

In yet another preferred method implementation, once the task to be performed has been determined by pressing the single specific or particular button 66a-66f for a particular task determining time period, processor 84 is then further configured to initiate or carry out the task until the single specific or particular button 66a-66f has been pressed again. If desired, processor 84 can be configured to cause the particular determined task to not only be initiated but actually be constantly performed until the single specific or particular button 66a-66f is again pressed.

Where each base unit 24a-24f has a visually perceptible indicator onboard, e.g., light, strobe, and/or flasher, the visually perceptible indicator onboard the particular base unit 24a-24f associated with the specific single controller button pressed is activated when the single specific button 66a-66f of master controller is manually pressed by a user of the master controller for a single button press time period that is at least as long as and preferably longer than the task determining time period. Thereafter, the visually perceptible indicator, preferably light, strobe, and/or flasher, onboard the particular base unit 24a-24f associated with the specific single controller button of the master controller that was pressed remains activated or on until the same specific button 66a-66f of master controller 24a-24f is pressed again deactivating it or turning it off.

In other words, while pressing a specific button 66a-66f of master controller 24a-24f for a short duration, such as a momentary press, may cause a paired base unit 24a-24f to momentarily flash, pressing the specific button 66a-66f of master controller 22a-22c for a longer duration, such as 3 seconds, may cause the paired base unit 24a-24f to remain illuminated (at least until a subsequent poll command is received which may turn off such illumination). This constant illumination or "flashlight" mode of each base unit 24a-24f may be useful, for example, to cause a particular base unit 24a-24f operated in constant illumination or "flashlight" mode by a user of master controller 22a-22c to function as a visual locator beacon to help the user of the master controller 22a-22c to locate the particular base unit 24a-24f during low light conditions. In addition, this constant illumination or "flashlight" mode of each base unit 24a-24f may be useful as it also enables each base unit 24a-24f to be selectively or individually lit up by the user of master controller 22a-22c to cause the particular lit up base unit(s) 24a-24f to function as a flashlight or floodlight by illuminating an area surrounding the lit up base unit 24a-24f.

Processor 84 can be and preferably is further configured to monitor its button control lines and cause still another one of the plurality of tasks to be carried out when a plurality of buttons 66a-66f are pressed at the same time. In one preferred method implementation, processor 84 is configured to cause the third one of the plurality of tasks to be carried out by controller 22a-22c when a plurality of buttons 66a-66f are pressed at the same time. In one preferred method implementation, processor 84 is configured to put controller 22a-22c into a lower power, e.g., controller sleep mode, when a plurality of buttons 66a-66f are pressed at the same time advantageously increasing controller battery life by eliminating the need to remove batteries 98a, 98b when controller 22a-22c is not in use. Processor 84 preferably is configured to monitor its button control lines and put the controller 22a-22c into lower power mode, e.g., controller sleep mode, when a pair of adjacent buttons 66a-66f, preferably top two buttons 66a and 66d located side-by-side one another, are pressed at the same time for at least a predetermined amount of time, e.g., when both buttons are pressed down for at least the task determining period time.

In one such preferred method implementation, processor 84 is configured to put the controller 22a-22c into lower power mode by being configured to put at least the processor 84, wireless communications system 86, and RX/TX switch 94 into such a lower power or sleep mode when a plurality of buttons 66a-66f are substantially simultaneously pressed and remain pressed for at least a predetermined controller low power mode time threshold of at least a plurality of seconds, e.g., at least two seconds, preferably at least three seconds. In one such preferred method implementation, processor 84 is configured to put controller 22a-22c into such a lower power or sleep mode when any pair of side-by-side adjacent buttons 66a and 66d, 66b and 66e, or 66c and 66f are pressed at the same time and together remain pressed for at least a predetermined controller low power mode time threshold of at least a plurality of seconds, e.g., at least two seconds, preferably at least three seconds.

Processor 84 can be and preferably is configured to activate or drive at least one of the user perceptible indicators of controller 22a-22c when controller 22a-22c is entering the lower power mode, e.g., controller sleep mode. If desired, processor 84 can be configured to flash one or more of LEDs 50a and/or 50b, including in a particular flash pattern, when processor 84 is causing controller 22a-22c to enter the lower power mode, e.g., controller sleep mode. Where equipped with audibly perceptible indicator, e.g., buzzer 76, processor 84 can be and preferably is configured to activate buzzer 76 after processor 84 determines a plurality of buttons 66a and 66d have been simultaneously pressed longer than the controller low power mode time threshold before actually entering the lower power mode, e.g. controller sleep mode. If desired, processor 84 can be configured to drive buzzer 76 at a unique audible frequency, tone, or beeping pattern that provides an audibly perceptible indication to the user that controller 22a-22c is entering lower power mode, e.g. controller sleep mode. Where equipped with tactile perceptible indicator, e.g., vibrator 80, processor 84 can be and preferably is configured to activate vibrator 80 when controller 22a-22c is entering the lower power mode. If desired, processor 84 can be configured to drive vibrator 80 at a unique vibrating frequency, vibrating magnitude, or pulse pattern that provides tactile perceptible indication to user that controller 22a-22c is entering lower power mode.

In a preferred master controller method of operation, processor 84 is configured such that manipulating a specific one of the controls 64a-64f, such as by pressing a specific one of the buttons 66a-66f associated therewith, transmits a wireless message from controller 22a-22c to the particular base unit 24a-24f assigned to the specific control manipulated by user, e.g., assigned to the specific button pressed by user. The wireless message transmitted preferably includes a task or instruction to be carried out by the particular base unit associated with the specific control manipulated or specific button pressed. In one preferred controller method implementation, manipulating a specific control, e.g., pressing the specific button, assigned to a particular base unit wireless transmits a polling message from controller 22a-22c to the particular base unit assigned thereto. In such a method implementation, processor 84 is configured in firmware or software so that pressing first button 66a polls the particular base unit assigned to first button 66a during pairing of the particular base unit with controller 22a-22c such that a wireless polling message is transmitted from controller 22a-22c to the particular base unit. As such, (a) pressing button #1, e.g., first button 66a polls the particular base unit, e.g., base unit 24a, associated with, e.g., assigned to, button #1, e.g., first button 66a, and which was assigned device number #1 or DEV NUM #1 during pairing, (b) pressing button #2, e.g., second button 66b polls the corresponding particular base unit, e.g., base unit 24b, associated with button #2, e.g., second button 66b, and which was assigned device number #2 or DEV NUM #2 during pairing, (c) pressing button #3, e.g., third button 66c polls the corresponding particular base unit, e.g., base unit 24c, associated with button #3, e.g., third button 66c, and which was assigned device number #3 or DEV NUM #3 during pairing, (d) pressing button #4, e.g., fourth button 66d polls the corresponding particular base unit, e.g., base unit 24d, associated with button #4, e.g., fourth button 66d, and which was assigned device number #4 or DEV NUM #4 during pairing, (e) pressing button #5, e.g., fifth button 66e polls the corresponding particular base unit, e.g., base unit 24e, associated with button #5, e.g., fifth button 66e, and which was assigned device number #5 or DEV NUM #5 during pairing, (f) pressing button #6, e.g., sixth button 66f polls the corresponding particular base unit, e.g., base unit 24f, associated with button #6, e.g., sixth button 66f, and which was assigned device number #6 or DEV NUM #6 during pairing, and so forth.

Sensor Base Unit

FIGS. 12-14 illustrate a preferred but exemplary embodiment of a sensor-equipped base unit 24 constructed in accordance with the present invention that is an alarm detecting or monitoring module 145 that can be located, placed, mounted or otherwise disposed in an area desired to be monitored remote from the master controller 22a-22c with base unit 24 configured to wirelessly link with controller 22a-22c when base unit 24 has detected occurrence of a sensor detection event. Base unit 24 monitors at least one sensor 148 and preferably is capable of monitoring a plurality of sensors 148 and/or 150 during operation. Upon triggering of sensor 148 and/or 150 being monitored by base unit 24, base unit 24 wirelessly links with controller 22a-22c communicating to controller 22a-22c occurrence of the sensor detection event that triggered sensor 148 and/or 150. If desired, base unit 24 can be equipped with a plurality of pairs, i.e., at least three, of sensor 148, 150 and/or another such sensor, e.g., same as or similar to sensor(s) 148 and/or 150, with such a base unit 24 configured in firmware and/or software to monitor one sensor at a time, a plurality of sensors at substantially the same time, or even a plurality of pairs of sensors at substantially the same time. Including as discussed in more detail below, suitable sensors for use with or in base unit 24 as sensor 148 and/or sensor 150 include a proximity sensor, a motion sensor, a vibration sensor, e.g., vibration switch, a magnetic field sensor, a light sensor, a color sensor, e.g., color-change sensor, a radar sensor, an electric field sensor, a capacitance sensor, a touch sensor, a force sensor, a position sensor, an acceleration sensor, an angle sensor, a tilt sensor, e.g., tilt ball switch or sensor, a sound sensor, e.g., microphone, a noise sensor, a radiation sensor, an ultrasonic sensor, a Doppler-effect sensor, a temperature sensor, a shake sensor, a break-beam sensor, a pressure sensor, e.g. barometric pressure sensor, a humidity sensor, a rotary motion sensor, e.g. rotary encoder, a linear motion sensor, e.g., linear encoder, a plurality of the same aforementioned sensors, a plurality of any two or three different aforementioned sensors, or a combination of one or more of any of these sensors.

With continued reference to FIGS. 12-14, an exemplary base unit 24 has an enclosure 168 (FIG. 12) of relatively compact, lightweight, and weatherproof construction that weather-tightly houses a base unit circuit board 170 (FIG. 13) containing a base unit control circuit 172 (FIGS. 13-14) that includes processor 174, preferably a microcontroller 176, wireless communication system 178, which includes a transceiver 180, preferably radio 182, whose send and receive operation can be coordinated by RX/TX switch 184, connected to antenna 186. If desired, antenna 186 can be an elongate generally L-shaped antenna wire 187 that extends outwardly from circuit board 172, such as shown in FIGS.

12-13 that preferably is disposed within base unit enclosure 168. In a currently preferred base unit wireless communication system embodiment, antenna 186 preferably is a chip antenna (not shown), e.g., ceramic chip antenna (not shown), mounted to base unit circuit board 172. Base unit 24 includes (a) a pairing control 214, preferably a button-activated pair initiating switch 216, e.g., normally-open tactile switch, mounted to circuit board 170, manually actuated by user when user desires to wirelessly pair base unit 24 with controller 22a-22c, and (b) an erase control 218, preferably button-activated pairing erase switch 220, e.g., another normally-open tactile switch, mounted to board 170, manually actuated by user in order to "un-pair" or break the pairing between base unit 24 and controller 22a-22c thereafter enabling the "un-paired" base unit 24 to be paired with a different controller 22a-22c.

As previously discussed, controller 22a-22c is configured to enable a user-perceptible indication, e.g., remote sensor detection event alarm, to be provided to user carrying, e.g., holding, controller 22a-22c when a base unit 24 has wirelessly communicated to controller 22a-22b occurrence of a sensor detection event. If desired, base unit 24 can also be configured in firmware and/or software to be able to provide a user perceptible indication, e.g., local sensor detection event alarm, perceptible to a person or animal in relatively close proximity to base unit 24 upon triggering of sensor 148 and/or 150 being monitored by occurrence of such a sensor detection event. Where configured to enable a local sensor detection event alarm to be outputted by base unit 24, base unit 24 preferably is further configured in firmware and/or software to enable user to select or manually configure, including via master controller 22a-22c, whether or not base unit 24 is to provide such a user-perceptible indication, e.g., local sensor detection event alarm, perceptible to a person or animal in relatively close proximity to base unit 24, e.g. local to base unit 24, upon occurrence of a sensor detection event.

A primary function of base unit 24 is to monitor one or both of a plurality of sensors 148 and/or 150 and transmit a wireless sensor detection event message to controller 22a-22c to cause controller 22a-22c to output an alarm, e.g., a remote sensor detection event alarm, to user carrying or holding controller 22a-22c alerting user of occurrence of sensor detection event. Base unit 24 preferably also (a) can be configured or used as a standalone alarm that can be configured to provide a user-perceptible alarm indication of occurrence of a sensor detection event that is perceptible by a user located in relatively close proximity to base unit 24, and/or (b) can include or be a remotely triggered flashlight that also is operable as a remotely viewable signal light beacon that is remotely wirelessly triggered by user operating controller 22a-22c.

Base unit 24 can be and preferably also is of portable, transportable, compact, lightweight, durable, and all-weather construction producing a detecting or monitoring module 145 capable of not only being used not only as a standalone alarm module 147 of the present invention but also capable of being used together with or in conjunction with another device or apparatus including to preferably monitor operation and/or status of the device or apparatus. Where base unit 24 is used to monitor operation and/or status of another device or apparatus, base unit 24 preferably does so using one or more of a plurality of sensors, e.g. sensor(s) 148 and/or 150. Base unit 24, including its processor 174, can be preconfigured, e.g., hardwired or pre-programmed in firmware or software, for use as a single specific type of alarm, detector or monitor, e.g., single purpose alarm module, but preferably is configured, more preferably user configurable, including via processor firmware and/or software, for use in one of at least a plurality of different types of alarm, detecting or monitoring applications by being configurable, preferably user configurable, into one of a plurality of different types of alarms, detectors or monitors, e.g., multipurpose alarm module.

Where base unit 24 is configured for use as a standalone alarm, base unit 24 is configured in firmware and/or software with at least one standalone alarm mode that enables a user to manually select, set or otherwise manually configure at least a plurality of standalone alarm mode operating parameters of base unit 24 being put into standalone alarm mode operation. As part of standalone alarm mode configuration of base unit 24, base unit 24 preferably is configured to enable or even require user to set, select or manually configure at least plurality of such standalone alarm mode parameters before base unit can enter into standalone alarm mode. In one preferred standalone alarm mode implementation, base unit 24 is configured to enable the base unit wireless communication system to be turned off or put into sleep mode continuously while base unit 24 is operating in standalone alarm mode in order to maximize battery life. In one such preferred standalone alarm mode implementation, base unit 24 is configured to enable user to select whether base unit wireless communication system is turned off or put into sleep mode when base unit 24 is put into standalone alarm mode operation. In another such preferred standalone alarm mode implementation, base unit 24 is configured to automatically turn off base unit wireless communication system or put base unit wireless communication system into sleep mode when base unit 24 is operating in standalone alarm mode. When manually configuring base unit 24 for standalone alarm mode operation, base unit 24 is configured such that user can and preferably is required (a) to select which one of at least a plurality of sensors, e.g. sensors 148 and/or 150, are to be monitored by base unit 24 during standalone alarm mode operation, and/or (b) to select whether a user-perceptible indication, e.g., local alarm, is outputted by base unit 24 upon occurrence of a sensor detection event where a selected sensor 148 and/or 150 is triggered during operation of sensor 148 and/or 150 during base unit standalone alarm mode operation. In order to facilitate standalone alarm operation of base unit 24, base unit 24 can be and preferably is constructed and arranged not only to be physically portable but also to be capable of releasable mounting or removable anchoring to or at a desired monitoring site via a currently preferred base unit and docking assembly of the present invention shown in FIGS. 15-18 and discussed in more detail below.

Such a multipurpose alarm, detector or monitor base unit 24 of the present invention, including its processor 174, is configurable, preferably user configurable, including in firmware and/or software to select which one or both of at least a plurality of sensors 148 and/or 150 to monitor for occurrence of a sensor detection event triggering each monitored sensor(s) 148 and/or 150 and can be configurable, preferably user configurable, to select between a plurality of base unit alarm operating modes. Where equipped with a plurality of pairs, i.e., at least three, of sensors, e.g., sensors 148 and/or 150 and/or another sensor (not shown), base unit processor 174 preferably is configurable in firmware and/or software to enable selection, including by user, of whether only a single one of the sensors is to be monitored, whether a plurality of the sensors are to be substantially simultaneously monitored, or whether a plurality of pairs of the sensors are to be substantially simultaneously monitored during base unit operation. If desired, base unit 24 can be equipped with one or more switches, e.g., DIP switches, or the like which are user manipulable in configuring one or more of such base unit alarm operating modes including in pairing and/or selecting which sensor or sensors, e.g. sensor(s) 148 and/or 150, to be monitored during base unit operation.

When a sensor(s) 148 and/or 150 being monitored is triggered, a sensor detection event occurs, e.g., sensor detection event interrupt is generated, causing base unit 24 to wirelessly link with master controller 22a-22c and communicate occurrence of the sensor detection event to controller 22a-22c via a two-way wireless communication system 178. As with controller 22a-22c, base unit wireless communications system 178 sends and receives wireless messages formed of packet(s) 124 or 124' of a respective packet format 125 or 125' for use with the above-described low bandwidth digital data wireless radio frequency messaging protocol in accordance with the present invention that enables long range wireless communications at radio frequency transmission distances greater than one mile between transmitting and receiving members of alarm system 20 and network 26. As with controller 22a-22c, base unit wireless communications system 178 also is configured to operate in one or more modes of power-conserving operation that minimize battery power usage when listening for incoming wireless messages. As previously indicated and further discussed below, base unit wireless communication system 178 can be and preferably is constructed and arranged the same or substantially the same as master controller wireless communication system 86 and preferably also is configured in firmware and/or software the same or substantially the same as master controller wireless communication system 86.

With continued reference to FIGS. 12-14, base unit 24 also can and preferably does include at least one mode control 222, such as at least one mode selection switch 224 (FIG. 12), such as in the form of at least one user manipulable DIP switch 226, mounted to circuit board 170, such as depicted in FIGS. 12 and 13, enabling user to manually select between at least a plurality of base unit operating modes. In a preferred embodiment, mode control 222 is manipulable by user to select between at least one base unit operating mode that includes (a) a polling mode where base unit processor 174 and/or radio 182 is configured in firmware and/or software to not only enable bi-directional wireless communications between base unit 24 and master controller 22a-22c but also to enable master controller 22a-22c to wirelessly poll base unit 24 to ascertain an operational status of base unit 24 and/or whether base unit 24 is located within transmission range of controller 22a-22c, and (b) a non-polling mode where base unit processor 174 and/or radio 182 is configured in firmware and/or software such that base unit wireless communication system 178 does not respond to any poll request from master controller 22a-22c. As discussed in more detail below, when in non-polling mode, base unit 24 preferably is configured to still wirelessly broadcast sensor detection event messages to controller 22a-22c upon base unit 24 experiencing occurrence of a sensor detection event.

While processor 174 can be configured in firmware and/or software to simultaneously monitor a plurality of sensors 148 and 150 at the same time for occurrence of a sensor detection event when either sensor 148 or 150 is triggered, base unit 24 can be configured, such as in firmware and/or software via processor 174 and/or in hardware, e.g., user settable base unit sensor monitoring mode control(s), to selectively enable monitoring of only a single one of the plurality of sensors 148 or 150 at a time or to selectively enable monitoring of a plurality of sensor 148 and 150 at the same time. Where base unit 24 has more than one sensor, such as the case where base unit 24 is equipped with at least a plurality of sensors 148 and 150 but only needs to monitor a single sensor, base unit 24 can and preferably does have a sensor monitoring mode control 228, preferably a sensor selection switch 230, e.g., DIP switch 232, manipulable by user to select which one of the plurality of sensors 148 or 150 is monitored during base unit operation. Sensor monitoring mode control 228, preferably sensor selection switch 230, e.g., DIP switch 232, is user manipulated in one setting, position or state when user configures processor 174 to monitor one of the sensors 148 and user manipulated into another setting, position or state when user configures processor 174 to monitor another one of the sensors 150. Where base unit 24 is equipped with a plurality of pairs, i.e., at least three, of sensors, sensor monitoring mode control 228 can be configured to provide a plurality of pairs of sensor selection switch positions to enable user to choose which one of at least three of the base unit sensors are monitored during single sensor base unit monitoring operation.

Processor 174, radio 182, switch 184 and other electrical components of base unit 24 are electrically powered by an onboard power source 146 that includes at least one battery 202, preferably a plurality of batteries 202a and 202b, releasably mounted to circuit board 170 by spaced apart and opposed battery clip-type terminals 204a, 204b, 206a and 206b. Each battery 202a, 202b can be a disposable battery, such as an alkaline battery, can be a rechargeable battery, such as a nickel metal-hydride or a lithium battery, or can be another type of battery, such as a super-capacitor. Where low temperature, e.g., outdoor, operation of base unit 24 is contemplated, each battery 202a, 202b preferably is an alkaline battery, a low temperature lithium battery, e.g., lithium titanate, or another suitable low temperature battery, capable of providing sufficient electrical current to power base unit 24 at a base unit operating temperature less than zero degrees Fahrenheit and preferably less than minus ten degrees Fahrenheit. Base unit control circuit 172 preferably also is equipped with a power-saving battery protection circuit that preferably is same as or substantially similar to master controller battery protection circuit 100 previously discussed above and shown in FIG. 7.

An exemplary base unit enclosure 168 is shown in FIG. 12 and has a bottom, e.g., flat or planer bottom, a top, e.g., flat or planer top, and a plurality of sidewalls, e.g., four sidewalls. Enclosure 168 includes a generally rectangular, box-like, e.g., cubic or cube shaped, base 188 having a recessed compartment 191 formed therein in which circuit board 170 is received and weather-tightly housed. Enclosure 168 preferably also includes a cover 192 weather-tightly removably secured to base 188 using one or more fasteners 193 sandwiching a seal 196, e.g., rubber O-ring or elastomeric gasket shown in FIG. 12, between base 188 and cover 192 forming a waterproof, substantially airtight, substantially water-tight protective base unit housing 194 producing a base unit 24 well suited for outdoor use thereby providing an all-weather alarm detecting or monitoring module 145 of the present invention.

With continued reference to the exemplary base unit embodiment shown in FIG. 12, both base 188, e.g., box 190, and cover 192 of enclosure 168 preferably are made of plastic, but one or both can be made of another material, including metal, e.g., aluminum or steel, and/or a metallic material. In the base unit embodiment shown in FIG. 12, at least a portion of enclosure 168, preferably cover 192, is formed of light-transmissible, e.g., substantially transparent, material enabling light to be emitted from base unit 24 and/or permitting entry of outside light into base unit 24. Cover 192 of base unit 24 shown in FIG. 12 preferably is clear or substantially transparent but base 188, e.g., box 190, can be and preferably is opaque or light-blocking. While cover 192 can define a top, e.g., be disposed on top, of base unit 24, cover 192 can be disposed on or otherwise form a bottom, a side or another portion of base unit 24. Where light transmissible, cover 192 preferably functions as a light distributor 198 helping direct or distribute light emitted from within enclosure 168 outwardly from base unit 24. With continued reference to FIG. 12, cover 192 can be or include a light-distributing lens 200, e.g., Fresnel lens, configured to help direct and/or distribute such emitted light. Conversely, such a light transmissible cover 192 can also function as a light gatherer that gathers and directs light from outside base unit 24 within enclosure 168.

As previously discussed, base unit control circuit 172 shares at least some commonality and preferably shares substantial commonality with master controller control circuit 84. Base unit processor 174 can and preferably does use the same or substantially similar processor 84 as master controller 22a-22c. Base unit processor 174 preferably also communicates with memory storage 177, preferably memory 179 disposed onboard processor 174, used to store method of base unit operation firmware and/or software executed by processor 174 during base unit operation. Base unit microcontroller 176 can be similar to and preferably is substantially the same as above-described master controller microcontroller 112.

Base Unit Wireless Communication System Operation

Base unit wireless communications system 178 can be and preferably is also similar or substantially same as master controller wireless communications system 86 with both using the same or substantially similar radio 92 and 182 and/or RX-TX switch 94 and 184 enabling wireless message communication between base unit 24 and controller 22a-22c that preferably is bi-directional when base unit 24 is operating in polling mode. Base unit wireless communications system 178 preferably also uses substantially the same wireless communications protocol where each wireless message broadcast by base unit 24 is formed of the same data-containing packets 124 or 124' each having corresponding packet format 125 or 125' and transmitted at the same such above-disclosed radio frequencies and maximum bandwidths as master controller wireless communications system 86. Base unit wireless communication system 178 preferably is constructed, configured and operates same as or substantially similar to master controller wireless communications system 86 described above in the WIRELESS COMMUNICATIONS SYSTEM subsection. At least with regards to communications system operation, base unit processor 174 preferably is configured, e.g., in firmware and/or software, to operate in accordance with any one or more of the methods of operation disclosed in the WIRELESS COMMUNICATIONS SYSTEM subsection above by being configured same as or substantially similar to master controller processor 84.

Base unit wireless communication system 178 preferably also is configured, such as in firmware or software, e.g., base unit processor firmware or software, to operate in an ultralow power mode method of operation similar to or substantially the same as the ultralow power mode method of operation that master controller wireless communications system 86 uses when listening for wireless messages from other members of alarm system network 26. At least with regard to base unit wireless communications system operation, base unit processor 174 is configured in firmware or software similar to or substantially same as master controller processor 84 to operate one or both the radio 182 and/or RX-TX switch 184 of base unit wireless communications system 178 in such an ultralow power mode when listening for wireless messages from another member 24a, 24b, 24c, 24d, 24e, 24f, and/or 24g and/or 22a-22c of alarm system network 26, including in particular, when listening for wireless messages from controller 22a-22c.

Ultralow Power Mode Communications System Operation

When in ultralow power mode, base unit processor 174 preferably is configured to cycle one or both the radio 182 and/or RX-TX switch 184 between a power conserving mode, preferably sleep mode, and a wireless signal detection "listening" mode for a cycle period of time that relates to and which preferably is defined by the packet transmission time of wireless packets 124 or 124' used in wireless communications of both base unit 24 and controller 22a-22c. In a preferred ultralow power mode method of operation, processor 174 is configured in firmware or software to cycle one or both base unit radio 182 and/or switch 184 for a cycle time period that is substantially the same as used for controller 22a-22c and which is no greater than about, preferably substantially same as, the packet transmission time of the packets 124 or 124' used in wireless messages of wireless alarm system network 26. In such an ultralow power mode method implementation, processor 174 is configured to put one or both the radio 182 and/or switch 184 into sleep mode for a period of time greater than one half packet transmission time but less than packet preamble transmission time during each ultralow power mode cycle. In such an ultralow power mode method implementation, processor 174 preferably is further configured to put one or both the radio 182 and/or switch 184 into wireless signal detection mode for no more than 40%, preferably no more than 35%, and more preferably no more than 30%, of each ultralow power mode cycle. In other words, in such an ultralow power mode method implementation, processor 174 is configured so the wireless signal detection mode duty cycle of radio 182 is no greater than 40%, preferably no greater than 35%, and more preferably no greater than 30%, of the ultralow power mode cycle time period.

Base unit processor 174 preferably is configured in firmware or software to operate base unit wireless communication system 178 in ultralow power mode in accordance with any one or more of the configurations and/or methods described in the ultralow power mode communications system operation subsection above pertaining to ultralow power mode operation of master controller wireless communications system 86. As such, base unit processor 174 and base unit wireless communications system 178 preferably are constructed, arranged, configured, set up and/or operated similar to or substantially the same as described above in the ultralow power mode wireless communications system operation subsection(s).

Base Unit Sensors, Indicators and Operation

Base unit 24 communicates with at least one sensor 148 and preferably is capable of communicating with more than one sensor as the preferred base unit 24 shown in FIGS.

12-14 preferably operatively electrically connected to a plurality of sensors 148 and 150. One or both sensors 148 and/or 150 are preferably disposed onboard base unit 24 with one of the sensors 148 mounted to circuit board 170 and another of the sensors 150 carried by base unit 24 such as by being mounted to or housed within enclosure 168.

Each sensor 148 and 150 is connected to a respective I/O port or pin of processor 174 configured in firmware and/or software as a corresponding sensor control line that monitors associated sensor 148 and/or 150 for triggering of sensor 148 and/or 150 by a sensor detection event. Triggering of one of the sensors 148 and/or 150 causes the triggered sensor to output a signal on corresponding sensor control line that generates a sensor trigger interrupt causing processor 174 to have radio 182 wirelessly link with controller 22a-22c and thereby communicate occurrence of the sensor detection event to controller 22a-22c.

In the preferred base unit 24 shown in FIGS. 12-14, sensor 148 preferably is a magnetic field or magnetic flux detector 149 that more preferably is a magnetic field detecting switch that preferably is a reed switch 151 that is normally open but which closes in the presence of a source of magnetic flux 210, preferably from a sensor trigger magnet 212, having a sufficiently high magnetic flux or magnetic field strength. Where equipped with sensor 148 that is a reed switch 151, processor 174 is configured to detect triggering of reed switch 151 upon a change in magnet flux or field strength sensed by switch 151 relative to a flux or field threshold or threshold range of switch 151 sufficient for switch 151 to change state between being open and being closed.

In a preferred magnetic flux or field detection method, processor 174 is configured to detect triggering of reed switch 151 when switch 151 opens when the magnetic flux or field strength sensed by switch 151 drops below the trigger flux or field strength threshold or threshold range needed to keep switch 151 closed. Where processor 174 is configured to detect opening of reed switch 151 as indicating occurrence of a sensor detection event, removal or reduction in flux of flux source 210, preferably by movement of trigger magnet 212 away from switch 151, will open switch 151 thereby causing processor 174 to sense triggering of switch 151 due to occurrence of a sensor detection event.

In another magnetic flux or field detection method, processor 174 can be configured to detect triggering of sensor 148, preferably magnetic flux detector 149, when the flux or field strength sensed thereby rises above the threshold or threshold range. Where sensor 148 is a reed switch 151, processor 174 can be configured to detect triggering of the switch 151 by detecting closing of switch 151 when the flux or field strength of flux source 210, preferably trigger magnet 212, becomes greater than the trigger threshold or threshold range of switch 151, such as when magnet 212 is moved into close proximity to switch 151.

Where a reed switch 151 is used as magnetic flux or field sensor 149, switch 151 preferably is mounted to circuit board 170 along or one outer edge of board 170 positioning switch 151 adjacent and close enough to part, e.g., wall, of enclosure 168 for flux of trigger magnet 212 to close switch 151. In one preferred embodiment, switch 151 is located on circuit board 170 close enough to portion, e.g., wall, of enclosure 168 that trigger magnet 212 is magnetically received and retained by a magnetic sensor arming magnet seat 211 (FIG. 12) at a portion, e.g., adjacent wall, of enclosure 168 close enough to switch 151 for attraction of magnet 212 to switch 151 to hold magnet 212 in place against adjacent portion, e.g., adjacent wall, of enclosure 168. In another aspect, switch 151 may be implemented by a Hall effect sensor instead of a reed switch.

Sensor 150 preferably is a motion detector 153 that more preferably is a proximity sensor 177 that preferably is an infrared sensor 179, preferably a passive infrared motion sensor 157 (PR sensor) used to detect motion, preferably of a heat source, within a base unit sensing area that not only encompasses base unit 24 but also encompasses an area adjacent to base unit 24 that extends around and outside base unit 24. Processor 174 is configured in firmware and/or software to detect triggering of sensor 150, preferably motion detector 153, more preferably proximity detector 177, and even more preferably PIR sensor 179, when motion occurring within base unit sensing area is sensed thereby.

Where PR sensor 157 is used, PIR sensor 157 detects infrared light or radiation emanating from a person or animal entering a field of view of the sensor 157 that corresponds to and preferably is substantially the same as the base unit sensing area. Infrared light or radiation is detected by PIR sensor 157 triggers an output from sensor 157 that provides a sensor trigger interrupt to processor 174 which in turn causes processor 174 to have radio 184 send wireless sensor detection event message to controller 22a-22c.

In a preferred embodiment, PIR sensor 157 is disposed onboard base unit 24 preferably by being mounted to part of enclosure 168, such as by being mounted to cover 192 as shown in FIG. 12, enabling PIR sensor 157 to sense motion occurring outside base unit 24 within base unit sensing area. When by PIR sensor 157 sensing infrared light or heat emanating from an object, e.g. animal or person, located within the field of view of PIR sensor 157. In another embodiment, sensor 150, preferably motion detector 153, more preferably PIR sensor 157, can be mounted to circuit board 170 below light-transmissible cover 192, which preferably is infrared light transmissible, enabling sensor 150, preferably motion detector 153, more preferably PIR sensor 157, to sense motion outside base unit 24 through cover 192.

Base unit 24 also has a plurality of user perceptible indicators 154, 155, 159 and/or 161 with base unit 24, e.g., processor 174, configured, such as in firmware or software, to control operation of one or more of such indicators. In a preferred embodiment, base unit 24 is equipped or configured with at least one and preferably at least a plurality of the following: a user perceptible indicator 154 activated by base unit 24 to provide a user perceptible indication of an occurrence of a sensor detection event, e.g., function as an alarm indicator; a user perceptible indicator 159 activated by base unit 24 to provide a user perceptible indication of the operational status of the unit, e.g., function as a power on indicator; a user perceptible indicator 161 activated by base unit 24 to provide a user perceptible indication when a wireless link has been established with the controller 22a-22c, e.g., function as a wireless signal indicator; and/or a user perceptible indicator 155 activated by base unit 24 when a wireless message has been received from the controller 22a-22c directing base unit 24 to activate the indicator 155, e.g., function as a base unit task indicator. If desired, base unit 24, e.g., processor 174, can be configured, e.g., further configured, to activate one or more of the indicators, such as one or both indicators 154 and/or 155, upon base unit 24 receiving a wireless polling message from controller 22a-22c, such that one or both indicators 154 and/or 154 are configured to function as a wireless polling signal indicator. If desired, base unit 24, e.g., processor 174, can be configured, e.g., further configured, to activate one or more of the indicators 154, 155, 159 and/or 161 during pairing with controller 22a-22c and/or upon successful pairing with controller 22a-22c, such that each such indicator is configured to function as a pairing indicator.

In the preferred base unit 24 shown in FIGS. 12-14, base unit 24 is configured so that user perceptible indicator 159 functions as a power up indicator that is activated upon base unit 24 being powered up providing a user perceptible indication that base unit 24 is powered up and operational. Indicator 159 preferably is a visually perceptible indicator, such as LED 163 depicted in FIGS. 13 and/or 14. Processor 174 is configured in firmware or software to drive and energize power indicator LED 163 upon the processor 174 detecting being powered up thereby providing a user of the alarm system 20 with a visually perceptible indication, e.g., light, when base unit 24 is operational. When LED 163 is lit up, it is visible to alarm system user through light-transmissible base unit cover 192.

Preferred base unit 24 also is configured so that indicator 161 functions as a wireless signal indicator or wireless link indicator that is activated by the processor 174 detecting or determining that a wireless signal from controller 22a-22c has been received by base unit 24. Indicator 161 preferably is a visually perceptible indicator, such as LED 165 depicted in FIGS. 13 and/or 14. Processor 174 is configured in firmware or software to drive and thereby energize signal indicator LED 165 upon the processor 174 determining that radio 182 has detected one or more incoming packets 124 or 124' of a wireless message transmitted by controller 22a-22c providing user with a visually perceptible indication, e.g., flashing light, when a wireless link has been established with controller 22a-22c. Base unit processor 174 preferably is configured to energize, preferably flash, LED 165 each time a packet 124 or 124' has been received by radio 182. When LED 165 is energized, e.g., flashing, the energized LED 165 is visible to alarm system user through substantially transparent base unit cover 192.

Preferred base unit 24 is further configured so that indicator 154 functions as a sensor detection event indicator or alarm indicator that is activated by the processor 174 upon detecting or determining that a sensor, e.g., sensor 148 and/or 150, monitored by processor 174 has been triggered due to occurrence of a sensor detection event. Indicator 154 preferably is a visually perceptible indicator 173, such as LED 158a depicted in FIGS. 13 and/or 14. Processor 174 is configured in firmware or software to drive and thereby energize signal indicator LED 158a upon the processor 174 detecting that a sensor 148 or 150 of base unit 24 monitored by processor 174 has been triggered. Processor 174 preferably is configured in firmware or software to detect occurrence of a sensor detection event caused when a sensor 148 and/or 150 connected to processor 174 has been triggered and activate LED 158a upon the processor 174 detecting occurrence of such a sensor detection event. Processor 174 can be configured to flash or continuously light up alarm LED 158a upon detecting occurrence of a sensor detection event.

Preferred base unit 24 is also further configured so that indicator 155 functions as a polling event indicator that is activated by the processor 174 detecting that a wireless polling message from master controller 22a-22c has been received by base 24. Indicator 155 preferably is a visually perceptible indicator 173, such as LED 158b depicted in FIGS. 13 and/or 14. Processor 174 is configured in firmware or software to drive and thereby energize signal indicator LED 158b upon the processor 174 determining that radio 182 has received a task event message from controller 22a-22c that preferably is a base unit flashlight activation message that also contains the base unit device number or DEV NUM # of the particular one of base units 24a-24g user desires to operate as a flashlight or signal light beacon. Processor 174 can be configured to flash or continuously light up LED 158b upon receipt of a wireless task event message, particularly when the wireless task event message is a flashlight activation message.

Where the base unit 24 is equipped with a flashlight LED 158b, e.g., a white light emitting LED, the light transmissible portion of enclosure 168, preferably transparent cover 192, can be and preferably is a light distributing and/or light diffusing lens that helps direct light from LED 158b emanating upwardly from circuit board 170 outwardly in directions at an angle to, generally transverse to, and/or generally perpendicular thereto making light emanated from LED 158b visible to user or a nearby animal from any location or direction. If desired, cover 192 can be or include a Fresnel lens to facilitate distribution of light during flashlight or beacon operation when LED 158b is energized as well as during alarm operation when LED 158a is energized.

LED 158a preferably outputs light of a different color than LED 158b with LED 158a preferably outputting a red light and LED 158b preferably outputting a white light. LEDs 158a and 158b preferably are high LUX, high lumen, or high brightness LEDs requiring a greater amount of electrical power than directly available from processor 174 such that each of these high-power LEDs 158a and 158b are each respectively turned on using a corresponding user perceptible indicator driver circuit (not shown) connected between the processor 174 and respective LED 158a and 158b. Each such driver circuit of base unit 24, e.g. of base unit control circuit 172, preferably is constructed like and operate similar to or substantially same as driver circuit 132 (FIG. 8) used by master controller processor 84 to turn on buzzer 76 during master controller operation as described above.

LED 158a is driven by a driver circuit, e.g., driver circuit 132, connected to one of the I/O ports or pins of processor 174 that is configured in firmware or software as an alarm control line that outputs a user perceptible indicator drive signal, a high logic state, over the control line when an alarm occurs, preferably when a sensor 148 and/or 150 being monitored by processor 174 is triggered. When the alarm control line of processor 174 goes high as a result, it switches on driver circuit, e.g., driver circuit 132, causing the driver circuit to power LED 158a. If desired, such an alarm drive signal outputted over alarm control line by processor 174 upon occurrence of a sensor detection event can be in the form of a PWM signal outputted by base unit processor 174 like that or even substantially the same as the PWM signal outputted by master controller processor 84 when driving master controller driver circuit 132 to operate buzzer 76. Where the alarm drive signal outputted by processor 174 is used to operate a driver circuit, e.g., driver circuit 132, which drives another type of user perceptible indicator (not shown), such as an audible transducer, e.g. speaker or buzzer, or tactile transducer, e.g., vibrator, linked to base unit 24 upon occurrence of a sensor detection event, the drive signal outputted over alarm control line preferably is a PWM signal.

With continued reference to FIG. 14, LED 158b is driven by its own driver circuit connected to a different one of the I/O ports or pins of processor 174 that is configured in firmware or software as a flashlight control line that outputs a user perceptible indicator drive signal when a wireless base unit flashlight activation task message is received. When the flashlight control line of processor 174 goes high as a result, it switches on the driver circuit, e.g., driver circuit 132, causing the driver circuit to power the LED 158*b*. If desired, upon base unit 24 being polled or master controller 22*a*-22*c* wirelessly tasking the base unit 24 to light up like a flashlight 171, such flashlight drive signal outputted over the flashlight control line by processor 174 can also be in the form of a PWM signal similar to or substantially same as the PWM signal outputted from master controller processor 84 to drive master controller driver circuit 132 into actuating buzzer 76. Where the flashlight drive signal outputted by processor 174 is used to operate a driver circuit, e.g., driver circuit 132, which drives another type of user perceptible indicator (not shown), such as an audible transducer, e.g. speaker or buzzer, or tactile transducer, e.g., vibrator, linked to base unit 24 upon receipt of a wireless flashlight activation message by base unit 24, the drive signal outputted over alarm control line preferably is a PWM signal.

In one method of operating base unit 24, processor 174 is configured in firmware or software to output a drive signal, preferably polling message indicator drive signal, over either the base unit flashlight control line or the alarm control line when a wireless polling message from master controller 22*a*-22*c* is received by base unit 24. In one preferred method implementation, the master controller 22*a*-22*c* sends a polling message containing the base unit ID of the particular one of the base units 24*a*, 24*b*, 24*c*, 24*d*, 24*e*, 24*f*, and/or 24*g* and the processor 174 of the particular base unit assigned the corresponding identifier or ID number contained in the polling message is configured to output a polling message indicator drive signal over the alarm control line, the flashlight control line, or both the alarm control line and flashlight control line. In other words, base unit processor 174 is configured to check the identifier or ID number in the polling message and output a polling message indicator drive signal if the identifier or ID number assigned to the particular base unit matches the identifier or ID number in the message.

Each wireless base unit task flashlight activation message from controller 22*a*-22*c* can also and preferably does contain the identifier or ID number of the particular base unit 24*a*, 24*b*, 24*c*, 24*d*, 24*e*, 24*f*, and/or 24*g* with processor 174 of the particular base unit assigned the corresponding identifier or ID number contained in the flashlight activation task message configured to output a flashlight drive signal over the flashlight control line. In other words, processor 174 of each base unit 24 is configured to check the identifier or ID number in the flashlight activation task message transmitted by controller 22*a*-22*c* and output a flashlight drive signal if the identifier or ID number assigned to the particular base unit matches the identifier or ID number in the message thereby causing LED 158*b* to light up the particular base unit like a flashlight.

In one such base unit operation method, processor 174 is configured to output a polling message indicator drive signal that drives each indicator 154 and/or 155, LED 158*a* and/or 158*b*, activating or operating each indicator 154 and/or 155 in one of a plurality of different types of user and/or animal perceptible indication modes. In one preferred method implementation, processor is configured to drive indicator 155, preferably LED 158*b*, in a first mode of providing a user perceptible indication when flashlight drive signal is outputted over flashlight control line of processor 174 and in a second mode of providing a user perceptible indication when polling message indicator drive signal is outputted over flashlight control line of processor 174. In one such method implementation, indicator 155, preferably LED 158*b*, is flashed when being driven by the processor 174 in one of the first and second modes, and continuously energized when being driven in the other one of the first and second modes.

In one such preferred method implementation, processor 174 is configured to output a flashlight drive signal that drives indicator 155, preferably LED 158*b*, in the first mode, preferably flashlight mode, by continuously energizing the indicator 155, preferably LED 158*b*, when a wireless flashlight activation message is received. In such a preferred method implementation, processor 174 is configured to output a polling message indicator drive signal that drives indicator 155, preferably LED 158*b*, in the second mode, preferably in a mode different than flashlight mode, by intermittently energizing, e.g., flashing, the indicator 155, preferably LED 158*b*, when a polling message is received.

In another preferred method implementation, processor is configured to drive indicator 154, preferably LED 158*a*, in a first mode of providing a user perceptible indication when alarm signal is outputted over alarm control line of processor 174 and in a second mode of providing a user perceptible indication when polling message indicator drive signal is outputted over the same alarm control line of processor 174. In one such method implementation, indicator 154, preferably LED 158*a*, is flashed when being driven by the processor 174 in one of the first and second modes, and continuously energized when being driven in the other one of the first and second modes.

In one such preferred method implementation, processor 174 is configured to output an alarm signal that drives indicator 154, preferably LED 158*a*, in the first mode, preferably alarm mode, by continuously energizing the indicator 154, preferably LED 158*a*, when processor 174 detects occurrence of a sensor detection event. In such a preferred method implementation, processor 174 is configured to output a polling message indicator drive signal that drives indicator 154, preferably LED 158*a*, in the second mode, preferably in a mode different than alarm mode, by intermittently energizing, e.g., flashing, the indicator 154, preferably LED 158*a*, when a polling message is received.

In a preferred base unit embodiment and method of operation, processor 174 of base unit 24 is configured in firmware or software to provide a user perceptible indication when sensor 148 of base unit 24 has been armed so that user will know sensor 148 is in a state where sensor 148 can be triggered. In one preferred method implementation, processor 174 is configured to drive a plurality of the indicators 154, 155, 159 and/or 161 in a sensor armed mode of indicator operation that provides an indication from the plurality of driven indicators 154, 155, 159 and/or 161 perceptible to a user that indicates to the user the sensor 148 and/or 150 is armed and ready to be triggered during detection of a sensor detection event. In such a preferred method implementation, processor 174 is configured to drive a plurality of indicators 154 and 155 in a sensor armed mode of indicator operation that overrides respective operation of indicators 154 and 155 as powered up and wireless link indicators.

Where sensor 148 is a reed switch 151 type of magnetic field sensor 149, reed switch 151 is armed by placing a magnetic flux source 210, e.g., magnetic field source, preferably a sensor triggering magnet 212, such as depicted in FIGS. 15-18, close enough to the sensor 148, preferably magnetic field sensor 149, more preferably reed switch 151, to arm the sensor 148, preferably magnet or field sensor 149, more preferably reed switch 151. When sensor triggering magnet 212 is placed in close enough proximity to arm sensor 148, preferably magnetic field sensor 149, preferably reed switch 151, by setting the magnetic field sensor 148 in a state where a change in magnetic flux or magnetic field strength thereafter triggers sensor 148 causing a sensor detection event to occur. Where magnetic field sensor 148 is a reed switch 151, placing the sensor triggering magnet 212 close enough to close the reed switch 151 arms the sensor 148, preferably reed switch 151, such that a reduction in magnetic field strength or magnetic flex occurring thereafter triggers the sensor 148 by changing the state of magnetic field sensor 149 preferably by opening the reed switch 151.

Processor 174 is configured in firmware or software to detect when sensor 148, preferably magnetic field sensor 149, more preferably reed switch 151, is armed, such as preferably by detecting when magnetic flux source 210, preferably sensor trigger magnet 212, is placed close enough for the magnetic flux or magnetic field strength becomes great enough to arm sensor 148, preferably arm magnetic field sensor 149, more preferably close reed switch 151. When sensor 148, preferably magnetic field sensor 149, more preferably reed switch 151 is armed, processor 174 is configured to provide a user perceptible indication, preferably an arming signal, by driving at least one and preferably a plurality of user perceptible indicators 154, 155, 159 and/or 161 in an arming signal mode or pattern. In a preferred base unit operating method, processor 174 is configured in firmware or software to substantially simultaneously drive a plurality of indicators 154 and 155, preferably visually perceptible indicators 173 and 175, more preferably LEDs 158*a* and 158*b*, to thereby provide a user perceptible indication when sensor 148, preferably magnetic field sensor 149, more preferably reed switch 151 is armed.

Where a reed switch 151 is used as sensor 148, preferably magnetic field sensor 149, processor 174 is configured to detect when reed switch 151 is closed by adjacent placement of magnetic field source 210, preferably sensor trigger magnet 212, and simultaneously drive LEDs 158*a* and 158*b*. Driving LEDs 158*a* and 158*b* provides a visually perceptible indication to a user that magnetic field source 210, preferably trigger magnet 212, has been placed close enough to close and thereby arm switch 151.

Base Unit Configurations

Such a base unit 24 constructed in accordance with the present invention is versatile, rugged, durable and advantageously well suited for use in many different types of alarm, detecting and monitoring applications as it is able to be set up in a plurality of different alarm, detector or monitor configurations. A preferred base unit 24 constructed in accordance with the present invention has at least a plurality of sensors 148 and 150 and is preferably user configurable to be able to monitor one of the sensors 148 or 150 or both of the sensors 148 and 150 during alarm system use and operation.

If desired, base unit 24, e.g., processor 174, can be further configured in firmware or software to perform a task in addition to or even instead of sending a wireless sensor detection event signal to master controller 22*a*-22*c* upon occurrence of a sensor detection event. In a preferred method of base unit operation, base unit 24, preferably processor 174, is configured to drive and thereby energize at least user perceptible indicator 154, e.g., alarm, upon sensor 148 and/or 150 being triggered by occurrence of a sensor detection event. In another such method implementation, base unit 24, e.g., processor 174, can be configured to also turn on one or more additional user perceptible indicators, such as indicator 155, e.g., light or beacon, an emitter, e.g., infrared and/or UV emitter, an audibly perceptible transducer, e.g., speaker or buzzer, a tactile perceptible transducer, e.g., vibrator, or another type of transducer, such as to illuminate an area, output a visually perceptible indication visible within visual distance of base unit 24, output an audibly perceptible indication audible within earshot of base unit 24, output a vibratory tactile perceptible indication, or the like upon processor 174 detecting triggering of sensor 148 and/or 150. Base unit 24, e.g., processor 174, can be configured to drive one or more indicators, including in addition to driving indicator 154, upon detecting sensor trigger in order to attract something, e.g., an animal, human, etc., provide a warning, provide audible feedback, provide tactile or vibratory feedback, function as a relay, provide a non-RF wireless link with another device or apparatus, e.g., with device or apparatus or the like.

In another preferred method implementation, base unit processor 174 is configured in firmware and/or software to carry out a task different than operating flashlight LED 158*b* upon receiving a wireless task message from controller 22*a*-22*c* different than flashlight activation message. In one such preferred method implementation, processor 174 is configured to perform a task different than activating flashlight when receiving such a wireless task message that preferably includes base unit 24 performing one of (a) an animal-related task, and/or (b) an actuating task where base unit 24 operably cooperates with the device or apparatus 152 to which it is mounted to actuate device or apparatus 152 and/or actuate some component, assembly, module or subsystem of the device or apparatus 152. Where base unit 24 is configured to be able carry out such other tasks, the wireless task message contains not only data identifying the particular one of base units 24*a*-24*f* instructed by user via controller 22*a*-22*c* to perform said task but also data identifying which task the particular base unit 24*a*-24*f* is to perform of the plurality of tasks the base unit is configured to be capable of performing.

In one such method implementation, processor 174 can be further configured to drive at least one of its indicators when particular base unit 24 receives a wireless task message that is an animal signaling message causing the driven indicator(s) of the particular base unit 24 to output an animal perceptible indication, such as in the form of a light, noise, sent, taste, or the like that either attracts an animal nearby base unit 24, repels nearby animal, or interacts with nearby animal in some other way. Such a base unit 24 can be configured with animal perceptible indicators that include visual indicators 173 and/or 175, audible indicators, tactile indicators, or another type of indicator that outputs an indication, e.g., stimulus, perceptible by an animal close enough to see, hear, feel, smell, taste or otherwise sense it.

In another such method implementation, processor 174 can be further configured to operate or actuate a device or apparatus, such as device or apparatus 152, carried by, carrying or otherwise monitored by base unit 24 when particular base unit 24 receives a wireless task message that is a device or apparatus actuation message directed by base unit ID to the particular base unit. When such a wireless device or apparatus actuation message is received, processor 174 is configured in firmware and/or software to actuate or operate the device or apparatus by operating or actuating a switch, motor, solenoid, actuator, e.g., rotary and/or linear actuator, emitter, effector, and/or the like (not shown) that is operatively connected, e.g., electrically and/or physically connected, to either or both base unit 24 and/or the device or apparatus. Processor 174 can also be configured to operate or actuate device or apparatus by base unit 24 being configured to operate or actuate switch, motor, solenoid, actuator, e.g., rotary and/or linear actuator, emitter, and/or effector (not shown) operatively connected, e.g., electrically and/or physically connected, to either or both base unit 24 and/or device or apparatus upon (a) occurrence of a sensor detection event, e.g., base unit 24 being triggered upon occurrence of a sensor detection event, and/or (b) base unit 24 receiving a wireless device or apparatus actuation message from another member, e.g., 22a, 22b, 22c, 24a, 24b, 24c, 24d, 24e, and/or 24f of alarm system network 26, preferably upon receiving such a wireless task message from master controller 22a-22c initiated by master controller user.

A sensor base unit 24 constructed in accordance with the present invention, including as modified in this section above, is particularly well suited for game monitoring, fishing monitoring, trail monitoring, trapline monitoring and other outdoor, all-weather and cold weather sensing and alerting applications, with base unit 24 configured in firmware and/or software to wirelessly link and message master controller 22a-22c when a sensor detection event corresponding to one of a game detection event, a trail movement detection event, a trapline tripped detection event, a trap tripped detection event, a fish monitoring event, a fish strike detection event, or another game or outdoors related detection or monitoring event occurs due to sensor 148 and/or 150 of base unit 24 being triggered. In one preferred embodiment, base unit 24 is configured to wirelessly message controller 22a-22c upon sensor 148 and/or 150 being triggered (a) upon detecting game, e.g., animal, or movement of game, (b) upon detecting movement of an animal or person along a trial, (c) upon a trap being set off, and/or (d) upon catching, snagging, hooking, or ensnaring of a fish being detected.

One preferred base unit 24 is configured or user configurable for use as a game alerting monitor, preferably a game alerting alarm, which has one or more onboard sensors 148 and/or 150 used to monitor the base unit sensing area of base unit 24 and wirelessly message controller 22a-22c when an animal or other creature, e.g., human, enters the base unit sensing area. One such base unit 24 can be configured with an electric eye sensor or beam-type sensor arrangement, e.g., beam emitter and beam detector (not shown), configured to monitor a beam or line extending across a path or trail being monitored for passage of an animal, a human, etc. Another such preferred base unit 24 has an elongate line or string extending across the path or trial being monitored that is attached to magnet 212 magnetically seated in seat 211 generally in line with and adjacent to sensor 148, preferably magnetic flux sensor 149, more preferably reed switch 151 of base unit 24. When an animal or human traveling along the trail or path contacts line or string, line or string pulls trigger magnet 212 away from sensor 148, magnetic field sensor 149, and more preferably reed switch 151 triggering sensor 148, magnetic flux sensor 149, more preferably reed switch 151 causing base unit 24 to send wireless sensor detection event message to controller 22a-22c. Where a reed switch 151 is used, breaking the line, wire or string pulls the trigger magnet 212 way from switch 151 unseating magnet 212 from magnet seat 211 of base unit enclosure thereby opening the switch 151 providing sensor trigger to processor 174, e.g., causing a sensor trigger interrupt to be generated, which causes base unit 24 to send wireless sensor detection event message to controller 22a-22c.

In another aspect base unit 24 is configured or user configurable for use as a security monitoring system which has one or more onboard sensors 148 and/or 150 used to monitor the base unit sensing area of base unit 24 and wirelessly message controller 22a-22c when a door, window or other structure is moved to trigger the base unit. One such base unit 24 can be configured with an electric eye sensor or beam-type sensor arrangement, e.g., beam emitter and beam detector (not shown), configured to monitor a beam or line extending across a door, window or other structure being monitored for unauthorized entry.

Another such preferred base unit 24 can have an elongate line, wire or string extending across the door, window or other structure being monitored that is attached to magnet 212 magnetically seated in seat 211 adjacent to sensor 148, preferably magnetic flux sensor 149, more preferably reed switch 151 of base unit 24. When an unauthorized entry is attempted at the door, window or other structure, line, wire or string is displaced in tension by the person or animal attempting unauthorized entry thereby pulling trigger magnet 212 away from sensor 148, magnetic field sensor 149, and more preferably reed switch 151 triggering sensor 148, magnetic flux sensor 149, more preferably reed switch 151, thereby causing base unit 24 to send wireless sensor detection event message to controller 22a-22c. Where a reed switch 151 is used, breaking the line, wire or string causes the trigger magnet 212 to be pulled or otherwise displaced way from switch 151 unseating magnet 212 from magnet seat of base unit enclosure thereby opening the switch 151 providing sensor trigger to processor 174, e.g., causing a sensor trigger interrupt to be generated, which causes base unit 24 to send wireless sensor detection event message to controller 22a-22c.

Another preferred base unit 24 is configured or user configurable for use as a trapline monitor that monitors a trap (not shown) of a trapline (not shown) and sending a wireless sensor detection event message to controller 22a-22c when sensor 148 and/or 150 of base unit 24 is triggered by detecting the trap being set off by an animal triggering the trap. Such a base unit 24 configured for use as a trap or trapline monitor preferably is mounted on, attached to, or otherwise carried by a device or apparatus that preferably is an animal trap configured to trap or snare an animal, such as a raccoon, beaver, squirrel, mink, bear, coyote, fox, lynx, badger, martens, and/or fisher, and configured so sensor 148 and/or 150 is trigged when the trap is set off. In one preferred embodiment, base unit 24 is carried by the trap itself, e.g., mounted or attached thereto, with base unit 24 equipped with at least one sensor, e.g., sensor 148 and/or 150, configured to detect when the trap monitored by base unit 24 has been set off or tripped by sensor detecting movement of one portion of the trap relative to another portion of the trap that occurs when the trap is set off.

Base unit 24 is also well suited for being configured for use in other types of alerting, monitoring and/or detecting applications. As shown in FIGS. 19-23 and discussed in more detail below, a preferred base unit 24 configured as shown and described herein is particularly well suited for use as a fish strike monitor. A preferred base unit 24 may also be configured, for bank fishing, for example, by using a clip with a trigger mechanism (such as a line and magnet) and having a bail of a reel open to allow a fish to pull the line and thereby pull the magnet.

Multi-Mount Base Unit

FIGS. 15-26 illustrate a currently preferred embodiment of a base unit 24' that preferably is a relatively compact low profile base unit assembly 280 having an enclosure 168' of multi-mount construction of the present invention that includes a pair of enclosure halves 282, 284 and a base unit mounting arrangement 286 formed of a plurality of spaced apart mounting legs 288*a*, 288*b*, 288*c*, 288*d*, 288*e* and 288*f*, which not only facilitate assembly of the enclosure halves 282, 284, but which also are constructed and arranged (a) to facilitate removable mounting of base unit 24' in a dock 290, (b) to enable base unit 24' to be stably supported on a surface, and (c) to enable base unit 24' to be fixed to another object. The legs 288*a*-288*f* each have an oppositely outwardly extending pair of feet 292*a*-292*f* and 294*a*-294*f* with one set of feet 292*a*-292*f* extending generally transversely outwardly in one direction from one enclosure half 282 and the other set of feet 294*a*-294*f* extending generally transversely outwardly in the opposite direction from other enclosure half 282. The mounting legs 288*a*-288*f* respectively define spaced apart docking ribs 296*a*-296*f* which each extend laterally outwardly, e.g., radially outwardly, about an outer periphery 298 of the enclosure 186' with the dock 290 configured to releasably engage with at least a plurality of the ribs 296*a*-296*f* to releasably hold the base unit 24' in place during subsequent use and operation.

Each one of the enclosure halves 282, 284 is formed of a respective outer enclosure wall 302, 304 each of which preferably is of convex construction defining a housing 194' in which the base unit circuit board 170 is protectively enclosed when the halves 282, 284 are assembled together. In a preferred enclosure embodiment, the enclosure walls 302, 304 of each respective enclosure half 282, 284 is of convexly curved or rounded construction with each wall 302, 304 preferably having either a generally hemispherical shape, e.g., spherical cap-shape(d), or of ellipsoid construction, e.g., hemi-ellipsoid shape(d). In the preferred enclosure embodiment shown in FIGS. 15-18, each one of the enclosure walls 302, 304 preferably has a generally hemi-ellipsoid shape thereby forming a base unit enclosure 168' having a generally ellipsoid-shaped housing 194' as also depicted in FIGS. 15-18.

When assembled together in the manner best depicted by FIGS. 17 and 18, the walls 302, 304 of the enclosure halves 282, 284 of base unit assembly 280 mate about opposing outer peripheral edges 306, 308 thereof defining such a base unit housing 194' which encloses circuit board 170 and any sensor(s), e.g., sensors 148 and/or 150 mounted to the board 170 capturing them therebetween. To produce a weatherproof substantially watertight base unit enclosure 168', a seal 196 that preferably is an endless O-ring 197 is sandwiched between the opposed mated peripheral edges 306, 308 of the walls 302, 304 of assembled enclosure halves 282, 284 such as in the manner also depicted by FIGS. 17 and 18. One preferred assembled enclosure 168' produces a base unit 24' that is watertight and also buoyant enabling the base unit 24' to float in water and be used in water-related detecting or monitoring applications, including as a sensor-equipped planer board (discussed in more detail below), a sensor-equipped bobber, a sensor-equipped float, a sensor-equipped buoy, or another type of sensor-equipped floating detecting or monitoring unit capable of operating while partially or completely immersed in water.

With continued reference to FIGS. 15-18, at least one of the enclosure halves is a sensing or sensor-carrying half 282 having a generally centrally located sensor port 310 that can include an outer sensor port cover (not shown) that overlies the port 310 such as to protect the sensor 150, provide a watertight covering over the sensor 150, and/or serve as a lens, diffuser, or light, radiation gatherer or the like disposed between a sensing element of the sensor 150 when desired or needed for the particular monitoring or detecting application at hand. If desired, where equipped with a sensor port cover, enclosure half 282 can be configured to enable removal of the cover such as via snap fit attachment, threaded attachment, and/or snap-on/snap-off, e.g., perforated, attachment. Such a sensor port cover can be removed by user when it is desired or required for the particular sensor, monitoring, and/or detecting application base unit 24' is being configured for use and operation.

Sensor port 310 preferably includes an internal sensor socket 312 best shown in FIG. 18 integrally formed as an interiorly-disposed sensor seating tube 314 of enclosure wall 302 which serves as a receptacle that receives or is in registry with at least a portion of sensor 150 thereby also orienting a sensing element or sensor head 250 to face outwardly from a sensing side 316 of the base unit 24' defined thereby. In a preferred embodiment, sensor 150 of base unit 24' preferably is a motion sensor that more preferably is a motion detection sensor, such as PIR sensor 157, seated in socket 312 with the sensing head 250, e.g., Fresnel lens and/or pyroelectric sensing element, of the PIR sensor 157 in registry with the port 310 facing outwardly therefrom enabling the PIR sensor 157 to detect infrared changes, e.g., detect infrared motion, in a sensor detecting area extending outside or externally of the base unit enclosure 168'. When seated in socket 312, preferably at least part of the sensor 150, such as its body or the like, can be and preferably is at least partially telescopically received in the tubular seat 314 of the socket 312. Sensor socket 312 preferably also serves as a sensor locator that locates and properly orients sensor 150 so its sensing head or sensing element 250 is disposed in registry with the port 310 and also properly oriented and/or located to face outwardly of base unit 24' to enable sensor 150 to sense and detect occurrence of a sensor detection event in a sensor detecting area extending externally outwardly from the port 310 generally inline therewith and adjacent thereto.

As best shown in FIG. 18, sensor 150, e.g., PIR sensor 157, extends outwardly from base unit circuit board 170, such that mounting of board 170 in a circuit board locator and mounting seat 318 provided by an integrally three-dimensionally formed interior surface of the sensor-carrying enclosure half 282 not only locates and orients the board 170 but preferably also helps locate and orient sensor 150, e.g., PIR sensor 157, relative to sensor port 310. Circuit board locator and mounting seat 318 helps generally centrally, e.g., laterally or radially, locates sensor 150, e.g., PIR sensor 157, relative to the sensor socket 312 by slidable locating engagement between generally circular side edge of board 170 and annular outer peripheral flange 320 of sensor-carrying enclosure half 282 so at least a portion of the sensor 150, PIR sensor 157, preferably including its sensing head or element 250, is at least partially telescopically received in the sensor seating tube 314 when board 170 abuts against at least a plurality, preferably at least a plurality of pairs, of interiorly disposed generally flat circuit board abutment and mounting tabs 322 upraised from the interior surface of sensor-carrying enclosure half 282.

At least one of the enclosure halves, preferably enclosure half 284 disposed opposite enclosure half 282 is a visual alarm indicating enclosure half 284 configured to enable a visually perceptible alarm signal, e.g., light, from a visually-perceptible indicator to pass through and/or be distributed therefrom during operation of base unit 24'. Such an alarm-transmissible enclosure half 284 has an outer wall 304 of light-transmissible construction enabling (a) base unit 24' to output a visually-perceptible alarm someone local to base unit 24' can see, (b) base unit 24' to illuminate a surrounding area outside base unit 24', and/or (c) base unit 24' to function as a flashlight, floodlight or signal beacon. As best depicted by FIGS. 16-18, wall 304 of enclosure half 284 is made or otherwise formed in a manner that facilitates transmission of light from one or more visually-perceptible indicators of base unit 24', including from one or more LEDs mounted to a side of base unit circuit board 170 facing toward wall 304. In a preferred embodiment, at least a portion of outer enclosure wall 304 is made of a light-transmissible material enabling light transmission therethrough of light emitted from one or more light emitting indicators, e.g., LEDs, including when a local alarm is being outputted and/or when base unit 24' is operating in an illumination mode where user desires to light up an area adjacent base unit 24'.

With reference to the embodiment shown in FIGS. 15-18, wall 304 of local alarm signal transmissible enclosure half 284 includes a light-transmissible window 324 that overlies part of base unit circuit board 170 inside enclosure 168' enabling light emitted from one or more LEDs mounted to the side of the circuit board facing wall 304 to pass through the window 324 and illuminate an area outside base unit 24'. In such a preferred embodiment, light transmissible window 324 is formed of a substantially optically transparent generally centrally located circular area 326 of enclosure wall 304 that can and preferably does overlie one or more of the LEDs. Where wall 304 has such a light window 324 of a substantially optically transparent material, preferably having at least 85% light transmittance and more preferably having at least 90% light transmittance, e.g. optically clear, window 324 can be in the form of a light-directing lens 327, such as a concave, aspheric or "bulls-eye" lens where it is desired to focus LED light passing therethrough into a more concentrated beam or a convex lens where it is desired to spread out, diverge or outwardly diffract a beam of light from LED(s) passing through window 324.

Where base unit 24' is configured in firmware and/or software to output a local user-perceptible alarm upon occurrence of a sensor detection event that has triggered one of the sensors, e.g. sensors 148 and/or 150, driving one or more of LEDs in providing such an alarm emits light therefrom that passes through window 324 that preferably is visible locally to a person, animal or the like within line of sight of base unit 24'. Base unit 24' preferably is configured in firmware and/or software to light up one or more LEDs in response to received alarm system wireless message containing packet(s) 124 or 124' having a command identifier, e.g., COMMAND ID, of a message identifier, MESSAGE ID, tasking base unit 24' to turn on one or more of LEDs. This can be done where user desires to remotely task base unit 24' by manipulating the specific control 64a-64f assigned or associated with base unit 24' in a particular desired manner that causes master controller 22a-22c to transmit a wireless light-activating message, e.g. wireless flashlight activating message, to base unit 24'. In a preferred embodiment and configuration, processor 172 of base unit 24' preferably is configured in firmware and/or software to drive or energize one or more LEDs when such a wireless light-activating message is received from another alarm system member, preferably from controller 22a-22c, which also contains the device identifier or device number, e.g. DEV NUM, assigned thereto during pairing. Messages may include, for example: (1) poll, (2) magnet alarm, (3) pair, (4) PIR alarm, (5) white light, (6) ping, (7) base off mode.

With continued reference to FIGS. 15-18, wall 304 of enclosure half 284 can and preferably does also include a diffuser 328 with the wall 304 preferably defining a light distributor 330 that preferably is a light diffusing dome 332. Where enclosure half 284 includes such a diffuser 328, the portion of enclosure wall 304 that includes diffuser 328 is formed of a material, preferably plastic, which is light transmissible but which also diffuses light transmitted therethrough. In such a preferred embodiment, the material of the diffuser 328 preferably has a light transmittance of at least 40% and preferably no more than about 90%. Where outer wall 304 of enclosure half 284 has both an optically clear light transmitting window 324 and diffuser 328, diffuser preferably is an annular diffuser 328 which encircles window 324 such as in the manner shown in FIG. 16. In the preferred embodiment shown in FIG. 16, substantially the entire wall 304 of enclosure half 284 is formed of light diffusing plastic material surrounding a generally centrally located round or circular optically clear light transmitting window 324. If desired, where equipped with such a diffuser 328 base unit 24' can include one or more other LEDs mounted to circuit board 170 underlying one or more portions of the annular diffuser 328 which can be selectively turned on when it is desired to output light therefrom most of which, preferably substantially all of which, passes through diffuser 328.

Where base unit 24' is configured in firmware and/or software to output a local user-perceptible alarm upon occurrence of a sensor detection event that has triggered one of the sensors, e.g. sensors 148 and/or 150, driving one or more of these other LEDs in providing such an alarm emits light therefrom that passes through diffuser 328 spreading out the light emitted from diffuser lighting up diffuser dome 332, e.g., light up substantially entire wall 304, providing a beacon 334, e.g., alarm beacon, visible from a relatively long distance within line of sight. Such a base unit 24' preferably is configured in firmware and/or software to light up one or more of such other LEDs in response to a received alarm system wireless message containing packet(s) 124 or 124' having a command identifier, e.g., COMMAND ID, of a message identifier, MESSAGE ID, tasking base unit 24' to turn on one or more of such other LEDs. This can be done where user desires to remotely task base unit 24' by manipulating the specific control 64a-64f assigned or associated with base unit 24' in a particular desired manner that causes master controller 22a-22c to transmit a wireless light-activating message, e.g. wireless flashlight activating message, to base unit 24'. In a preferred embodiment and configuration, processor 172 of base unit 24' preferably is configured in firmware and/or software to drive or energize one or more of such other LEDs when such a wireless light-activating message, e.g., wireless flashlight activating message, is received from another alarm system member, preferably from controller 22a-22c, which also contains the device identifier or device number, e.g. DEV NUM, assigned thereto during pairing.

With reference once again to FIG. 16, each one of the base unit enclosure halves 282, 284 is integrally formed with a corresponding exteriorly disposed upraised magnet seat wall 336, 338 which helps define a magnet seat 211 (FIGS. 15-17) when the halves 282, 284 are assembled in which a magnetic flux source 210, preferably a permanent magnet 212, can removably seat which is sensed by a magnetic field or flux sensor 149, preferably reed switch 151 of base unit circuit board 170 when seated. To enable magnet 212 in seat 211 to be sensed by sensor 149, preferably reed switch 151, sensor 149, preferably reed switch 151, preferably is mounted along a side edge of base unit circuit board 170 to sensor 149, preferably reed switch 151, faces toward and is located adjacent seat 211 such as depicted in FIG. 18.

Each one of base unit enclosure halves 282, 284 is further formed with a corresponding interiorly disposed sensor trigger magnet seating anchor retainer pocket 340, 342 that preferably forms a trigger magnet seating anchor retainer 344 that underlies externally-disposed magnet seat 211 when both halves 280, 282 are assembled together. When assembled together, the trigger magnet seating anchor retainer 344 preferably includes or retains a trigger magnet seating anchor 215 formed of magnetically attractable material, e.g., iron, with a preferred trigger magnet seat anchor 215 being a magnetically attractive trigger magnet anchor plate 217, e.g., annular metal washer, such as depicted in FIG. 18, which releasably magnetically attractively retains sensor trigger magnet 212 in seat 211 when the magnet 212 is placed or otherwise seated in seat 211.

In a preferred embodiment, such a sensor base unit housing 194 made of enclosure halves 282, 284 having a sensor trigger magnet seating anchor seat 211 formed of such a magnet seating anchor retainer pocket 340, 342 with a magnetically attractive trigger magnet seating anchor 215 disposed against an interior side of the portion of the housing 194 that forms seat 211 and sensor trigger magnet 212 releasably seated in seat 211 against an opposite exterior portion of the housing 194 with the seat 211 and trigger magnet seating anchor 215 disposed between the magnet 212 and magnet field sensor 148, e.g., magnet sensor 149.

To expand on that previously discussed above, each one of the base unit enclosure halves 282, 284 has at least a plurality of pairs, i.e., at least three, of base unit mounting legs 288a-288f preferably substantially equidistantly circumferentially spaced about the respective outer periphery of each corresponding one of the halves 282, 284. Each leg 288a-288f projects generally transversely outwardly therefrom in both or opposite directions having a first set of feet 292a-292f defining a corresponding end of legs 288a-288f defining a first pedestal 346 upon which base unit 24' can be supported on a surface, e.g. flat surface, and having a second set of feet 294a-294f defining a corresponding opposite end of legs 288a-288f defining a second pedestal 348 upon which base unit 24' can also be supported such that the base unit mounting legs 288a-288f define a reversible base unit pedestal arrangement. Such a reversible base unit pedestal arrangement advantageously enables base unit 24' to be placed on a support surface like the ground or floor on either pedestal 346, 348 depending on whether user wishes to orient base unit 24' so the side or enclosure half 282 with the sensor port 310 faces generally upwardly and/or outwardly away from the support surface or whether user wishes to oppositely orient base unit 24' so the opposite side or enclosure half 284 with the light distributor 330 generally upwardly and/or outwardly away from the support surface.

When base unit 24' is supported by the legs 292a-292f of first pedestal 346 on such a support surface, the sensing element 250 of any sensor 150, e.g., PR sensor 157, disposed in the sensor socket 312 is oriented generally upwardly and outwardly away from the support surface thereby enabling sensor 150, e.g., PIR sensor 157, to detect occurrence of a sensor detection event in a sensing area or sensor detecting field external to base unit 24' that also extends generally upwardly and outwardly away from the support surface. When supported using the first pedestal 346, the light distributor 330 along with any corresponding light emitters, e.g., LEDs, of base unit circuit board 170 faced generally downwardly and toward the support surface such that occurrence of any event, including a sensor detection event, configured to activate the light emitters will generally illuminate an area alongside and underneath the base unit.

With reference to FIG. 17, where it is desired for light to be emitted upwardly and/or from the upwardly/outwardly facing sensor-carrying enclosure half when supported by the legs 294a-294f of the second pedestal 348, base unit 24' and preferably base unit enclosure 168' can be constructed and arranged to include one or more elongate light pipes 350, such as fiber optic cable(s), in light-transmitting communication with one or more corresponding support-surface facing light emitters, e.g., LEDs, mounted on circuit board 170 which communicate and preferably also distribute light to the sensor-carrying enclosure half 282. Where one or more light pipes 350 are used, at least one light pipe 350 preferably extends from at least one of the light emitters, e.g., LEDs, facing toward optical window of enclosure half 284 toward the sensor-carrying enclosure half 282 illuminating at least a portion of the sensor-carrying enclosure half 282 and/or an area outside base unit enclosure adjacent the sensor-carrying enclosure half 282.

When base unit 24' is reversed and placed on support surface using the legs 294a-294f of second pedestal 348, the light distributor 330 along with any corresponding light emitters, e.g. LEDs, of the base unit circuit board 170 faces generally upwardly and outwardly away from the support surface upon which base unit 24' is resting. When supported using the second pedestal 348, sensor port 310 along with adjacent any sensing element 250 of sensor 150 in sensor socket 312 face generally downwardly toward the support surface. Where sensor 150 in the sensor socket 312 is a motion sensor, such as a PIR sensor 157, user typically will configure base unit 24' to deactivate the sensor 150 so base unit 24' monitors a different sensor 148, e.g., reed switch 151 when using the second pedestal 348.

In addition to the oppositely extending sets of paired oppositely extending mated feet 292a-292f and 294a-294f that form the base unit mounting legs 288a-288f respectively defining pedestals 346, 348 that enable bidirectional base unit orientation, at least a plurality, preferably at least a plurality of pairs, of spaced apart legs 288a, 288c, and 288e also function as base unit assembly closures configured to enable one enclosure half 282 to be removably attached to the other enclosure half 284 such as in the manner best depicted by FIGS. 17 and 18. Each assembly closure leg 288a, 288c, and 288e has a fastener engaging foot 294a, 294c, and 294e integrally formed of part of one enclosure half configured to provide a fastener anchor 355 and has a fastener foot 292a, 292c, and 292e with at least part of the foot formed by manipulable knob 352 of a fastener 354 received in a fastener seat 356 in registry with a corresponding fastener engaging foot 294a, 294c, and 294e that guides a connector 358 of fastener 354 into engagement with the anchor of respective fastener engaging foot 294a, 294c, and 294e in assembling the enclosure halves 282, 284 together. With, connector 358 of the fastener foot preferably is an elongate shank 360 extending outwardly from the knob 352 that is guided through a bore in the fastener seat 356 into engagement with the fastener anchor of respective fastener engaging foot 294a, 294c, and 294e. In one such preferred embodiment, shank 360 is a threaded stem of the fastener 354 that extends outwardly from the knob 352 through the guide bore in the fastener seat 356 into the fastener anchor of respective fastener engaging foot 294a, 294c, and 294e preferably into threadable engagement therewith. While the threaded stem or shank 360 of the fastener 354 of each fastener foot 292a, 292c, and 292e can be of self-tapping threaded construction to form or tap its own hole into the fastener anchor of each corresponding fastener engaging foot 294a, 294c, and 294e, the fastener anchor of each corresponding fastener engaging foot 294a, 294c, and 294e can include a threaded bore such as provided by the threaded fastener engaging insert 362 shown in FIG. 17 disposed therein.

To enable the base unit 24' to be mounted to an object, such as a device, an instrument, an apparatus, a wall, or another object having a surface inclined or deviating from horizontal, at least a plurality of other legs, preferably at least a plurality of pairs of other legs that are mounting legs 288b, 288d, and 288f configured as bi-directional base unit fixturing mounts 364 each formed of an elongate fixturing tube 366 which can receive a corresponding elongate fastener (not shown) from either direction used to fix the base unit 24' to the device, instrument, apparatus, wall or other object. The fixturing tube of each mounting leg 288b, 288d, and 288f has an elongate fastener receiving and guiding through bore 368 enabling an elongate fastener, such as an elongate screw, e.g., wood screw, bolt, or the like to be inserted therethrough into engagement with the device, instrument, apparatus, wall or surface of the other object to substantially immovably anchor or fix the base unit 24' thereto.

With reference once again to FIG. 15, base unit 24' can also be releasably attached to a vertical or inclined surface, device, instrument, apparatus or the like using dock 290. Dock 290 preferably is a generally U-shaped clip 370 having a plurality of spaced-apart curved resilient rib-engaging arms 372, 374 defining a rib-receiving receptacle 376 extending outwardly from a mounting base 378, e.g., generally flat plate, used to fix the clip 370 to the surface, device, instrument, apparatus or the like. Such a dock 290 enables snap-fit engagement with and between the arms 372, 374 and any one of a plurality of adjacent pairs of ribs 296a-296b, 296b-296c, 296c-296d, 206d-296e, 296e-296f, and/or 296f-296a enabling docking of base unit 24' in any one at least a plurality of pairs of angular positions, preferably in any one of six angular positions, thereby enabling magnet seat 211 and trigger magnet 212 to be disposed in any one of a corresponding plurality of pairs, preferably six, angular positions.

Fish Strike Monitor

As is shown in FIGS. 19-23, a particularly preferred embodiment of a base unit 24 constructed in accordance with the present invention is configured or user configurable, such as in firmware or software, for use as a fish strike monitor 234 remotely located from master controller 22a-22c that is used to monitor a device or apparatus 152 that is a fishing apparatus 236 used outdoors to catch fish and wirelessly signal controller 22a-22c by triggering sensor 148 when a fish (not shown) has struck fishing apparatus 262. Sensor 148 of base unit 24 is located adjacent and thereby close enough to fishing apparatus 236 to detect movement or rate of change of movement of an elongate pole 238 of fishing apparatus 236 relative to sensor 148 sufficient to trigger sensor 148 and cause processor 174 to have radio 182 wirelessly message controller 24a-24c of occurrence of a sensor detection event that is a fish strike detection event.

In a preferred fish strike monitor embodiment, sensor 148 is located onboard fishing apparatus 236 and preferably disposed in operable cooperation with pole 238, preferably operatively connected to pole 238, such that movement, rate of movement, or rate of change of movement of pole 238 relative to sensor 148 occurring when a fish strikes is detected by sensor 148 thereby triggering sensor 148. In one such preferred embodiment, sensor 148 and base unit 24 are both disposed onboard fishing apparatus 236, preferably carried thereby, such as by being mounted or attached thereto and/or by being formed or manufactured as part of fishing apparatus 236.

As is best shown in FIGS. 19 and 22, fishing apparatus 236 preferably is an ice fishing tip-up 240 having an elongate generally rectangular, generally planer base 242 (a) to which pole 238 is resiliently anchored by a biasing element 244 that preferably is a coil spring 246, and (b) to which a tip-up spindle shaft 248 is pivotally mounted. Spindle shaft 248 carries a spool 250 with fishing line 252 and a hook 254 at one end and a rotatable crossbar 256 that releasably engages a wire latch 258 pivotally carried by pole 238, forming a mechanical fish strike alarm trigger mechanism 260 providing a mechanically operated visually perceptible fish strike alarm 262 that is actuated when a fish strikes. To help increase visibility of alarm 262 when triggered, pole 238 is an elongate fish strike alarm pole 238 that preferably carries a fish strike alarm flag 264 adjacent its free end 266 as shown in FIG. 12 that is disposed uprightly in the air after the tip up fish strike alarm 262 is triggered as depicted in FIG. 17.

With particular reference to FIGS. 14-16, base unit 24, configured as fish strike monitor 234, is attached to part of tip up 240 preferably by being fixed, e.g., adhesively or using fasteners, to part of tip up base 242 adjacent free end 266 of alarm pole 238 with a facing wall 268 of base unit enclosure 168 disposed between onboard sensor 148, used to detect a fish strike, and a fish strike sensor trigger 270 carried by pole 238 of tip up 240, which triggers sensor 148 when a fish strike occurs. Fish strike sensor trigger 270 preferably is a sensor trigger magnet 212 operatively connected by a trigger actuator 271 to pole 238 with magnet 212 removably magnetically seated on magnet seat 211 formed of part of enclosure wall 268 adjacent to and generally alongside, preferably generally in line with sensor 148, preferably reed switch 151. In the preferred embodiment shown in FIGS. 19-23, trigger actuator 271 preferably is an elongate flexible tether 273 formed of string, rope, line, wire or the like that is attached to pole 238 at one end and to trigger magnet 212 at its opposite end. When magnet 212 is attached to magnet seat 211, the seated magnet 212 arms sensor 148 of base unit 24 by magnetically closing reed switch 151 communicating to processor 174 that switch 151 is ready to be triggered by a fish strike.

Where sensor 148, preferably reed switch 151, is unable to magnetically anchor trigger magnet 212 on magnet seat 211 on its own, magnet seat 211 preferably further includes a magnetically attractive trigger magnet anchor 215, such as depicted in FIG. 21, disposed adjacent and generally in line with reed switch 151. In one preferred embodiment, trigger magnet anchor 215 is formed of a generally flat magnet anchor plate 217 made of ferromagnetic material, e.g., steel, iron, nickel, cobalt or the like, or another magnetically attractive material which is carried, preferably fixed, e.g., adhesively affixed, to base unit enclosure wall 268 adjacent and generally inline, e.g., preferably above or below, reed switch 151, such as in the manner depicted in FIG. 21. In another preferred embodiment where such a trigger magnet anchor 215 is desired or needed, anchor 215 can be integrally formed of or in enclosure wall 268 where seat 211 is located, preferably adjacent and generally in line with reed switch 151, such as during molding or manufacture of enclosure 168 and/or base unit 24.

FIG. 19 illustrates the ice fishing tip-up 240 in an armed condition with alarm pole 238 resiliently biased about bent spring 246 into an armed position where wire latch 262 engages crossbar 256 retaining pole 238 in a bent generally horizontal position until a fish strikes bait (not shown) on hook 254 drawing line 252 from spool 250 causing spindle shaft 248 to rotate. When spindle shaft 248 rotates in response to a fish strike, spindle shaft 248 also rotates out of engagement with latch 262 releasing the latch 262 causing spring 246 to bias alarm pole 238 upwardly toward a generally upwardly located fish strike alarm position shown in FIG. 22 where pole 238 is vertical disposing fish strike alarm flag 262 in the air.

When pole 238 springs upwardly upon latch 262 being released, trigger 270 is displaced relative to and preferably away from sensor 148 triggering sensor 148 to interrupt processor 174 causing processor 174 of the alarming base unit to wirelessly message controller 22*a*-22*c*. Where trigger 270 used is trigger magnet 212 and sensor 148 used is reed switch 151, moving pole 238 displaces tether 272 and pulls trigger magnet 212 away from base unit 24 unseating magnet 212 from magnet seat 211, such as depicted in FIGS. 22 and 23. Once magnet 212 is unseated from magnet seat 211 and pulled away from reed switch 151, reed switch 151 opens and processor 174 detects reed switch opening as sensor trigger causing base unit 24 to send wireless fish strike detection event message to controller 22*a*-22*c*. Controller 22*a*-22*c* signals user as discussed above by driving at least one user perceptible indicator discussed above as being driven when controller 22*a*-22*c* receives a wireless sensor detection event message.

After user is alerted by controller 22*a*-22*c* of a fish strike, user can check the tip up and re-arm not only the tip up but also the fish strike monitor or base unit 24. Tip up is re-armed by bending pole about spring until its latch can engage crossbar. Fish strike monitor or base unit 24 is then re-armed by manually placing trigger magnet back on its magnet seat. User preferably watches user perceptible indicators when re-arming sensor 148, preferably reed switch 151, during placement of magnet 212 on seat 211. When processor 174 detects closing of reed switch 151 during placement of magnet 212 on seat 211 during fish strike detector sensor re-arming, processor drives both indicators providing visually perceptible feedback to user that fish strike monitor has been re-armed and is ready to detect another fish strike.

In a preferred base unit embodiment, sensor base unit 24 or 24' can be equipped or otherwise configured with a plurality of different sensor trigger magnets 212 that each have a different gauss or magnetic field strength thereby producing a sensor base unit 24 or 24' constructed in accordance with the present invention having at least a plurality of different magnetic field sensor trip forces thereby enabling one of the plurality of different magnetic flux or field strength magnets 212 to be selected that has a stronger magnetic field, e.g., magnetic field strength, magnetic flux, e.g., magnetic flex strength, or gauss than another one of the magnets 212 when such a stronger magnet 212 is needed in order to require a greater magnet trigger force to be exerted to unseat the magnet 212 from seat 211 during sensor base unit operation.

In one such preferred sensor base unit embodiment, base unit 24 or 24' is equipped with at least a plurality and preferably at least a plurality of pairs, i.e., at least three, of different strength sensor trigger magnets 212 with the actual one of the sensor trigger magnets 212 selectable by a user configuring the base unit 24 or 24' for use depending on the trigger force needed or desired to unseat the particular magnet 212 selected for use from magnet seat 211 causing sensor 148, preferably magnetic flux sensor 149, preferably reed switch 151, to trigger sensor 148 generating an interrupt that causes processor 174 of the alarming base unit to transmit a wireless sensor detection event message to controller 22*a*-22*c*. In a preferred base unit embodiment, base unit 24 or 24' is packaged, e.g., equipped, with at least two and preferably at least three trigger magnets 212 each having a different strength or gauss with (a) a first sensor trigger magnet 212 having a great enough gauss, magnetic field strength or magnetic flux strength to require trigger actuator 271, preferably tether 272, to exert a force of at least five pounds in a direction opposite that of the trigger magnet seating anchor 215 in order to unseat magnet 212 from seat 211 to cause sensor 148 to trigger causing an interrupt to be generated that causes processor 174 of the alarming base unit to transmit a wireless sensor detection event message to controller 22*a*-22*c*, (b) a second sensor trigger magnet 212 having a great enough gauss, magnetic field strength or magnetic flux strength to require trigger actuator 271, preferably tether 272, to exert a force of at least seven pounds in a direction opposite that of the trigger magnet seating anchor 215 in order to unseat magnet 212 from seat 211 to cause sensor 148 to trigger causing an interrupt to be generated that causes processor 174 of the alarming base unit to transmit a wireless sensor detection event message to controller 22*a*-22*c*, and (c) a thread sensor trigger magnet 212 having a great enough gauss, magnetic field strength or magnetic flux strength to require trigger actuator 271, preferably tether 272, to exert a force of at least ten pounds, preferably of at least about eleven pounds, in a direction opposite that of the trigger magnet seating anchor 215 in order to unseat magnet 212 from seat 211 to cause sensor 148 to trigger causing an interrupt to be generated that causes processor 174 of the alarming base unit to transmit a wireless sensor detection event message to controller 22*a*-22*c*. Such different strength sensor trigger magnets 212 preferably are neodymium magnets having a magnetic field strength, magnetic flux or gauss rating sufficient to respective provide at least five pounds of trigger force, at least eight pounds of trigger force and at least ten pounds, preferably at least about eleven pounds, of trigger force exerted by trigger actuator 271, preferably tether 272, to pull the particular strength or force requiring magnet 212 from seat 211. As indicated, trigger actuator 271 preferably is an elongate tether 272, such as an elongate link, e.g., rigid link, line, wire, cable, rope, string or the like which can be flexible or substantially rigid with displacement of the trigger actuator 271, preferably tether 272, far enough in a direction away from magnet 212 seated in seat 211 and exerting a force at least as great and preferably greater than the respective aforementioned trigger force of the magnet 212 selected for use causes the magnet 212 to pull away and unseat from seat 211. As previously indicated, when the magnet 212 unseats from seat 211, the alarming base unit 24 or 24' to which the magnet 212 was seated in seat 211 wirelessly transmits a sensor detection event message to master controller 22*a*-22*c* that can be a wireless message that specifically indicates a magnetically triggered sensor detection event has occurred.

With reference once again to FIGS. 15-18, assembled enclosure 168' of base unit 24' preferably is watertight and buoyant enabling the base unit 24' to float in water and be configured as a sensor-equipped water-borne detecting or monitoring unit capable of operating while disposed in water, including under water, which is of water-tight and/or gas-tight construction enabling such a water-borne detecting or monitoring unit to operate while being partially or even completely submerged or immersed in water, e.g., capable of operating underwater or capable of underwater operation. Such a water-borne detecting or monitoring unit, e.g., unit 24' constructed with water-tight and/or airtight enclosure 167', can also be of buoyant construction enabling the unit to be configured as water-borne buoyant fish strike monitor such as a (1) a sensor and alarm-equipped bobber that is attached to a fishing line and equipped with one or more sensors and configured to sense and alarm on fish strikes by sensing acceleration and/or change(s) in acceleration of the unit indicative of a fish strike, and/or (2) a sensor and alarm-equipped planer board attached to a fishing line being pulled by a moving boat with the planer board equipped with one or more sensors and configured to sense and alarm on detected angle, change in angle, and/or velocity, acceleration and/or change in acceleration(s) of the unit indicative of one or more fish strikes or fish being caught, trapped or otherwise collected for harvest. Water-borne detecting or monitoring unit can also be configured as a sensor and alarm-equipped buoy equipped with one or more sensors and configured to sense and alarm on detected wave height, velocity, magnitude and/or frequency by sensing velocity, acceleration and/or change(s) in acceleration in a plurality of axes, e.g., vertical and/or horizontal axes, of waves passing through, bobbing or otherwise impacting the unit.

In a preferred planer water-borne detecting or monitoring unit embodiment, base unit 24' has at least one sensor, e.g., sensor 148 and/or 150, which can be mounted to its circuit board 170 and/or to enclosure 168', preferably is an accelerometer, a gyro, multiple accelerometers, an angle or orientation sensor such as a tilt sensor or tilt sensor switch used to alert a user, e.g., fisherman, when an angle of the unit has exceeded a preset angle or angle range indicative of a fish strike having occurred to a hook(s), net or bait on the fishing line. In one such preferred planer board-configured base unit embodiment, the angle or orientation sensor, e.g., sensor 148 and/or 150, preferably is or includes at least one accelerometer, e.g., an accelerometer-equipped IC chip, and/or at least one gyro, e.g. a gyro-equipped IC chip, with base unit processor 174 configured in firmware and/or software to generate an alarm, e.g. alarm interrupt, upon occurrence of an angular rate change, e.g. angular acceleration, exceeding a predetermined threshold or range indicative of a fish strike occurring or having occurred, and/or upon occurrence of a change in tilt angle exceeding a predetermined threshold or range indicative of a fish strike occurring or having occurred. Such a water-borne detecting or monitoring unit base unit preferably also is configured in firmware and/ software to broadcast a wireless sensor detection event message to master controller 22a-22c and/or provide a local and/or remote (remote when provided to controller 22a-22c) user-perceptible alarm, preferably including a visually-perceptible alarm, using any one or more of the user-perceptible indicators disclosed herein. In a preferred water-borne detecting or monitoring unit embodiment, base unit 24' can be configured as water-borne fish strike monitor operable in a bobber and/or a planer board mode where base unit 24' is configurable in firmware and/or software. In a preferred planer board base unit configuration and method, such a base unit 24' preferably is configured in firmware and/or software to automatically operate in non-poll mode during such operation and/or when configured for such water-borne fish strike monitor operation.

Alarm System Setup, Use and Operation

As previously discussed, master controller 24a-24c of an alarm system 20 constructed in accordance with the present invention has a master controller ID preferably based on its processor serial number that is not only used in assigning unique base unit IDs during pairing of base units 24a-24f with controller 22a-22c but also enables paired base units 24a-24f to detect when a wireless message is broadcast from controller 22a-22c including wireless messages from controller 22a-22c intended for a specific one of the base units 24a-24f of alarm system 20.

Pairing

In setting up an alarm system 20 constructed in accordance with the present invention, an unpaired base unit 24 is wirelessly paired with master controller 22a-22c by a user pressing the pair button 216 of the unpaired base unit 24 being paired with controller 22a-22c. Pair button 216 preferably is pressed and held pressed for more than one second and preferably at least a plurality of seconds, more preferably about three seconds, causing unpaired base unit 24 to broadcast a wireless message to controller 22a-22c that is a wireless base unit pair request message. When master controller 22a-22c receives the wireless message and determines the message is a pair request message from unpaired base unit 24, master controller processor 84 is configured to respond with a wireless master controller pairing message to base unit 24 undergoing pairing that contains a wireless message alarm system ID, preferably master controller ID, and assigns a base unit device number ID, e.g., between 1 and 6 and corresponding to control 64a-64f, e.g., button 66a-66f selected by user, which are both stored onboard base unit 24 in completing the base unit pairing process. Once paired, controller 22a-22c and each paired base unit 24a-24f forms a wireless alarm system network 26 in accordance with the present invention with wireless messages broadcast between controller 22a-22c and paired base units 24a-24f of the network 26 each containing master controller ID enabling receiving alarm system network member 22a-22c and/or 24a-24f to decode as being for a network member 22a-22c and/or 24a-24f.

Base unit pair request message is a wireless message having the same packet format as any other wireless message of alarm system 20 but which instead is formed of at least one or more packets 124 or 124' that (a) contains at least one of (i) a pairing command in message identifier 129, (ii) an unpaired alarm system ID, such as unpaired master control ID, e.g., null ID, and (iii) an unpaired base unit device number ID, e.g., null ID, and that (b) preferably contains a plurality of and preferably all three of (i) the pairing command in message identifier 129, (ii) unpaired alarm system ID, such as unpaired master controller ID, e.g., null ID, and (ii) unpaired base unit device number ID, e.g., null ID. In such a pair request message, each one of the ID holder blocks, namely ID #0, ID #1, ID #2 and/or ID #4, of alarm system wireless message identifier segment 127 of each packet 124 or 124' holds an unpaired alarm system ID, such as unpaired master controller ID, e.g., null ID. An example of such a null ID in hexadecimal format is 0xFF.

Controller 22a-22c, preferably processor 84 and/or radio 92, is configured in firmware and/or software to decode a received wireless message as being a pair request message from an unpaired base unit 24 by determining whether the received message has at least one of (i) a pairing command in message identifier 129, (ii) an unpaired alarm system ID, such as unpaired master control ID, e.g., null ID, and/or (iii) unpaired base unit device number ID, e.g., null ID, in determining whether the message is a pair request. Controller 22a-22c, such as processor 84 and/or radio 92, can be and preferably is configured to decode wireless message as being a pairing request upon the received message containing a plurality of (i), (ii) and/or (iii). In one preferred pairing request decoding method implementation, controller 22a-22c, such as processor 84 and/or radio 92, can be and preferably is configured to decode wireless message as being a pairing request upon the received message containing (i), (ii) and (iii).

When controller 22a-22c receives wireless message and determines the message is a pair request message from an unpaired base unit 24, controller 22a-22c, preferably processor 84, is configured in firmware and/or software to drive at least one of the user perceptible indicators 46, 52, 60, 72 and/or 78 onboard controller 24a-24c to output a corresponding user perceptible pair request indication telling user that a pairing sequence has been initiated by controller 22a-22c. In a preferred pairing method implementation, where controller 22a-22c is equipped with one or both of an audible indicator 72, e.g. buzzer 76, and/or tactile indicator 78, e.g., vibrator 80, one or both are driven by processor 74 to output a user perceptible indication in the form of a beep, buzzer, pulse or vibration pattern communicating to user receipt of a pairing request from an unpaired base unit 24.

While controller 22a-22c is providing user indication of pairing sequence being underway, user manipulates one of controls 64a-64, preferably by pressing one of buttons 66a-66f, of master controller 22a-22c, to cause master controller processor 84 to assign the number of the manipulated control, preferably pressed button, as the base unit device number ID to base unit 24 being paired. Controller 22a-22c, preferably processor 84, is therefore further configured to assign or link control 64a-64f, button 66a-66f, selected by user to base unit 24 being paired by assigning the number of the selected control, e.g. pressed button, as the base unit device number ID to base unit 24 undergoing pairing via a wireless controller pairing message broadcast to base unit 24 undergoing pairing. Once the wireless controller pairing message is received by base unit 24 being paired completing pairing, master controller processor 84 is configured to cease outputting any pair request indication from any of the user perceptible indicators when pairing is completed.

Controller 22a-22c, preferably processor 84, is therefore configured to enable base unit 24 being paired to be assigned to one of master controller controls 64a-64f, e.g. control buttons 66a-66f, by user manipulating a desired one of controls 64a-64f, preferably by pressing desired one of control buttons 66a-66f, user wishes to assign to a base unit device number ID, e.g., corresponding number of control or button number, to base unit 24 being paired when the pairing sequence is initiated by controller 22a-22c receiving pair request message from unpaired base unit 24. In a preferred pairing sequence implementation, upon user being provided with such a user perceptible pairing indication from at least one of master controller indicators 46, 52, 60, 72 and/or 78, user manipulates desired one of controls 64a-64f, preferably by pressing corresponding desired one of control buttons 66a-66f, thereby assigning base unit 24 being paired to the control manipulated, preferably button pressed, by user by assigning the number of the control or button as a base unit device number ID to base unit 24 being paired during controller execution of the pairing sequence. In one such preferred pairing sequence implementation, the base unit device number ID, e.g. a number ranging from 1-6 that depends on the number of controls 64a-64f or buttons 66a-66f, corresponding to the desired one of controls 64a-64f, desired one of buttons 66a-66f.

For sake of simplicity, base unit device number #1, e.g., DEV NUM #1, is automatically assigned to one of the base units 24a-24f, e.g. base unit 24a, assigned to first control 64a, button 66a, during pairing, base unit device number #2, e.g. DEV NUM #2, is automatically assigned to one of the base units 24a-24f, e.g. base unit 24b, assigned to second control 64b, button 66b, during pairing, base unit device number #3, e.g. DEV NUM #3, is automatically assigned to one of the base units 24a-24f, e.g. base unit 24c, assigned to third control 64c, button 66c, during pairing, base unit device number #4, e.g. DEV NUM #4, is automatically assigned to one of the base units 24a-24f, e.g. base unit 24d, assigned to fourth control 64d, button 66d, during pairing, base unit device number #5, e.g. DEV NUM #5, is automatically assigned to one of the base units 24a-24f, e.g. base unit 24e, assigned to fifth control 64e, button 66e, during pairing, and base unit device number #6, e.g. DEV NUM #6, is automatically assigned to one of the base units 24a-24f, e.g. base unit 24f, assigned to sixth control 64f, button 66f, during pairing. In addition, more base units 24 may be assigned to any one of the aforementioned base unit device numbers, such that any single base unit device number may correspond to multiple base units 24.

Thereafter, wireless messages broadcast from controller 22a-22c containing unique base unit ID in each ID holder of transmitting member identifier section 127 of preamble is received and decoded by paired base unit 24 assigned corresponding unique base unit ID during pairing. Wireless messages transmitted from each paired base unit 24a-24f are received and decoded by controller 22a-22c paired therewith enabling secure, reliable and robust wireless communication during alarm system operation. When it is desired to un-pair base unit 24 previously paired with controller 22a-22c, erase button 220 is pressed by user.

Polling

During alarm system operation, master controller 22a-22c can poll any one of at least a plurality, preferably at least a plurality of pairs, i.e., at least three, of base units 24a-24f paired with controller 22a-22c by user manipulating a particular one of the controls 64a-64f, preferably user pressing particular one of the buttons 66a-66f, of controller 22a-22c having the same number as the corresponding base unit device number ID assigned to the particular corresponding base unit 24a-24f polling the particular base unit 24a-24f assigned thereto. In a preferred method of alarm system operation, manipulating a specific control 64a-66f, e.g. pressing button 66a-66f, assigned to particular one of a plurality of base units 24a-24f paired with controller 22a-22c sends a wireless polling message containing master controller ID in alarm system identifier segment 127, a polling command ID in its message identifier 129, and in its payload 128, the base unit device number ID assigned to the particular base unit 24a-24f being polled and sought to be located by checking whether the polled base unit 24a-24f is within wireless radio frequency reception range of controller 22a-22c.

If the particular base unit 24a-24f sought to be located is in polling mode, polled base unit 24a-24f, preferably processor 174, is configured in firmware and/or software to wirelessly acknowledge receipt of wireless polling mode message from controller 22a-22c in response to receiving polling message directed to it from controller 22a-22c. The wireless polling acknowledgment message broadcast from polled base unit 24a-24f has a preamble 126 with alarm system identifier segment 127 containing master controller ID, a polling response ID in its message identifier 129, and in its payload 128, the base unit device number ID assigned to the polled base unit 24a-24f that is wirelessly acknowledging being polled.

Use and Operation

In a preferred alarm system configuration, multiple base units 24a-24f are paired with the master controller 22a-22c in such a manner forming an alarm system network 26 where each one of the base units 24a-24f are remotely located from controller 22a-22c in different locations with each base unit 24a-24f having at least one sensor 148 and/or 150 armed readying base unit for monitoring or detecting use and operation. When armed sensor 148 and/or 150 of a base unit 24a-24f is triggered by a sensor detection event, a wireless sensor detection event message, e.g. wireless alarm message, is transmitted from the base unit 24a-24f experiencing the sensor detection event to controller 22a-22c.

If desired, in a preferred base unit method of operation, alarming base unit 24a-24f is configured to drive at least one of its onboard indicators, preferably LED 158a, as an alarm to provide a user nearby that the alarming base unit has experienced a sensor detection event. In one preferred method implementation, alarm LED 158a periodically flashes such as by flashing every plurality of seconds, preferably flashing every three seconds, until the alarm condition that triggered sensor 148 and/or 150 is cleared. In one preferred method implementation, alarm LED 158a periodically flashes such as by flashing every plurality of seconds, preferably flashing every three seconds, until the alarm condition that triggered sensor 148 and/or 150 is cleared. In such a preferred method implementation, the sensor detection event can be automatically cleared after a predetermined alarm reset or alarm clearing period of time lapses, but preferably is cleared by a user manually resetting alarming base unit 24a-24f. In one such preferred implementation, base unit 24a-24f is configured so user resets it after experiencing a sensor detection event by rearming sensor 148 and/or 150.

Where sensor 148 of base unit 24a-24f is a reed switch 151 that has been armed by placing trigger magnet 212 in magnet seat 211, triggering of reed switch 151 by unseating magnet 212 from seat 211 causes sensor detection event which results in sensor detection event message being transmitted from alarming base unit 24a-24f to controller 22a-22c. To clear an alarm condition of an alarming base unit 24 whose reed switch 151 has been triggered, user preferably must manually rearm reed switch 151 by reseating magnet 212 on magnet seat 211. Once rearmed and alarm condition has been cleared, base unit 24a-24f is ready to resume monitoring or detecting operation.

When master controller 22a-22c receives the wireless sensor detection event message, controller 22a-22c drives one or more of its onboard indicators in a manner that provides user with an alarm indicating that one of base units 24a-24f has experienced a sensor detection event. In a preferred controller method implementation, controller 22a-22c is configured to drive each alarm indicator in a manner, preferably using a pattern, which indicates to the user specifically which one of base units 24a-24f has experienced a sensor detection event and wirelessly issued the alarm. In one preferred method implementation, controller 22a-22c is configured to drive each alarm indicator by flashing or pulsing the indicator N number of times where N corresponds to the base unit device number ID assigned to the alarming base unit 24a-24f. In one such preferred implementation, at least one of the visually perceptible indicators 48, such as one of LEDs 50a and/or 50b, is flashed N number of times where N is the number of the base unit device number ID assigned to alarming base unit 24a-24f whose sensor 148 and/or 150 was triggered by occurrence of the sensor detection event.

FIG. 24 is a flowchart depicting an exemplary but preferred method of operation 380 that master controller 22a-22c is configured in firmware and/or software to carry out during operation of alarm system 20. Upon power up 382 of controller 22a-22c, processor 84 is configured to go through an initialization procedure step 384 that preferably causes wireless communications system 82 to start preamble detection step 386 where radio 92 put in signal detection mode where radio 92 listens for wireless messages with packets having a preamble detected by radio as being a valid preamble 126. If a valid preamble 126 is not detected during a predetermined signal detection period of time before preamble timeout occurs in step 388, a button press check 390 is made whether any button 66a-66f has been pressed before then putting radio 92 into power-conserving sleep mode in step 392 for a predetermined sleep mode period of time delay 394 before once again resuming preamble detection 386. Steps 386, 388, 390, 392 and 394 can be repeated as part of an operating loop that preferably is a wireless communication system ultralow power mode operating loop 396 that is executed during each ultralow power mode operating cycle and continues to be executed until either a valid preamble 126 of a wireless message packet is detected by radio 92 in step 386 and before step 388 or an interrupt is generated by user manipulation of control(s) 64a-64f, e.g. button(s) 66a-66f, in step 390 causing loop 396 to be exited.

In accordance with that previously discussed above regarding ultralow power mode wireless communication system operation, during each ultralow power mode cycle or loop, the period of time delay that radio 92 remains in sleep mode is greater than the period of time that radio 92 listens for wireless messages in signal detection mode before preamble timeout occurs. Further in accordance with that discussed above, the total ultralow power mode cycle or loop time preferably is greater than one half wireless message packet transmission time but no greater than about packet transmission time with the period of time delay radio 92 remains in sleep mode during each cycle or loop being no greater than preamble transmission time but preferably greater than one half packet transmission time to provide optimal battery power conservation without causing sleep mode synchronization with preamble transmission.

If a valid preamble 126 is detected while radio 92 is operating in signal detection mode during preamble detection step 386 before preamble timeout 388 occurs, receive mode is then started in step 398 where radio 92 preferably operates in receive mode to try and receive the packet detected as having the valid preamble 126 before receive timeout 400 elapses. Should receive timeout 400 occur without having received the packet with the detected valid preamble 126, ultralow power mode operation is resumed by putting radio 92 into sleep mode 392 in returning to execution of ultralow power mode operating loop 396.

If the wireless message packet 124 or 124' with the detected valid preamble 126 is received before receive timeout 400, the packet 124 or 124' is decoded and its payload 128 examined in an alarm message checking step 402 to determine whether the message received by master controller 22a-22c is a wireless alarm message or wireless sensor detection event broadcast by one of the base units 24a-24f paired with controller 22a-22c which has experienced a sensor detection event. If the message identifier of the payload 128 contains an alarm identifier, an alarm is then outputted by the controller 22*a*-22*c* in alarm activating step 404 such that at least one user-perceptible indicator is activated in accordance with that discussed above to provide a user-perceptible alarm that communicates to user receipt of a wireless alarm message from an alarming base unit 24*a*-24*f*. In a preferred implementation of the master controller operating method depicted in FIG. 24, the received packet with the detected valid preamble 126 is decoded and checked in step 404 to determine whether its payload 128 also has a valid alarm system identifier, ALARM ID, in accordance with that discussed above, in addition to checking whether packet payload 128 also contains an alarm message identifier, MSG ID, from an alarming base unit 24*a*-24*f* that also has a device identifier or device number, DEV NUM, of a base unit 24*a*-24*f* that has been paired with controller 22*a*-22*c*.

In a preferred implementation of the controller operating method depicted in FIG. 24, where either the command identifier or response identifier of the message identifier, MSG ID, of the payload 128 of received packet 124 or 124' is an alarm identifier, controller 22*a*-22*c* preferably is configured to activate (a) buzzer 76 and/or vibrator 80 and (b) at least one LED onboard controller 22*a*-22*c* with controller 22*a*-22*c* preferably configured in step 404 to activate the LED 67*a*-67*f* of the specific button 66*a*-66*f* that was assigned during pairing to the particular base unit 24*a*-24*f* that transmitted the wireless sensor detection event message. Such a dual alarm arrangement and configuration advantageously enables the auditory and/or tactile alarm to get the attention of user that is carrying controller 22*a*-22*c* on their person without actually looking at controller 22*a*-22*c* at the time of the alarm so user can then manually grasp and look at controller 22*a*-22*c* to determine which one of a plurality, preferably a plurality of pairs, of the paired base units 24*a*-24*f* wirelessly sent the alarm by looking at which button 64*a*-64*f* has its corresponding LED 67*a*-67*f* activated.

After controller 22*a*-22*c* has issued a user-perceptible alarm in step 404, acknowledgement is provided by controller 22*a*-22*c* to the alarming base unit 24*a*-24*f* of receipt of the wireless alarm message from the alarming base unit 24*a*-24*f* in step 406 such as by automatically broadcasting a wireless alarm acknowledgment message to the alarming base unit 24*a*-24*f*, if desired, before once again resuming preamble detection 386. In a preferred implementation of the method depicted in FIG. 24, controller 22*a*-22*c* is configured to wirelessly send the alarming base unit 24*a*-24*f* acknowledgment of receipt of alarming base unit's wireless alarm message when user manually interacts with controller 22*a*-22*c* during the alarm activating step 406 acknowledging the alarm being outputted by controller 22*a*-22*c* thereby providing confirmation controller user perceived the alarm. In one such preferred method implementation, pressing the button 66*a*-66*f* of controller 22*a*-22*c* whose LED 67*a*-67*f* became lit up or started flashing during alarm activating step 404 not only acknowledges user receipt of the alarm but also initiates the base unit acknowledgment step 406 causing controller 22*a*-22*c* to wirelessly acknowledge the alarming base unit. Doing so preferably not only turns off the alarming LED of the specific controller button 66*a*-66*f* associated during pairing with the particular base unit 24*a*-24*f* sending the alarm, but it preferably also causes the alarming base unit 24*a*-24*f* to stop broadcasting the wireless alarm message. Doing so can and preferably does also reset either or both the controller 22*a*-22*c* and/or the alarming base unit 24*a*-24*f* enabling each to respectively resume normal operation with alarming base unit 24*a*-24*f* preferably resuming monitoring its one or more sensors 148 and/or 150 for occurrence of another sensor detection event.

Returning once again to alarm message checking step 402, if the received wireless message is not an alarm or sensor detection event message, the received message is further checked in pairing message checking step 408 to determine whether the received message is a pairing message broadcast by a base unit not yet paired with master controller 22*a*-22*c*. Where the decoded payload 128 of the received wireless message packet 124 or 124' has (a) an alarm system identifier or Alarm ID, e.g., Alarm ID0, Alarm ID1, Alarm ID2 and/or Alarm ID3, containing a null or unpaired value, (b) a message identifier or MSG ID containing a null or unpaired value, and/or (c) a device identifier or device number, e.g., DEV NUM, containing a null or unpaired value, as discussed in more detail above, a pairing procedure is initiated where a pairing procedure initiating indicator step 410 is executed causing controller 22*a*-22*c* to provide a user-perceptible indication that a wireless pairing message has been received by an unpaired base unit causing controller 22*a*-22*a* to initiate its pairing procedure.

During execution of the initial pairing procedure step 410, at least one user-perceptible indicator in accordance with that discussed above is activated to provide a user-perceptible indication of pairing being attempted that preferably includes activating (a) a buzzer 76 and/or (b) vibrator 80 in a manner that communicates pairing procedure initiation to user. In a preferred pairing procedure implementation, a user-perceptible pairing indication is outputted by buzzer 76 buzzing and/or vibrator 80 vibrating during step 410 until in step 412 a specific one of the buttons 66*a*-66*f* of controller 22*a*-22*c* is pressed that user wishes to thereafter associate with or assign the particular unpaired base unit undergoing pairing with controller 22*a*-22*c*. Upon pressing of the specific one of the buttons 66*a*-66*f* of controller 22*a*-22*c* being assigned to the unpaired base unit undergoing pairing, controller 22*a*-22*a* preferably then responds in step 414 to the original wireless pairing request from the unpaired base unit by sending a wireless pairing confirmation message to the base unit undergoing pairing providing the base unit undergoing pairing the unique alarm system identifier, ALARM ID, of alarm system 20 and the specific device identifier or device number, DEV NUM, being assigned to the base unit undergoing pairing that corresponds to the number of the specific one of the buttons 66*a*-66*f* the user pressed during step 412.

Thereafter, controller 22*a*-22*c* preferably is configured to cease activation of the user-perceptible pairing indicator in step 416 by turning off buzzer 76 and/or turning off vibrator 80. In a preferred pairing procedure implementation discussed above, controller 22*a*-22*c* can be and preferably is configured to wait to execute step 416 until after a wireless pairing acknowledgment message from the paired base unit 24*a*-24*f* is received by controller 22*a*-22*c* indicating the paired base unit 24*a*-24*f* successfully received the wireless pairing confirmation response message from controller 22*a*-22*c*.

After completion of the pairing procedure, preferably after executing step 416, controller 22*a*-22*c* once again resumes preamble detection 384. Preamble detection 384 preferably also is resumed in the case where it is determined in pairing message checking step 408 that the received wireless message is not a pairing request.

Returning to button press check step 390, where a button press interrupt is detected in step 390, a first button press check step 418 is carried out to determine whether the button(s) 66*a*-66*f* of controller 22*a*-22*c* detected as pressed is a single one of the buttons 66a-66f that has been pressed for a single long duration where the single button remains continuously pressed for a predetermined single button press threshold period of time in accordance with that previously discussed above. Where it is determined that a single button 66a-66f of controller 22a-22c has been continuously pressed by user for a period of time that exceeds the single button press threshold period of time, controller 22a-22c is configured to broadcast a wireless flashlight-activating message in step 420 causing one or more or all of the base units 24a-24f paired with controller 22a-22c receiving the flashlight-activating message to turn on one or more of its LEDs causing each flashlight-activated base unit 24a-24f to light up, e.g., turn on its flashlight, before resuming preamble detection 386. In a preferred method implementation, controller 24a-24f is configured to transmit the wireless flashlight-activating message only to the particular base unit 24a-24f associated with the specific one of the controller buttons 66a-66f held pressed by user for a period of time exceeding the single button press time threshold thereby causing only the particular base unit 24a-24f to light up and/or operate in flashlight mode before once again resuming preamble detection 386.

Where the first button press check step 418 is not met, a second button press check 422 is undertaken to determine whether a single button 66a-66f has been pressed for a period of time less than the aforementioned button press time threshold. If it is determined in step 422 only one of the buttons 66a-66f has been pressed, but only for a period of time less than the predetermined button press time threshold, a subsequent comparison step 424 is carried out to determine whether there is a particular one of the base units 24a-24f currently alarming having the same device number or device identifier, DEV NUM, as the number of the specific one of the buttons 66a-66f pressed for less than the predetermined button press time threshold.

If comparison step 424 indicates that the number of the pressed button 66a-66f corresponds to an alarming paired base unit 24a-24f assigned to the pressed button 66a-66f, processor 22a-22c is configured to executed alarming clearing step 426 to thereby clear any alarm being outputted by controller 22a-22c and also turn off the LED 67a-67f of the pressed button 66a-66f before once again resuming preamble detection 386. Where execution of comparison step 424 indicates the particular base unit 24a-24 assigned to the specific button 66a-66f pressed by user is not alarming, then controller 22a-22c is configured execute polling step 428 to wirelessly poll the particular base unit 24a-24f associated with the pressed button 66a-66f by wireless sending a polling message thereto before once again resuming preamble detection 386.

Where the first and second button press check steps 418 and 422 are not met, a third check 430 is undertaken to determine whether a plurality of the buttons 66a-66f have been simultaneously pressed and remained pressed for a period of time greater than the aforementioned button press time threshold. If it is determined that a plurality of the buttons 66a-66f have been pressed at the same time longer than the button press time threshold, the controller 22a-22c is then powered down in step 432 thereafter awaits for occurrence of a device power on event 434 such pressing a plurality of buttons 66a-66f at the same time until controller 22a-22c initializes again at initialization procedure step 384 and resumes preamble detection 386 or powers up 382. Otherwise, preamble detection 386 is once again resumed.

FIG. 25 is a second flowchart depicting an exemplary but preferred method of polling mode base unit operation 440 that each base unit 24a-24f is configured in firmware and/or software to carry out during operation of alarm system 20 when configured to operate in a polling mode that enables master controller 22a-22c to wirelessly poll each base unit 24a-24f, such as in the manner previously discussed above. Upon power up 442 of base unit processor 172 is configured to go through an initialization procedure 444 that preferably causes wireless communications system 178 to start preamble detection step 446 where radio 182 put in signal detection mode where radio 182 listens for wireless messages having a packet with a preamble detected by radio as being a valid preamble 126. If a valid preamble 126 is not detected during a predetermined signal detection period of time before preamble timeout occurs in step 448, an operating mode check 450 is made to determine whether any interrupt from any manipulable control or sensor 148 and/or 150 of base unit 24a-24f has been generated before putting radio 178 into power-conserving sleep mode in step 452 for a predetermined sleep mode period of time delay 454 before once again resuming preamble detection 446. Steps 446, 448, 450, 452 and 454 preferably is repeated as part of an operating loop that preferably is a wireless communication system ultralow power mode operating loop 456 that is executed during each ultralow power mode operating cycle and continues to be executed until either a valid preamble 126 of a wireless message packet is detected by radio 178 during step 446 and completion of step 448 or an interrupt is generated by user manipulation of base unit buttons or switches in step 450 causing loop 456 to be exited.

In accordance with that previously discussed above regarding ultralow power mode operation of controller wireless communications system 86, during each ultralow power mode cycle or loop of base unit wireless communication system operation, the period of time delay that radio 182 remains in sleep mode is greater than the period of time that radio 182 listens for wireless messages in signal detection mode before preamble timeout occurs. Further in accordance with that discussed above, the total ultralow power mode cycle or loop time preferably is greater than one half wireless message packet transmission time but no greater than about packet transmission time with the period of time delay radio 182 remains in sleep mode during each cycle or loop being no greater than preamble transmission time but preferably greater than one half packet transmission time to provide optimal battery power conservation without causing sleep mode synchronization with preamble transmission.

If a valid preamble 126 is detected while radio 178 is operating in signal detection mode during preamble detection step 446 before preamble timeout 448 occurs, receive mode is then initiated in step 458 where radio 178 preferably operates in receive mode to try to receive the packet detected as having the valid preamble 126 before a receive timeout 460 occurs. Should receive timeout 460 elapse without having received the packet with the detected valid preamble 126, ultralow power mode operation is resumed by putting radio 178 into sleep mode 452 in returning to execution of ultralow power mode operating loop 456 resuming ultralow power mode wireless communications system operation.

If the wireless message packet 124 or 124' with the detected valid preamble 126 is received before receive timeout 460, the packet 124 or 124' is decoded and a message identifier type procedure is initiated where the packet payload 128 examined in a poll message checking step 462 to determine whether the message received is a wireless polling message from controller 22a-22c. If the message is a polling message, a wireless polling acknowledgment message is transmitted back to controller 22a-22c in polling acknowledgment step 464. If desired, one or more LEDs of the polled base unit 24a-24f can also be activated during polling acknowledgment step 464 to provide a visually-perceptible signal light potentially visible to a master controller user who initiated the polling message if user is within line of sight of the polled base unit 24a-24f.

If a subsequent alarm check 466 is made whether the polled base unit 24a-24f is alarming indicates the base unit 24a-24f is experiencing a sensor detection event where one of its sensors 148 and/or 150 was triggered putting base unit 24a-24f into alarm mode, alarming base unit 24a-24f preferably outputs a locally perceptible alarm in local alarm step 468 before broadcasting a wireless alarm message or wireless sensor detection event message to controller 22a-22c in alarm message step 470. Thereafter, as well as in the case where the alarm check 466 indicates that the base unit 24a-24f being polled is not in alarm mode, base unit operation restarts preamble detection 446 thereby preferably also causing ultralow power mode wireless communications system operation to resume.

Where the received message is not a poll message in step 462, the message identifier type procedure can be and preferably is configured in firmware and/or software to execute a second message type checking step, preferably a light-activating message checking step 472, where one or more LEDs of the message receiving base unit 24a-24f are activated in step 474 if the received message from controller 22a-22c is a light-activating or flashlight-activating message. In addition to turning on one or more LEDs in flashlight-activating step 474, the base unit 24a-24f responds with a wireless ACK message to controller 22a-22c that acknowledges receipt the light-activating message from controller 22a-22c before resuming preamble detection in step 446 thereby listening for a new incoming wireless message. While each base unit 24a-24f can be configured in firmware and/or software so that the message-receiving base unit 24a-24f momentarily flashes or turns on the one or more LEDs onboard the message-receiving base unit 24a-24f for a predetermined, e.g., user set or user configurable, period of time, each base unit 24a-24f preferably is configured in firmware and/or software so that the message-receiving base unit 24a-24f keeps the one or more LEDs continuously turned on in step 474 after receipt of a first light-activating message and only toggling off or turning off the one or more LEDs in a subsequent execution of step 474 upon resuming preamble detection in step 446 and receiving a subsequent or second message that is determined to be a non-polling message in step 462 that is determined to be a light activating message in step 472.

In a preferred implementation not shown in FIG. 25, receipt of a poll message by a message-receiving base unit 24a-24f toggles or turns on a light, preferably a white light, by toggling on one or more LEDs onboard the polling message-receiving base unit 24a-24f. While each base unit 24a-24f can be configured in firmware or software to momentarily toggle or turn on one or more LEDs after receipt of a polling message, each base unit 24a-24f preferably is configured in firmware and/or software so the polling message-receiving base unit 24a-24f continuously keeps the one or more LEDs on after receiving a first polling message until the same polling message-receiving base unit 24a-24f receives a second polling message. When the polling message-receiving base unit 24a-24f receives a subsequent or second polling message, each base unit 24a-24f is configured in firmware and/or software so the polling message-receiving base unit 24a-24f toggles or turns off the one or more LEDs upon receipt of the subsequent or second polling message.

With reference once again to FIG. 25, where the message received by message receiving base unit 24a-24f is not a poll message, a check can be and preferably is made in step 472 to determine whether the message is a white light or light-activating mode message, e.g., flashlight activating mode message. If the base-unit received message is a non-poll message that is determined to be a white light or flashlight mode message, the message receiving base unit 24a-24f is configured in step 474 to toggle on or turn one or more of the LED(s) and reply with a wireless acknowledgment to the master controller. The message receiving base unit 24a-24f preferably is configured to keep the one or more LEDs toggled on or turned on in flashlight mode until another wireless message is received toggling or turning off the one or more LEDs thereby toggling off or turning off flashlight mode.

Where the received message is neither a poll message in step 462 nor a light-activating message in step 472, the message identifier type procedure executes a third message type checking step, preferably a power off checking step 476, where the receiving base unit 24a-24f is turned off in step 478 if the received message is a base unit off mode message from controller 22a-22c. After being turned off in step 478, the base unit 24a-24f remains in a hibernation mode where virtually no battery power is used while waiting for a base unit on mode event 480 to occur. Such a base unit on mode event 480 can be in the form of a user manually turning on the base unit 24a-24f and/or a base once again becoming activated by positioning the magnet back in its active position. In another embodiment the base could become active by a certain number of magnetic or reed switch closures, e.g., a plurality of magnet sensor actuations, in a predetermined, e.g., user set or programmed, period of time. Where operation of base unit 24a-24f resumes after hibernating in base unit off mode, preamble detection 446 resumes with base unit 24a-24f preferably once again returning to ultralow power mode operation. Where the message identifier type of the received message cannot be determined after executing all of the message type checking steps 462, 472 and 476, preamble detection 446 preferably is once again resumed with base unit 24a-24f preferably also returning to ultralow power mode operation.

Where operation in ultralow power mode is interrupted by an interrupt generated by (a) a user pressing a switch or button of base unit, or (b) occurrence of a change in sensor state in base unit operating state change detection step 450, a base unit operations interrupt handling procedure is initiated where a check is made in step 482 whether a change in the state of one of the sensors 148 or 150 of base unit 24a-24f has occurred. If a change in the state of sensor 148, preferably in magnetic field sensor 149, more preferably in reed switch 151, is detected in step 482 by arming the sensor 148 by placing sensor trigger magnet 212 in its magnet seat 211 as discussed above, base unit 24a-24f is configured to output a user-perceptible indication or signal a sensor arming indicator step 484 preferably by lighting up or flashing one or more LEDs of base unit 24a-24f in a sequence indicating to user that sensor 148, preferably magnetic field sensor 149, more preferably reed switch 151, has been successfully armed by user placement of trigger magnet 212 in seat 211. Upon completion of sensor arming indicator step 484 where sensor 148, preferably magnetic field sensor 149, more preferably reed switch 151, has been successfully armed by seating of trigger magnet 212 in seat 211, base unit processor 172 can be configured to automatically turn off the sensor arming indicator LEDs in sensor arming indicator clearing step 486 or base unit processor 172 can be configured to turn off the sensor arming indicator LEDs in step 486 by user manipulating one or more controls of base unit 24a-24f. Preamble detection 446 is resumed after completion of sensor arming indicator clearing step 486.

If the change in the state of sensor 148, preferably in magnetic field sensor 149, more preferably in reed switch 151, detected in step 482 is not from arming of sensor 148, preferably magnetic field sensor 149, more preferably reed switch 151, a check is made in a first sensor trigger detection step 488 whether a sensor detection event has occurred that has triggered sensor 148, preferably magnetic field sensor 149, more preferably reed switch 151, such as by removal of sensor trigger magnet 212 from magnet seat 211. Where an interrupt has been generated by occurrence of a sensor detection event from removal of trigger magnet 212 from seat 211, such as due to a fish strike of an ice fishing tip-up or the like, a local alarm step 490 is executed where one or more LEDs of the alarming base unit 24a-24f are toggled on causing at least part of the housing or enclosure of the alarming base unit 24a-24f to be lit or light up outputting a local alarm that preferably is line of sight visible. Thereafter, a wireless alarm message or wireless sensor detection event message is sent by alarming base unit 24a-24f to controller 22a-22c in remote alarm communicating step 492 and preamble detection 446 is resumed upon alarming base unit 24a-24f receiving wireless acknowledgment from controller 22a-22c of having received the wireless alarm message or wireless sensor detection event message from alarming base unit 24a-24f.

Where the ultralow power sleep mode exiting interrupt detected in step 450 was generated by a user pressing pair button 216 of the base unit 24a-24f as determined in executing pair request initiating step 494, a base unit pairing procedure where a wireless pairing request message is broadcast by the base unit to controller 22a-22c in step 496. Broadcasting of the wireless pair request message is retried during step 496 until a wireless pairing confirmation message is received back from controller 22a-22c. Thereafter, preamble detection 446 is resumed preferably putting paired base unit into ultralow power mode operation.

Where the ultralow power sleep mode exiting interrupt detected in step 450 was generated by a user pressing pair erase button 220 of the base unit 24a-24f as determined in executing pair erase request initiating step 498, a base unit pairing erase procedure is initiated in pairing erase step 500 where the pairing data provided by controller 22a-22b, including the unique alarm system identifier, Alarm ID, of the alarm system 20 and/or the device identifier or device number, DEV NUM, assigned to the base unit during pairing are erased from onboard memory storage 177, preferably erased from memory 179 onboard base unit processor 174 enabling base unit to then be paired with a different controller of a different alarm system of the invention. Thereafter, preamble detection 446 is resumed preferably putting unpaired base unit into ultralow power mode operation.

Where the ultralow power sleep mode exiting interrupt detected in step 450 was generated by occurrence of a sensor detection event from triggering of another sensor 150 of the base unit a check is made in a second sensor trigger detection step 502. Where the ultralow power sleep mode exiting interrupt detected in step 450 is determined in sensor trigger detection step 502 to have been generated by triggering of sensor 150 is a motion detector 153, preferably PIR sensor 157, in a sensor detection event caused by movement of an animal, human or something else whose motion is detectible thereby, one or more LEDs of the alarming base unit 24a-24f may flash in a local alarm step 503, and a wireless alarm message or wireless sensor detection event message is sent by alarming base unit 24a-24f to controller 22a-22c in remote alarm transmitting step 504 may occur, followed by a delay in delay step 506, such as on the order or 10 seconds, with preamble detection 446 resumed upon the alarming base unit 24a-24f receiving wireless acknowledgment from controller 22a-22c that controller 22a-22c received the wireless alarm message or wireless sensor detection event message from the alarming base unit 24a-24f.

In one aspect, while controller 22a-22c may indicate receiving a base magnet alarm message by repeatedly beeping the buzzer and flashing a corresponding button LED, for a PIR alarm message, controller 22a-22c may beep the buzzer and flash the corresponding button LED for a limited number of times, such as 3 times. This may be provided so that false alarm events which may be more common to the PIR alarm, such as wind, will not require user intervention for frequent acknowledgements on the controller 22a-22c.

FIG. 26 is a third flowchart depicting an exemplary but preferred method of non-polling mode base unit operation 510 that each base unit 24a-24f is configured in firmware and/or software to carry out during operation of alarm system 20 when configured to operate in a non-polling mode where wireless communication is only one way from base unit 24a-24f to controller 22a-22c to help extending base unit battery life by reducing power usage during non-polling mode operation. Upon power up 512 of the base unit 24a-24f, the processor 174 is configured to go through an initialization procedure 514 that preferably puts processor 174 in power-conserving sleep mode 516 where it remains until a processor-awakening interrupt is generated from any one of a plurality of non-wireless communication system related components of base unit 24a-24f. With base unit 24a-24f in non-polling mode, wireless communications system 178 of base unit 24a-24f is kept continuously in sleep mode until an interrupt requiring transmission of a wireless message to controller 22a-22c is generated. Since the base unit wireless communication system 178 is continuously kept in sleep mode and only awakened to put radio 182 in transmit mode to wireless broadcast a message, battery power usage of base unit 24a-24f is reduced most in non-polling mode advantageously providing longest battery life.

When in sleep mode 516, processor 182 is capable of operating in a low power or power-conserving mode where an interrupt handling procedure is periodically executed while in sleep mode 516 to check whether any interrupt has been generated that would require processor 182 to be awakened. In non-polling mode, interrupt handling procedure checks in a sensor arming detection step 518 to see whether trigger magnet 212 has been placed in seat 211 arming reed switch 151, checks in a first sensor interrupt event detection step 519 to see whether a first type of sensor interrupt has occurred by the trigger of reed switch 151 due to removal of trigger magnet 212 from seat 211, checks in a first sensor alarm detection step 521 to see whether a first type of sensor alarm has occurred due to removal of trigger magnet 212 from seat 211, checks in operating state change detection step 522 to see whether any control has been manipulated by user that would require a change in the state or mode of operation of the base unit 24a-24f, and checks in a second sensor trigger event detection step 524 to see whether a second type of sensor detection event has occurred where PIR sensor 147 has detected movement of an animal, human or other object whose movement is capable of being detected by PIR sensor 157.

Where the interrupt handling procedure detects arming of reed switch 151 occurring in step 518 by user placing trigger magnet 212 in seat 211, the interrupt generated causes processor 174 to exit sleep mode 516 and output a user-perceptible indication or signal in a sensor arming indicator step 526 preferably by lighting up or flashing one or more LEDs of base unit 24a-24f in a sequence indicating to user that reed switch 151 has been successfully armed by proper placement of trigger magnet 212 in seat 211. Upon completion of sensor arming indicator step 526 where reed switch 151 has been successfully armed by proper seating of trigger magnet 212 in seat 211, the sensor arming indicator LEDs are turned off in sensor armed indicator clearing step 528 such as by user manipulating a control of base unit 24a-24f that causes execution of the sensor armed indicator clearing step 528 before processor 174 is returned to sleep mode 516.

Where the interrupt handling procedure detects occurrence of a first type of sensor interrupt event in step 519 from reed switch 151 opening due to removal of trigger magnet 212 from seat 211, the interrupt generated causes processor 174 to exit sleep mode 516 and generate local alarm in local alarm step 530 where one or more LEDs of the alarming base unit 24a-24f are flashed and a remote alarm message transmitting step 532 is executed where a wireless alarm message or wireless sensor detection event message is transmitted to controller 22a-22c. Processor 174 is returned to sleep mode 516 upon completion of step 532 when controller 22a-22c wirelessly acknowledges receipt of the wireless alarm message or wireless sensor detection event message.

Where the interrupt handling procedure detects occurrence of a first type of sensor alarm event in step 521 due to removal of trigger magnet 212 from seat 211, the alarm generated causes processor 174 to exit sleep mode 516 with a predetermined delay in delay step 523 before generating a local alarm in local alarm step 530 where one or more LEDs of the alarming base unit 24a-24f are flashed and a remote alarm message transmitting step 532 is executed where a wireless alarm message or wireless sensor detection event message is transmitted to controller 22a-22c. Processor 174 is returned to sleep mode 516 upon completion of step 532 when controller 22a-22c wirelessly acknowledges receipt of the wireless alarm message or wireless sensor detection event message.

Where the interrupt handling procedure detects change in a base unit operating state in step 522, a further check is made in step 534 whether user pressed pair button 216. If detected in step 534 that pair button 216 has been pressed, a base unit pairing procedure is initiated where a wireless pairing request message is broadcast by the base unit to controller 22a-22c in step 536. Broadcasting of the wireless pair request message can be retried during step 536 until a wireless pairing confirmation message is received back from controller 22a-22c. Thereafter, processor 174 is put back into sleep mode 516.

Where it is determined in step 534 that the pair button 216 has not been pressed, a further check is made in step 538 to determine whether the erase button 220 has been pressed. If detected in step 538 that erase button 220 has been pressed, a base unit pairing erase procedure is initiated in pairing erase step 540 where the pairing data provided by controller 22a-22b, including the unique alarm system identifier, Alarm ID, of the alarm system 20 and/or the device identifier or device number, DEV NUM, assigned to the base unit during pairing are erased from onboard memory storage 177, preferably erased from memory 179 onboard base unit processor 174 enabling unpaired base unit to then be paired with a different controller of a different alarm system of the invention in the future. Thereafter, processor 174 is put back into sleep mode 516.

Where the interrupt handling procedure detects occurrence of a second type of sensor detection event in step 524 because PIR sensor 147 has detected movement of an animal, human or other object whose movement is capable of being detected by PIR sensor 157, the interrupt generated causes processor 174 to exit sleep mode 516, flash or toggle one or more LEDs of the alarming base unit 24a-24f in a local alarm step 525, and execute remote alarm message transmitting step 542 where a wireless alarm message or wireless sensor detection event message is transmitted to controller 22a-22c. Thereafter, following a delay in delay step 543, such as on the order or 10 seconds, processor 174 is put back into sleep mode 516.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. An alarm system comprising:
    (a) a master controller comprising (i) a processor, (ii) a user interface, (iii) a wireless communications system, and (iv) a power source; and
    (b) a sensing base unit remotely located a distance from the master controller, the sensing base unit comprising (i) a processor, (ii) a sensor, (iii) a wireless communications system, and (iv) a power source;
    wherein the sensing base unit is configured to wirelessly communicate with the master controller via the wireless communications system upon the sensor detecting a sensing event, and
    wherein the sensing base unit further comprises a non-magnetic housing, the sensor of the sensing base unit comprises a magnetic flux sensor disposed interiorly on one side of the housing, a sensor trigger magnet disposed exteriorly on the other side of the housing opposite the magnetic flux sensor, and a magnetically attractive sensor trigger magnet seating anchor disposed interiorly of the housing between the magnetic flux sensor and the sensor trigger magnet, the sensor trigger magnet removably seated against part of the housing by magnetic attraction to the magnetically attractive sensor trigger magnet seating anchor; and
    wherein the processor of the sensing base unit is configured to wirelessly communicate detection of a sensing event to the master controller when the trigger magnet is removed far enough away from the magnetic flux sensor to cause the magnet flux sensor to detect the sensing event.

2. The alarm system of claim 1 comprising a plurality of the base units; and wherein the master controller is a portable electronic device, wherein the user interface comprises a plurality of user manipulable controls; and wherein the processor of the master controller is configured to assign a respective one of the manipulable controls to a corresponding one of the base units during pairing of the corresponding one of the base units to the master controller.

3. The alarm system of claim 2, wherein during receipt by the master controller of a wireless pairing message transmitted by a particular one of the base units seeking to be paired with the master controller during pairing of the particular one of the base units with the master controller, the processor of the master controller is configured to (a) assign a specific one of the manipulable controls manipulated by a user of the master controller to the particular one of the base units whose wireless pairing message is received by the controller, and (b) thereafter wirelessly message the particular one of the base units when the specific one of the manipulable controls assigned to the particular one of the base units during pairing is manipulated by the user of the master controller.

4. The alarm system of claim 3, comprising a plurality of the base units wirelessly paired with the master controller, and wherein the processor of the master controller is configured to wirelessly communicate an alarm system identifier unique to the master controller to each one of the base units during pairing therewith that is stored in each one of the base units paired therewith and which thereafter forms part of a message payload of a wireless packet format of wireless packets used in wireless messages communicated between the master controller and each one of the base units paired therewith.

5. The alarm system of claim 4, wherein the master controller and each one of the base units are configured to (a) wirelessly communicate during pairing to associate a device number identifier unique to each one of the base units paired with the master controller with a corresponding one of a plurality of manipulable controls of the master controller, and (b) wirelessly communicate after pairing with wireless packets each comprised of a message payload containing the device number identifier of one of the base units paired with the master controller.

6. The alarm system of claim 1, comprising a plurality of the base units wirelessly paired with the master controller and configured to wirelessly communicate using wireless packets each comprised of a preamble and a message payload, wherein the message payload of the wireless packet format of wireless packets used in wireless messages communicated between the master controller and a particular one of the base units paired therewith comprises a device number identifier associated with a particular one of the base units paired therewith, and a message identifier comprised of an identifier of one of a plurality of tasks or commands to be performed by the particular one of the base units having the corresponding device number identifier associated therewith.

7. The alarm system of claim 1, comprising a plurality of the base units wireless paired with the master controller, and wherein the master controller and each one of the base units paired therewith are configured to wirelessly communicate using wireless packets each comprised of a message payload and a preamble having a length or wireless transmission time greater than twice that of the message payload for increasing a transmission distance that wireless messages can be transmitted therebetween.

8. The alarm system of claim 7, wherein wherein the master controller and each one of the base units paired therewith are configured such that each wireless packet of wireless messages communicated between the master controller and any one of the base units paired therewith has a message payload of no greater than 8 bytes.

9. The alarm system of claim 1 comprising at least a plurality of pairs of the base units; and wherein the master controller is a portable electronic device, wherein the user interface comprises a plurality of pairs of user manipulable controls, each user manipulable control comprised of a button and a visually-perceptible indicator; and wherein the processor of the master controller is configured to assign each one of the manipulable controls to a corresponding one of the base units during pairing of each one of the base units to the master controller.

10. The alarm system of claim 9, wherein the processor of the master controller is configured so that user manipulation of the button of one of the user manipulable controls transmits a wireless message to the corresponding one of the paired base units assigned thereto.

11. The alarm system of claim 10, wherein each one of the base units has a visually perceptible indicator, and wherein the processor of the master controller is configured so that (a) manipulation of the button of the one of the user manipulable controls for a first duration causes the corresponding base unit to momentarily energize the visually perceptible indicator momentarily providing illumination therefrom, and (b) manipulation of the button of the one of the user manipulable controls for a second duration greater than the first duration causes the corresponding base unit to continuously energize the visually perceptible indicator continuously providing illumination therefrom.

12. The alarm system of claim 1, wherein the housing of the sensing base unit is formed with a three-dimensionally contoured magnet seat in which the sensor trigger magnet is removably seated that is at least partially bounded by an upraised magnet seat wall formed in the housing of the base unit.

13. The alarm system of claim 1, wherein the magnetic flux sensor causes an interrupt to be generated when the sensor trigger magnet is unseated from the magnet seat, the interrupt causing the processor of the base unit to transmit a wireless sensor detection event message to the master controller.

14. The alarm system of claim 1, further comprising a trigger actuator attached to the sensor trigger magnet that unseats the sensor trigger magnet from the magnet seat when the trigger actuator is displaced far enough with sufficient force to overcome a magnetic force of the sensor trigger magnet attracting the sensor trigger magnet to the magnet seating anchor and unseat the sensor trigger magnet from the magnet seat.

15. The alarm system of claim 14, wherein the trigger actuator comprises an elongate flexible tether having one end attached to the sensor trigger magnet and another end attached to an object that is movable, and wherein sufficient movement of the movable object a far enough distance with sufficient force causes the tether to unseat the sensor trigger magnet from the magnet seat.

16. The alarm system of claim 15, wherein the movable object comprises an elongate pole of a game sensing apparatus.

17. The alarm system of claim 16, wherein the game sensing apparatus comprises a game sensor and wherein the movable object comprises an elongate alarm pole of the game sensor releasably retained by a latch engaging the alarm pole in a position where the sensor trigger magnet is releasably received in the magnet seat before being released by the latch by game allowing the alanu pole to displace the tether causing the tether to unseat the sensor trigger magnet from the magnet seat.

18. The alarm system of claim 1, wherein the sensing base unit further comprises (a) a light facing in one direction, and (b) a proximity sensor facing in a direction opposite the light.

19. The alarm system of claim 18, wherein the housing of the sensing base unit comprises a pair of halves with one of the halves comprising a sensing side from which the proximity sensor outwardly faces and another one of the halves comprising a light transmissible side from which the light outwardly faces, the sensing side comprises a sensor port through which a sensor detection event is capable of being detected by the proximity sensor, and the light transmissible side comprises a light transmissible window through which light from the light is transmissible to illuminate an area exteriorly of the sensing base unit when the light is energized.

20. The alarm system of claim 19, wherein the housing of the base unit has a plurality of legs extending between the housing halves with one plurality of the legs each comprising tubular mounts through which a fastener extends to attach the base unit to a surface, and another plurality of the legs each comprising closures releasably attaching one of the housing halves to the another one of the housing halves.

21. The alarm system of claim 20, wherein each one of the legs has a pair of oppositely outwardly extending feet with a first foot of each leg extending outwardly in a first direction and a second foot of each leg extending in a second direction generally opposite the first direction, and wherein the first feet of the legs define a first pedestal upon which the base unit can rest and the second feet of the legs define a second pedestal upon which the base unit can rest.

22. The alarm system of claim 21, wherein the legs are spaced apart about a periphery of the housing and define spaced apart ribs and further comprising a dock configured to releasably engage a plurality of the ribs to releasably mount the base unit to the dock.

23. The alarm system of claim 22, wherein the dock comprises a clip configured for releasable snap fit attachment with any pair of adjacent ribs of the housing.

24. The alarm system of claim 18, wherein the proximity sensor comprises a passive infrared (PIR) sensor and the magnetic flux sensor comprises a reed switch.

25. The alarm system of claim 1, wherein the magnetic flux sensor and the sensor trigger magnet are axially aligned.

26. The alarm system of claim 1, wherein the sensing base unit is configured to communicate a reply to the master controller that is responsive to a polling command from the master controller.

27. The alarm system of claim 1, wherein the sensing base unit further comprises a visually-perceptible indicator, and wherein the master controller is configured to enable the visually-perceptible indicator.

28. The alarm system of claim 1, wherein the sensing base unit is configured to power off after receiving a message from the master controller commanding the sensing base unit to power off.

29. The alarm system of claim 1, wherein the sensor trigger magnet is a first sensor trigger magnet, and further comprising a second sensor trigger magnet, wherein the first sensor trigger magnet or the second sensor trigger magnet is removably seated against the part of the housing by magnetic attraction to the magnetically attractive sensor trigger magnet seating anchor.

30. The alarm system of claim 29, wherein the first and second sensor trigger magnets are different strength sensor trigger magnets.

31. The alarm system of claim 30, wherein the first sensor trigger magnet has enough magnetic field strength to require a force of at least five pounds in a direction opposite that of the magnetically attractive sensor trigger magnet seating anchor in order to unseat the first sensor trigger magnet.

32. The alarm system of claim 31, wherein the second sensor trigger magnet has enough magnetic field strength to require a force of at least seven pounds in a direction opposite that of the magnetically attractive sensor trigger magnet seating anchor in order to unseat the second sensor trigger magnet.

33. The alarm system of claim 30, wherein the first and second sensor trigger magnets comprise a first plurality of sensor trigger magnets, and further comprising a second plurality of sensor trigger magnets, wherein the first and second pluralities of sensor trigger magnets comprise sensor trigger magnets having different strengths from one another.

34. The alarm system of claim 1, further comprising a pole resiliently anchored by a biasing element and a crossbar that releasably engages the pole, wherein releasing the pole displaces a tether which pulls the sensor trigger magnet away from the sensing base unit.

35. An alarm system comprising:
(a) a master controller including:
   a user interface;
   a control system; and
   a wireless communications system; and
(b) a plurality of sensing base units remotely located a distance from the master controller, the sensing base units each including:
   a sensor; and
   a wireless communications system,
wherein the master controller and each of the sensing base units are wirelessly paired with one another via the wireless communications systems,
wherein each of the sensing base units are configured to communicate an alarm message to the master controller upon a sensor of a respective sensing base unit detecting a sensing event,
wherein each of the sensing base units are configured to communicate a reply message to the master controller that is responsive to a polling command from the master controller, and
wherein each of the sensing base units comprise a housing, a magnetic flux sensor disposed interiorly on one side of the housing, and a magnet seat containing a sensor trigger magnet disposed exteriorly on the other side of the housing opposite the magnetic flux sensor, the magnet seat being defined by an upraised magnet seat wall.

36. The alarm system of claim 35, wherein the master controller is a portable electronic device, and wherein the user interface includes a plurality of user manipulable controls, each user manipulable control including a button and a visually-perceptible indicator.

37. The alarm system of claim 36, wherein the user manipulable controls provide polling buttons for respective sensing base units, wherein user manipulation of a user manipulable control polls a corresponding sensing base unit linked to the master controller.

38. The alarm system of claim 37, wherein the sensor of each sensing base unit is a first sensor that is a magnetic field sensor, wherein each sensing base unit further includes a second sensor that is a passive infrared (PIR) sensor, and wherein each sensing base unit is configured to communicate the alarm message to the master controller upon at least one of the first and second sensors of the respective sensing base unit detecting a sensing event.

39. The alarm system of claim 35, wherein the sensing base units each further include a magnetic flux sensor and a sensor trigger magnet, the sensor trigger magnet being releasable in a plurality of directions.

40. The alarm system of claim 35, further comprising a gap disposed in the magnet seat wall.

41. The alarm system of claim 35, further comprising a sensor trigger magnet seating anchor retainer pocket disposed interiorly on the one side of the housing, the sensor trigger magnet seating anchor retainer pocket being arranged to underlie the magnet seat disposed exteriorly on the other side of the housing, the sensor trigger magnet seating anchor retainer pocket containing an annular metal washer.

* * * * *